(12) United States Patent
Corneille et al.

(10) Patent No.: US 8,315,198 B2
(45) Date of Patent: *Nov. 20, 2012

(54) MOBILE PROVISIONING TOOL SYSTEM

(75) Inventors: Kevin R. Corneille, Seattle, WA (US);
Ernie Climenson, Seattle, WA (US)

(73) Assignee: Accenture Global Services Limited,
Dublin (IE)

( * ) Notice: Subject to any disclaimer, the term of this patent is extended or adjusted under 35 U.S.C. 154(b) by 1141 days.

This patent is subject to a terminal disclaimer.

(21) Appl. No.: 11/752,747

(22) Filed: May 23, 2007

(65) Prior Publication Data

US 2008/0025243 A1 Jan. 31, 2008

Related U.S. Application Data

(63) Continuation of application No. 10/680,593, filed on Oct. 7, 2003, now Pat. No. 7,239,877.

(51) Int. Cl.
*H04W 4/00* (2009.01)
*G08B 5/22* (2006.01)

(52) U.S. Cl. .......................................... 370/313; 340/7.2

(58) Field of Classification Search ............... 455/456.3, 455/411–419; 709/246, 206; 370/313; 340/7.2
See application file for complete search history.

(56) References Cited

U.S. PATENT DOCUMENTS

| | | | |
|---|---|---|---|
| 6,226,650 B1 | 5/2001 | Mahajan et al. | 707/201 |
| 6,282,712 B1 * | 8/2001 | Davis et al. | 717/170 |
| 6,529,729 B1 | 3/2003 | Nodoushani et al. | 455/419 |
| 6,532,362 B1 | 3/2003 | Lee et al. | 455/419 |
| 6,606,708 B1 | 8/2003 | Devine et al. | 713/201 |
| 7,239,877 B2 * | 7/2007 | Corneille et al. | 455/456.3 |
| 7,266,369 B2 * | 9/2007 | Moles et al. | 455/418 |
| 7,324,473 B2 | 1/2008 | Corneille et al. | 370/328 |
| 2002/0015403 A1 | 2/2002 | McConnell et al. | 370/352 |
| 2002/0069278 A1 | 6/2002 | Forslow | 709/225 |
| 2002/0104080 A1 * | 8/2002 | Woodard et al. | 717/176 |
| 2003/0023849 A1 | 1/2003 | Martin, Jr. et al. | 713/176 |
| 2003/0033209 A1 | 2/2003 | Minear et al. | 705/26 |
| 2003/0162533 A1 | 8/2003 | Moles et al. | 455/419 |
| 2003/0172183 A1 | 9/2003 | Anderson, IV et al. | 709/245 |
| 2004/0088417 A1 | 5/2004 | Bober et al. | 709/227 |
| 2004/0185777 A1 | 9/2004 | Bryson | 455/41.1 |
| 2005/0014489 A1 | 1/2005 | Zhigang | 455/414.2 |
| 2005/0073982 A1 | 4/2005 | Corneille et al. | 370/338 |

(Continued)

FOREIGN PATENT DOCUMENTS

EP 0 899 925 A2 3/1999

(Continued)

OTHER PUBLICATIONS

EP Partial Search Report in European Patent Application No. 04256198.5, dated Jul. 31, 2007.

(Continued)

*Primary Examiner* — Melody Mehrpour
*Assistant Examiner* — Emem Stephen

(57) ABSTRACT

A mobile provisioning tool system including a software provisioning tool application. The mobile provisioning tool system includes mobile devices capable of conducting wireless communication with wireless access points. A carrier network is connected with the wireless access points and a customer network that includes at least one business application. A provisioning tool application is located on a provisioning server. The provisioning tool application includes a CRM Rep component and an IT Admin component. A software provisioning tool application allows the provisioning workstation to automatically install mobile business services and configure network configuration settings on the mobile device.

30 Claims, 48 Drawing Sheets

U.S. PATENT DOCUMENTS

2006/0173758 A1* 8/2006 Minear et al. .................. 705/30
2006/0234678 A1 10/2006 Juitt et al. .................... 455/411

FOREIGN PATENT DOCUMENTS

| EP | 0 973 299 A2 | 1/2000 |
| EP | 0 973 299 A3 | 6/2001 |
| WO | WO 99/22325 A1 | 5/1999 |
| WO | WO 01/88817 A1 | 11/2001 |

OTHER PUBLICATIONS

EP Search Report in European Patent Application No. 04256198.5, dated Sep. 26, 2007.

EP Office Action in European Patent Application No. 04256198.5, dated Apr. 15, 2009.

Murthy, U., Bukhres, O., Winn, W., Vanderdez, E., "Firewalls for Security in Wireless Networks," *System Sciences*, 1998, Proceedings of the Thirty-First Hawaii International Conference on Kohala Coast, HI, USA; Jan. 6-9, 1998, Los Alamitos, CA, USA, IEEE *Comput. Soc.* US, vol. 7, Jan. 6, 1998, pp. 672-680, XP0102628934, ISBN: 0-8186-8255-8.

Hunt, R., "Internet/Intranet firewall security—policy, architecture and transaction services," *Computer Communications*, vol. 21, No. 13, Sep. 1, 1998, pp. 1107-1123, XP004146571, ISSN: 0140-3664, Butterworths & Co. Publishers Ltd., GB.

* cited by examiner

Screen layout:

SMCL

Home | Contact

Operator Provisioning Tool

You are about to save the following company:

Company Info
- Company Name: Test Company
- Internal ID: 342332
- Exchange Server: mail
- Domain: company.com IT Administration
- User Name: tests
- First Name of ITAdmin: Test
- Last Name of ITAdmin: User Services to be activated
- MIS Sync: ✓
- Business Service Host: A
- Host Name: 192.168.100.28
- Port: 80
- Mean Speed: 20
- Peak Speed: 50
- Scheme: PLAIN
- Concurrent: 5

[Save] [Cancel]
 702   704

Companies
Users
Services
Authorizations

Screen layout:

Operator Provisioning Tool — Home | Contact

Blocked Users — 1406

Field: [User Name ▼] Criteria: [____1402____] [Search] [View Authorized Users] — 1404, 1406

| User Name | Full Name | Security Group | Company | | |
|---|---|---|---|---|---|
| CRM | Account for CRM Team | CRM Operator | CRM | ✎ | ✕ |
| erniec | Ernie Climenson | Customer User | Asterix | ✎ | ✕ |
| johnd | John Digweek | Customer User | Company | ✎ | ✕ |
| testu | Test Account | CRM Operator | CRM | ✎ | ✕ |
| warrenb | Warren Baker | Customer User | CRM | ✎ | ✕ |

Page 1 2 ▷

Companies
Users
Services
Authorizations

Screen layout:

Operator Provisioning Tool

Home | Contact

You are about to save the following User:

User Information:
User Name: erniec
First Name: Ernie
Last Name: Climenson
Description: Test Asterix Account Member of:
☑ Customer Users
Customer: Asterix

[Save] [Cancel]
 1602   1604

Companies
Users
Services
Authorizations

SMCL

Screen layout:

SMCL

Operator Provisioning Tool

Home | Contact

Services
[Add Service] — 2104

[View Inactive Business Services] — 2106

| Service Name | Service Type | Service # | Gateway Address | | |
|---|---|---|---|---|---|
| MIS Sychronization | PIM | 21323 | mis.asterix.com | ✎ | ✗ |
| Synchrologic | PIM | 12042 | syn.asterix.com | ✎ | ✗ |

[Add Service]

Companies
Users
Services
Authorizations

Screen layout:

Operator Provisioning Tool

Home | Contact

- Companies
- Users
- Services
- Authorizations

Delete Service

The following Business Service Connectors must be deactivated first: ~2502

| Name | MSISDN | Company | Service | Status |
|---|---|---|---|---|
| Climenson, Ernie | 0643213123 | Accenture | MIS | ACT |
| Crabtree, Sally | 0623443241 | Accenture | MIS | ACT |
| DT, NR | 0622517796 | Accenture | MIS | PEN |
| Kerns, Chris | 0612331413 | Accenture | MIS | ACT |
| Lalji, Aly | 0623443234 | Accenture | MIS | ACT |
| Martin, Andrew | 0006255007 | Accenture | MIS | ACT |
| Sherwin, John | 0643113213 | Accenture | MIS | ACT |
| Smid, Erik | 0620224676 | Accenture | MIS | ACT |
| Team, Dedicated | 0613912312 | Accenture | MIS | ACT |

The following Business Services must be deactivated first: ~2504

| Company | Internal ID | Service | Status |
|---|---|---|---|
| Accenture | 123445 | MIS | ACT |
| Company | 324343 | MIS | ACT |
| Test Company | 224524 | MIS | ACT |

[Back] ~2506

MOBILE PROVISIONING TOOL SYSTEM

The present patent application is a continuation of application Ser. No. 10/680,593, filed Oct. 7, 2003 now U.S. Pat. No. 7,239,877, which is incorporated herein by reference.

BACKGROUND OF THE INVENTION

1. Technical Field

The present invention relates generally to provisioning mobile communication devices for the use of general packet radio services (GPRS) and universal mobile telephone system (UMTS) networks and more particularly, to a system and method for provisioning mobile devices for companies to provide wireless email, personal information management (PIM), and other enterprise mobile data application functionality over GPRS or UMTS.

2. Related Art

Wireless communication devices must be setup or provisioned prior to activation and use in a wireless access network. Generally speaking, provisioning includes programming the mobile device with a telephone number, programming the wireless access network with the serial number and telephone number of the mobile telephone (if applicable), and/or installing application software on the device. The term provisioning also applies to the setup of handheld devices without integrated phones, such as PDAs (PocketPC, Palm, etc.) or other similar devices. Once the mobile device is programmed, the mobile device and wireless access network are able to carry telephone calls between the mobile device and a public switched telephone network (PSTN). Provisioning may also include programming the wireless network and mobile device to support one or more optional features for the mobile device, such as call forwarding, three-way calling, voice messaging, short messaging, paging, and the installation of application software on the device.

Provisioning/programming of the mobile device has largely been done on the premises of the vendor or distributor of the mobile device. A data port on the mobile device may be used to connect the mobile device to a programming system. In order to program it for use in the wireless access network, the programming system uploads provisioning data into the mobile device, such as the telephone number assigned to the mobile device. At the end of the provisioning process, the user of the mobile device may be able to make and receive calls through the wireless access network. The mobile device may also be able to access voice mail services and/or software applications that are provided by the vendor or distributor of the mobile device.

The mobile device may also be manually programmed using a keypad on the mobile device. While sound and secure, this provisioning method requires the undesirable step of programming/provisioning the mobile device before it can be delivered to a subscriber. In some circumstances, the ability to deliver a mobile device directly to a subscriber without first having to provision the mobile device provides obvious advantages. Also, the ability to re-provision the mobile device over-the-air without returning the mobile device to a service center also has obvious advantages.

Over-the-air service provisioning approaches have been used to provision mobile devices over-the-air using the wireless access network. In this approach, the mobile device may be temporarily provisioned to allow an end-user to call a customer service center, through which long-term provisioning can be obtained for the mobile device. The service center may establish a provisioning communication link with the mobile device through the wireless access network and a mobile switching center (MSC) supporting the call. With the communication link, the mobile device may be provisioned over-the-air by wireless short message commands sent to the mobile device by using provisioning information sent by the mobile device back to the service center over the communication link.

In some business environments, a server database may be used to store data that is relevant to many employees or remote users of a business application or service. The server database may be accessible by mobile devices to increase the availability of information to the end-user. Information may be passed along to the end-user of the mobile device from the server database. The type of information that is important to each end-user may vary depending on the needs of the company for which the end-user is employed.

Remote access to data contained on the server database may be important for businesses where the end-user works out of the office or happens to be traveling. For instance, end-users may rely on the data stored in the server database to be informed about product availability, inventory data, pricing information, company events, and so forth. Instead of being connected to the server database for a long period of time, thereby accumulating telecommunication charges or tying up data lines, the end-users may only intermittently connect their mobile devices to a server for access to the server database.

The mobile devices may save a portion of the server database locally to support the remote application that is using the data, which allows the end-user to use the data even when the mobile device is not connected with the server containing the data. The intermittent connection may then be used to send changes made by the remote application to the server and a pertinent set of changes from the server to the mobile device. This type of remote computing environment may be referred to as an Intermittently Connected Database (ICDB) environment. These environments may have a variety of remote applications that may be used in sales force automation, insurance claim processing, and mobile work forces in general.

The term "database synchronization" is often used to describe the process of maintaining data consistency and integrity among server databases and client databases on the mobile device. There are several methods that may be used to provide database synchronization. In some database synchronization systems, a time stamp may be associated with the exchanged data that specifies the date of the last update exchange. The server database and the client database use the time-stamp to determine which records have been modified and therefore need updated. Other methods may use bit-maps to mark records that may have changed. Still other methods may use "before values" to track changes made to the database. Typically, only records modified since the last data exchange are sent to the mobile device.

As set forth above, there are several different methods available for provisioning mobile devices to use a mobile access network. Provisioning a large number of mobile devices may be extremely difficult and time consuming. Existing methods of provisioning mobile devices may be earned out by the carrier or a combination of the carrier and end-user. Further, there are several different methods available for synchronizing data that may be contained on a database server with a client database located on the mobile device. Setting up the applications and business services that need to be synchronized on the mobile device may also be extremely difficult and time consuming. As such, a need exists for a method and system for provisioning a large number of mobile devices for access to business services and data synchronization.

SUMMARY OF THE INVENTION

The mobile provisioning tool system may be a web-based front-end that simplifies the process of provisioning a large number of end-users and mobile devices. It provides a company with wireless personal information management (PIM) functionality over general packet radio services (GPRS) or UMTS networks to end-users via a secure connection through a connector gateway system. The mobile provisioning tool system interfaces allow users to provision mobile devices and manage mobile services, customers, end-users, and authorizations. On the customer side, the provisioning tool system allows a Customer User or IT Administrator (IT Admin) to provision mobile devices as well as setup and manage end-users for a specific service. On the operator side, it allows an Operator or CRM Representative (CRM Rep) to setup customers (companies) as well as end-users for the service. The CRM Rep will also be able to manage business services, and authorization levels.

The mobile provisioning tool system provides security to prevent users from accessing accounts or services other than their own. Users will access the system using credentials stored in an Active Directory (AD), which will restrict the user's access to data relevant only to the business roles they are authorized to use. The mobile provisioning tool system is integrated with the connector gateway, which allows carriers to provide mobile users controlled and metered access to servers on remote company networks.

The majority of online users of the mobile provisioning tool system will be external IT Admins who will only have access to data related to their companies. Internal users include Supervisors and CRM Reps who will be able to perform functions above and beyond that of the IT Admin. The mobile provisioning tool system may consist of two separate views, or sites, and may provide functionality for three user types including an External Customer or IT Admin, an Internal Operator, and an Internal Supervisor. The Customer User, also known as an IT Administrator (IT Admin), will have access to an End-User Enrollment site which will provide the ability to subscribe, update, and remove end-users and provision software to mobile devices from the mobile provisioning tool system.

An Operator or CRM Representative (CRM Rep) may have access to the Customer Enrollment site which will provide functionality to add companies to the service and grant IT Admins access to the End-User Enrollment site. The Customer Enrollment site may also have access to the functionality available to IT Admins. A Supervisor may have super user access to the Customer Enrollment site that will provide functionality to control and manage authorizations for all accounts that have access to the mobile provisioning tool system. The Supervisor will also have additional capabilities to manage business services.

One of the purposes of the End-User Enrollment site is to allow the IT Admin the ability to add and manage end-users. When changes are made to an end-user via the mobile provisioning tool system, all necessary changes will also be made to the systems that are a part of the mobile provisioning tool system. This process may initially be accomplished through an e-mail interface. As the mobile provisioning tool system is implemented for each client, automatic system update functionality may be created according the client's needs.

The End-User Enrollment site may be broken into several web pages that provide the ability to manage end-users, provide a customized software menu and a software provisioning tool system. An Active Users page may be the starting point for end-user management, providing access to all other IT Administrator functions. The Active Users page may display the active end-user, their associated services, activation status, and Mobile number. The Active Users page allows the IT Admin to search for and display End-Users based on specific search criteria as well as export a data file containing the list to a spreadsheet file.

The IT Admin may add new users or edit and delete existing end-users. Only end-users with no active services may be permanently deleted from the mobile provisioning tool system. From the list of active end-users, the IT Admin may deactivate an account, blocking the end-user's access to services. From the list of inactive end-users, the IT Admin may re-activate an account. As such, the IT Admin page allows the provisioner to install software applications and business services as well as configure and setup network configurations and settings.

The mobile provisioning tool system may include an Offline Switchboard tool system that allows the IT Admin to customize a device menu application to meet the company's needs. As such, the Offline Switchboard tool system may allow the IT Admin to setup a device menu that provides access to all of the business services and applications that may be provided by the company. The IT Admin may add, delete, and reorder menu items and insert a customer logo so each end-user will see the same default menu items on each mobile device.

The End-User Enrollment site may also provide a software provisioning tool system that facilitates the download and installation of software and connection settings onto the mobile device via a web browser. The software provisioning tool may be a combination of Active Server Pages (ASP) and an ActiveX control that may be designed around Active Sync's Application Manager. In addition to downloading and installing software, the software provisioning tool system may also automatically configure a connection (i.e. Bluetooth, GPRS, UMTS, and so forth) within the device's connection manager that would otherwise have to be entered manually.

The software provisioning tool may save several minutes of manual configuration per mobile device on average. Manual configuration of mobile devices by end-users has been known to take hours of trial and error and is one of the most error-prone activities involving mobile device configuration. With the software provisioning tool, connections may be scripted and installed automatically using auto-extraction files or CAB files.

One of the purposes of the Customer Enrollment site is to allow the CRM Rep the ability to add and manage customers or companies. When changes are made to a customer via the mobile provisioning tool system, all necessary changes will automatically be made to the systems. The Customer Enrollment site may be broken into several pages that provide the following functionality in addition to that provided by the End-User Enrollment site.

An Active Companies page may be the starting point for customer management, providing access to all other CRM Rep functions. The Active Companies page may display active customers, their associated services, IT Administrator, activation status, and Internal ID number. The Active Companies page allows the CRM Rep to search for and display customers based on specific search criteria as well as export the list to a spreadsheet.

The CRM Rep may add new companies or edit and remove a company from the service. Only companies with no active services can be permanently deleted from the system. From the list of active companies, the CRM Rep may add or deactivate an account or unsubscribe a company from the service. From the list of inactive companies, the CRM Rep may re-activate an account.

A List Tool Users page may allow the Supervisor to manage all users who have access to the mobile provisioning tool system. The Supervisor may manage each tool user and associate them with a role, such as IT Admin, CRM Rep, or Supervisor. Each IT Admin user is also associated with a customer. CRM Reps have access to this page but may only be able to manage IT Admins.

The List Tool Users page allows the Supervisor or CRM Rep to search for and display users based on specific search criteria as well as export the list to a spreadsheet. From the list of active tool users, the Supervisor may manage authorization accounts in the AD. These pages will provide a front-end to the domain's active directory using lightweight director access protocol (LDAP) functions (i.e.—ADSI) to process requests. From a Blocked Users page, the Supervisor may unblock or delete users.

An Active Services page may provide information about all business services that are supported by the mobile provisioning tool system. The Active Services page allows the Supervisor to add, edit, and deactivate Business Services. For example, Microsoft Mobile Information Server (MIS) and Synchrologic Email Accelerator are two examples of business services that support mobile email and PIM. A Deactivated Services page displays a list of business services that have been deactivated. From this page, the Supervisor may reactivate or delete business services.

The mobile service bureau manages software configuration packages via the provisioning tool. Currently this is a manual process involving ad hoc SQL queries to the database. The mobile provisioning tool system may also generate traffic reports per user. The mobile provisioning tool may automatically perform configuration of software and connection settings for PocketPC and Palm devices. Support for other devices such as laptops, symbian devices, and so forth may also be included as part of the mobile provisioning tool system. In addition, the mobile provisioning tool system may include an import function that provides IT Admins with the ability to add or modify end-users in batch.

The connector gateway is an application that allows carriers to provide mobile users controlled and metered access to servers on remote company networks. The application may be implemented on top of Microsoft's Internet Security Acceleration (ISA) 2000 Server software, which provides firewall services for enterprise networks. ISA Server is an extensible platform that provides security, hardware redundancy, and load balancing and has a comprehensive software development kit (SDK).

The connector gateway server consists of a custom ISA application filter installed on an ISA server. ISA application filters may be extensions of the ISA Firewall service. These filters may provide the following functionality: 1) process inbound requests, performing Session, Service, and Server lookups; 2) create a single ISA session for each customer server, and 3) create data filter objects for each inbound request, driving the connection emulation.

The connector gateway proxies the connection between the mobile device and the customer server. Funneling traffic through the connector gateway provides a system to control and monitor service usage. Access is controlled using service provisioning tables. Usage is monitored using ISA logging functionality that may log all user traffic. These logs provide detailed usage information and may be migrated to a database server for report generation.

Applications on the user's mobile device will be configured with DNS names that translate to the appropriate addresses on the connector gateway server. DNS communication requests are routed to the connector gateway, which determines if the user is authorized to access the requested service and which corresponding customer server to contact. Multiple connector gateway servers can be logically grouped together to provide one logical connector gateway server, or they can be clustered to provide server redundancy.

The connector gateway works by listening for requests from mobile devices. When the request is received, the connector gateway performs a lookup to determine which customer server it should contact to complete the connection. To do this, the connector gateway may 1) determine a mobile identification number (MSISDN) using the source IP through a RADUIS server query; 2) determine the connector type and the service ID using the user's MSISDN and server IP used by the mobile device on the initial request; and 3) determine the remote customer server IP using the service ID.

Once the connector gateway has the customer server IP, it finds or creates a session filter for the customer server and a data filter that drives the emulation between the mobile device and the synchronization server. The data filter proxies the connection, pumping information between the mobile device and the server and logging the usage details. These log records can be used later to provide detailed usage input to a billing process.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 illustrates an exemplary add customer confirmation view of the mobile provisioning tool system.

FIG. 14 illustrates an exemplary list blocked tool users view of the mobile provisioning tool system.

FIG. 16 illustrates an exemplary add tool user confirmation view of the mobile provisioning tool system.

FIG. 19 illustrates an exemplary block tool user view of the mobile provisioning tool system.

FIG. 21 illustrates an exemplary active business services view of the mobile provisioning tool system.

FIG. 25 illustrates an exemplary deactivate business service denied view of the mobile provisioning tool system.

FIG. 26 illustrates an exemplary active user's view of the mobile provisioning tool system.

FIG. 27 illustrates an exemplary inactive user's view of the mobile provisioning tool system.

DETAILED DESCRIPTION OF THE PRESENTLY PREFERRED EMBODIMENTS

Mobile Provisioning Tool System

Figure 1:
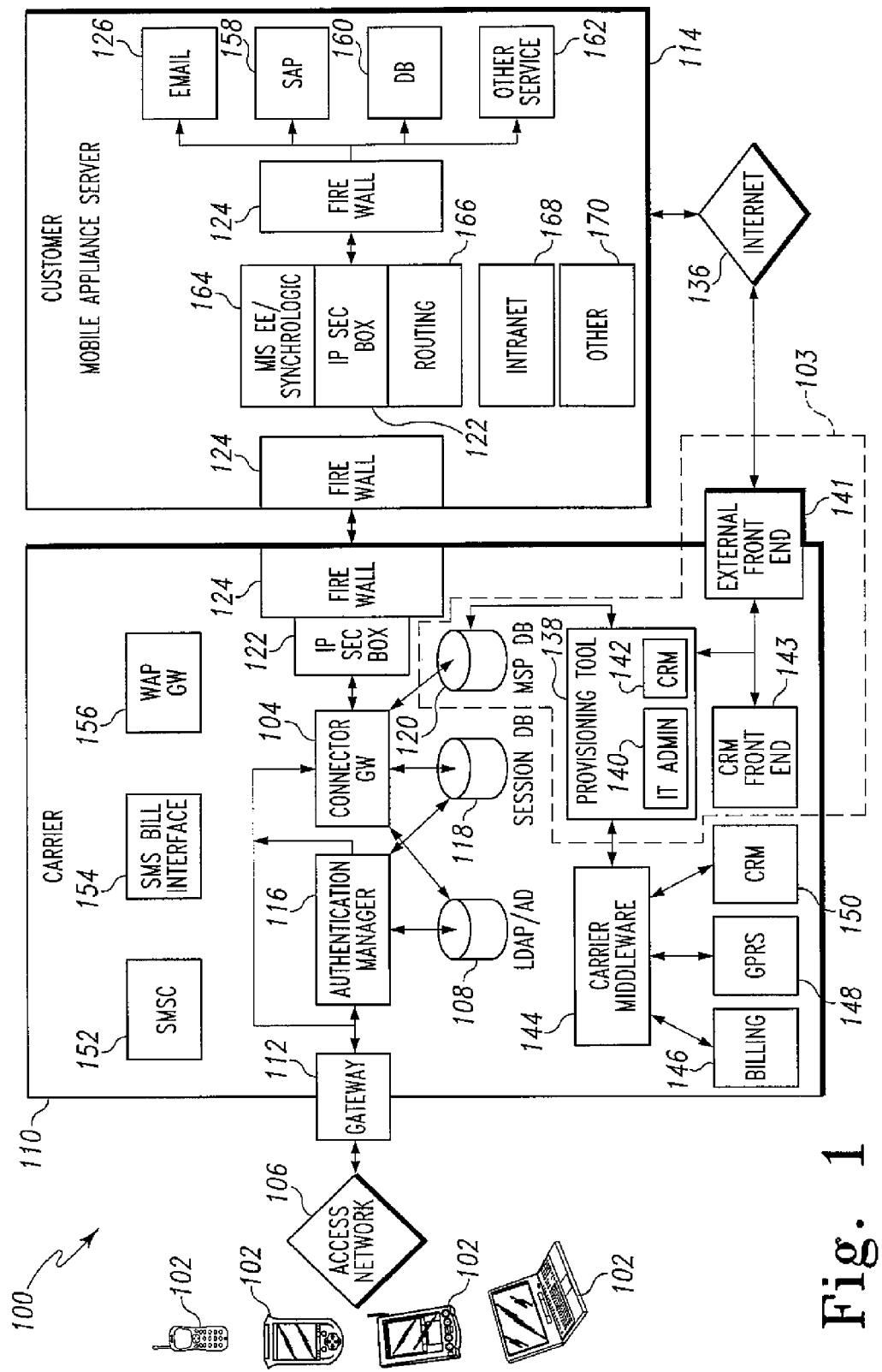
FIG. 1 illustrates the logical relationship between the mobile provisioning tool system and other relevant systems/interfaces.

Referring to FIG. 1, an embodiment of the present invention discloses a mobile service bureau system 100 that may be implemented as a web-based front-end that simplifies the process of provisioning a large number of end-user mobile devices 102. It provides a company with enterprise mobile data applications (e.g. wireless email and PIM functionality) for GPRS or UMTS networks designed for end-users via a secure connection through a connector gateway 104. The interfaces of a mobile provisioning tool system 103 allow various types of users to provision mobile devices 102 and manage mobile services, customers, end-users, and authorizations.

FIG. 1 shows a logical view and as such, it does not address the physical view, network view, or hosting of the individual components of the system. Different deployments may install these logical components in a variety of physical, network, and hosting arrangements. As such, the logical view set forth in FIG. 1 should be viewed in an illustrative sense and not as a limitation of the present invention.

On the customer side, the mobile provisioning tool system 103 allows a customer user or information technology administrator (IT Admin) to provision mobile devices 102 as well as setup and manage end-users for a specific service. On the operator side, the mobile provisioning tool system 103 allows an operator or customer relationship management representative (CRM Rep) to setup customers (companies) as well as end-users for the service. The CRM Rep will also be able to manage business services and authorization levels.

The mobile provisioning tool system 103 provides security to prevent users from accessing accounts or services other than their own. Users may access an access network (e.g. GPRS or UMTS) 106 using credentials stored in an active directory (AD) 108 using a lightweight directory access protocol (LDAP), which will restrict the user's access to data relevant only to the business roles they are authorized to use. The mobile provisioning tool system 103 is integrated with the connector gateway 104, which allows a carrier network 110 to provide mobile users controlled and metered access to various services and data on servers on a remote company network 114.

The majority of online users of the mobile provisioning tool system 103 will be external IT Admins who will only have access to data related to their companies. Internal users may include supervisors and CRM Reps who will be able to perform functions above and beyond that of the customer user. The mobile provisioning tool system 103 consists of two separate views, or sites, and provides functionality for three user types, which consist of an external customer user (IT Admin) 140, an internal operator (CRM Rep) and an internal supervisor 142.

The external customer user, also known as the IT Admin, will have access to an end-user enrollment site 140 which will provide the ability to subscribe end-users and provision software to mobile devices 102 from the mobile provisioning tool system 103. The internal operator or CRM Rep will have access to a customer enrollment site 142 which will provide functionality to add companies to the service and grant IT Admins access to the end-user enrollment site. The Customer Enrollment site will also have access to the functionality available to IT Admins. The internal supervisor will have super user access to the Customer Enrollment site, which will provide functionality to control and manage authorizations for all accounts that have access to the mobile provisioning tool system 103. The internal supervisor will also have additional capabilities to manage business services.

The main purpose of the end-user enrollment site 140 is to provide the IT Admin with the ability to add and manage end-users. When changes are made to an end-user via the mobile provisioning tool system 103, all necessary changes will also be made to necessary systems. This process will initially be accomplished through all e-mail interface 138-144. As the system is implemented for each client, automatic system update functionality will be created according the client's needs.

The end-user enrollment site may be broken into several pages that provide functionality to manage end-users, to customize software, and to install software. An active user's page may be the starting point for end-user management, providing access to all other IT Administrator functions. The active user's page displays the active end-user, their associated services, activation status, and mobile number. The page allows the IT Admin to search for and display end-users based on specific search criteria as well as export the list to a spreadsheet. The IT Admin may add new users or edit and delete existing end-users. Only end-users with no active services can be permanently deleted from the overall system. From the list of active end-users, the IT Admin may deactivate an account, blocking the end-user's access to services. From the list of inactive end-users, the IT Admin may also re-activate an account.

An offline switchboard tool allows the IT Admin to customize an offline device menu application to meet the company's needs. The IT Admin may add, delete, and reorder menu items and insert a customer logo so each end-user will see the same default menu items on each mobile device 102.

A software provisioning tool facilitates the download and installation of software and connection settings onto a mobile device 102 via a web browser. The software provisioning tool may be a combination of Active Server Pages (ASP) and an ActiveX control and may be designed around Active Sync's Application Manager. In addition to downloading and installing software, the software provisioning tool also automatically configures a connection (i.e. Bluetooth, GPRS, UMTS and so forth) within the device's connection manager that would otherwise have to be entered manually.

The software provisioning tool saves a considerable amount of time involved in the manual configuration of each mobile device 102. Manual configuration may take hours of trial and error and is one of the most error-prone activities involving the configuration of a mobile device 102. With the software provisioning tool connections can be scripted and installed automatically using CAB files, thereby saving time and money involved in setting up mobile devices 102.

The main purpose of the customer enrollment site is to provide the CRM Rep with the ability to add and manage customers or companies. When changes are made to a customer via the mobile provisioning tool system 103, all necessary changes will automatically be made to necessary systems. The customer enrollment site may be broken into several pages which provide the following functionality in addition to that provided by the end-user enrollment site: manage customers (companies), authorization management and manage business service types.

An active company's page may be the starting point for customer management, providing access to all other CRM Rep functions. The active company's page displays active customer(s), their associated services, the IT Administrator, activation status, and an internal identification (ID) number. The active company's page allows the CRM Rep to search for and display customers based on specific search criteria as well as export the list to a spreadsheet.

The CRM Rep may add new companies or edit and remove a company from the services provided by the mobile provisioning tool system 103. Only companies with no active services can be permanently deleted from the system. From the list of active companies, the CRM Rep may deactivate an account or unsubscribe a company from the service. From the list of inactive companies, the CRM Rep may also re-activate an account.

A list tool user's page allows the Supervisor to manage all users who have access to the mobile provisioning tool system 103. The Supervisor may manage each user and associate them with a role, such as IT Admin, CRM Rep, or Supervisor. Each IT Admin user is also associated with a customer. CRM Reps may have access to this page, but are only able to manage IT Admins. The list tool user's page allows the Supervisor or CRM Rep to search for and display users based on specific search criteria as well as export the list to a spreadsheet. From the list tool user's page, the Supervisor may manage authorization accounts in the active directory 108. These pages will provide a front-end to the domain's active directory 108 using lightweight directory access protocol (LDAP) functions (ADSI) to process requests. From a blocked user's page, the Supervisor may unblock or delete users.

An active services page provides information about all business services currently supported. This page allows the Supervisor to add, edit, and deactivate business services. A deactivated services page displays a list of business services that have been deactivated. From this page, the Supervisor may reactivate or delete business services.

Referring to FIG. 1, as set forth above the mobile service bureau system 100 may include a plurality of mobile devices (e.g.—mobile phones or terminals, PDAs, laptops, pocket PCs and so forth) 102 that are connected with a carrier network 110 via an access network 106. The carrier network 110 is an internet protocol (IP)-based network and the access network 106 is a wireless access network. In other embodiments, the access network 106 may be comprised of a wired connection to an access network and as such, the wireless access network 106 should be viewed as the preferred type of connection. The access network 106 may consist of a wireless network, a wireless LAN, or a wired network.

The carrier network 110 may include a gateway 112 that is connected with the wireless access network 106. The gateway 112 may be a wireless-to-IP conversion point (e.g.—Gateway GPRS Support Node (GGSN)) that acts as an interface between the wireless access network 106 and the external packet data network (e.g.—IP network). For example, the gateway 112 may convert GPRS packets coming from a serving GPRS support node (SGSN) into the appropriate packet data protocol (PDP) format (e.g. IP or X.25) and send them out on the corresponding packet data network to the destination. In the other direction, PDP addresses of incoming data packets may be converted to the global system for mobile (GSM) address of the destination user or mobile device 102. The readdressed packets may then be sent to the responsible SGSN. For this purpose, the GGSN may store the current SGSN address of the user and his or her profile in its location register.

A common usage scenario for the mobile service bureau system 100 may allow an end user of a mobile device 102 to initiate a data synchronization session from their respective mobile device 102. During the data synchronization session, the mobile device 102 may connect to the access network 106 and then the gateway 112 may convert the wireless data into an IP transaction that enters the carrier's physical network 110. After passing through the other end-to-end components as described herein, data may be wirelessly synchronized to the mobile device 102 from a customer mobile appliance server 122, 164, and 166 or customer network 114.

Data that may be synchronized to the mobile device 102 may be generated or based upon data that is contained in email and PIM applications that are associated with the end user and the customer network 114. PIM applications may be selected from a variety of applications that are programmed to organize names and addresses and random notes for fast retrieval. PIMs may provide a combination of features such as a contact list, calendar, scheduler, notes, and tasks.

Email and PIM allows the end user to enter text for any purpose and retrieve it based on any of the words typed in. PIM data may vary widely, but all forms of it attempt to provide methods for managing information the way that an end user may use it on a daily basis. In addition to PIM data, the data that may be synchronized to the mobile device 102 may be based on email data that is associated with the end user or other types of data files or applications/services that the end user uses for business purposes.

In the normal deployment scenario, a company's IT Administrator will be responsible for setting up mobile devices 102 for the end user. The IT Admin may set up access to the carrier network 110 through normal processes defined by the operator carrier of the network 110. These may be established processes by the carrier and may not be considered part of the mobile service bureau (MSB) offering. The IT Admin may install and/or configure any MSB software application that is required on the mobile device 102 using the mobile software provisioning tools described later in this application. For the purpose of the present invention, there are generally two approaches to selecting the target mobile device 102 for a business application.

The first approach may be to build the business application to be browser-based in order to support multiple types of mobile devices 102. If wireless application protocol (WAP) or short message service (SMS) mobile devices 102 are to be supported, then the solution has to assume wireless connectivity exists. Generally speaking, this approach is better suited to consumer applications because consumers are more likely to have a wide variety of mobile devices 102, including lower end phone types that are not able to store offline data or are only able to store a very limited amount of data.

Business applications that are required to be real-time (e.g.—financial transactions) should use the browser-based approach. It is recommended to test actual response times on the carrier network 110 prior to building the business application. There may be latency in many carrier networks 110 that may degrade performance and therefore usability. There are several approaches for building online business applications that support multiple mobile devices 102. Business applications may be written using XML and use XSL style sheets to format for each device browser type. A rendering tool may be used to convert HTML sites for viewing on each device browser type. Applications may be written using Microsoft's Mobile Internet Toolkit, which automatically detects and serves up content in the appropriate format for each device browser type. In addition, applications may be written using Microsoft's "Net" framework that is designed to support multiple types of mobile devices 102.

The second approach in selecting the target mobile device 102 for a business application may be to build the application targeted to specific "smart" mobile devices 102 to take advantage of their superior processing power and the ability to store data locally on the mobile device 102. If the mobile device 102 will support it, any business application for which it is appropriate to have offline/synchronized functionality should be built to work both with and without a wireless connection. In general, this approach fits the model for business applications better than consumer applications. Businesses can more easily cost-justify the purchase of higher end mobile devices 102 required to run offline/synchronized applications and can standardize on a single device type. For the consumer market, it is harder to cost-justify targeting specific mobile devices 102 because the more you target specific mobile devices 102, the more you limit the consumer audience which will be able to use the business application.

As illustrated in FIG. 1, the mobile service bureau system 100 may include an authentication manager 116. The authentication manager 116 is used to authenticate mobile devices 102 for access both to the carrier network 110 and to the MSB business service that is supplied by the customer network 114. To authenticate the end user of the mobile device 102, the authentication manager 116 may use data from the mobile device 102 and user data that may be stored in the active directory 108. The authentication manager 116 may insert a row into a session database 118 to activate the session and record what business services on the customer network 114 the end user is authorized to access, as well as other types of data or information.

The following points are potential places to authenticate users with the authentication manager 116 or the mobile device 102. The end user may set an option to require a password when the mobile device 102 is turned on or powered up. In addition, it is possible to use device management capabilities to enforce a power on password requirement even if the end user turns it off. The recommended approach would be to leave the decision to enable power on password up to individual end users and customer security administrators.

As generally set forth above, the mobile devices 102 will preferentially include a plurality of business applications that are designed to meet the needs of each respective entity or consumer. Each business application may be designed to require the end user to login in order to gain access to the business application contained on the mobile device 102. Credentials from the customer network 114 may be encrypted and stored on the mobile device 102 for validation against end user entered credentials when accessing data offline. The recommended approach would be to use this function to protect sensitive data in business applications (mobile access to SAP, Siebel, and so forth).

The authentication manager 116 may require the end user to authenticate when accessing the carrier network 110. In this embodiment, the carrier network 110 may authenticate the mobile device 102 based on a device ID as they enter the carrier's physical network 110. The recommended approach would be to authentication against a device ID already in place, which does not require the end user to manually enter a user name and password.

In yet another embodiment, the authentication manager 116 may require the end user to provide a user name and password whenever the end user is accessing a MSB business service or business application. As such, anytime the end user requests access to a business service or application using the mobile device 102, the end user may be required to authenticate with the carrier network 110 before the carrier network 110 will allow the end user access to the business service or application. The recommended approach would be to allow the project team to decide either to make changes to the carrier's existing authentication manager 110, active directory 108, and session database 118 or to implement the mobile solution platform (MSP) equivalents of these functions. If the MSP equivalents are implemented initially in order to get to market faster, there may be a longer term plan to integrate these functions into the components of the carrier network 110.

The end user may also be required to authenticate before gaining access to the customer network 114. In this embodiment, the carrier network 110 will not maintain or store user names and passwords for access to accounts on the customer network 114. Therefore, users will have to authenticate against the customer network 114 each time they log in to the customer network 114. User names and passwords for email/PIM groupware products (e.g.—MIS EE, Synchrologic RSS) may be stored in the applications. The recommended approach would be to store user names and passwords in groupware applications and require a login to business applications that may contain more sensitive data.

The connector gateway 104 may read in information from the session database 118 to determine who the user is and what services are being requesting (e.g.—email synch to PDA, intranet access, access to legacy application, and so forth). The connector gateway 104 may read in additional information about the user and the services being requested (e.g. the IP address of the relevant server) from a database 120.

As illustrated in FIG. 1, the mobile service bureau system 100 includes a connector gateway 104. The connector gateway 104 may send a request through the secure connection between the carrier network 110 and the customer network 114 to complete a transaction. The connector gateway 104 records usage information about the transaction in the database 120. In some embodiments, the connector gateway 104 is installed as a new mobile solution platform component on the carrier network 110. The database 120 may be implemented as a relational database for user and services information. Usage logging can be implemented either as part of the same relational database or as a flat file for maximum performance for high usage.

In some embodiments of the invention, the initial connector gateway 104 installation may be accomplished using four Windows 2000 servers. Two of these servers may be redundant servers for the logic of the connector gateway 104, possibly using Microsoft's Internet Security Acceleration Server and mobile solution platform code. The other two servers may be redundant domain controllers. The database 120 may be installed on two redundant servers. Preferentially, the database 120 may be designed around Windows 2000 servers running SQL 2000, but may be tailored for other database structures as well.

The two redundant connector gateway 104 servers installed on the carrier network 110 may each handle 3000 concurrent users (assumes Compaq Proliant DL380 or equivalent). Assuming 10% of total users are concurrent at peak times, an initial configuration should be able to handle 60,000 total users. Using these metrics, it may be estimated that one new server is required for each 30,000 additional users; however as server processing power increases this may change. Scalability of the database 120 is generally not a primary concern for initial installations, as the volume of data being stored in the database 120 is expected to scale beyond the 60,000 total users that can be handled by the initial installation of the connector gateway 104.

The connector gateway 104 provides access control capabilities to the MSB offering, whereby the carrier network 110 can monitor and control who accesses the service and which specific servers on the customer network 114 they can access. This has several important implications to the business. The billing system 146 can bill for usage of the service based in several different ways, can block out users who have not paid for service, can log user activity for management reporting, auditing, and to assist customer support in solving reported problems. In addition, it can offer differentiated pricing for access to different services (i.e. offer separate prices to access to email on PDA vs. access to email on laptop vs. access to intranet vs. access to each business application).

The connector gateway 104 may also provide several technical benefits. It can integrate with RADIUS session LDAP to control access based on device IP. Service access control may be based on a user profile stored in a secure SQL database, which prevents company A user from getting access to company B server. Access may be controlled by the company IT Admin via a secure website. It logs traffic for auditing and billing purposes. It can automate configuration and tie closely with the database 120. The connector gateway 104 may be built on top of Microsoft's Internet Security Acceleration Server, providing additional firewall, if necessary.

The chart below shows some of the current fields that may be used by the connector gateway 104 to log usage information, which may be stored in the session database 118.

| Field Name | Description |
| --- | --- |
| Client IP Address | This is the IP address for the GPRS session |
| Date | Date session was established |
| Time | Time session was established |
| Destination Host | Destination computer or server |
| Processing Time | Total time for operation |
| Number of Bytes Sent | Bytes sent |
| Number of Bytes Received | Bytes received |
| Session ID | Identifier for user session |
| Operation | Operation type (connection, protocol mapping, and so forth) |
| Status Code | Resulting code of operation |

In addition to these: Client end user names may be looked up in the active directory 108 based on a Client IP Address. Device type being used can also be ascertained based on an APN used to access the carrier network 110.

An IP security component 122 may be included on the carrier network 110 and the customer network 114 to provide security for connections made between the carrier network and the customer network 114. In addition, there may be a secure connection between the carrier network 110 and the customer networks 114, which may be established using a VPN or a leased line. A plurality of firewalls 124 may also be included on the carrier network 110 and the customer network 114 to provide additional security. Other security devices, systems and methods may also be used to establish a secure connection between the carrier network 110 and the customer network 114.

As set forth above, the customer network 114 may consist of at least a MSP Mobile Appliance Server (MAS) 122, 164, 166. In some MSB deployments (sometimes referred to as Wireless Application Infrastructure Provider or WAIP) a server is placed on the customer's network 114. This server may host groupware to extend existing customer email to the mobile devices 102. For example, in some MSB scenarios the groupware may either be Microsoft's Mobile Information Server 2002 Enterprise Edition or Synchrologic's RealSync Server 164. The server may terminate the customer side of the secure connection (IP Security component 122) between the carrier network 110 and the customer network 114. In addition, the server may route traffic to other servers on the customer network 114 as directed by the connector gateway 104.

Referring to FIG. 1, in order to synchronize a respective mobile device 102 with an email application 126 that may be provided through the customer network 114, the mobile device 102 may use the access network 106 of the carrier network 110. The mobile device 102 may access the email application 126 by generating a synchronization message that is sent through the access network 106 to the gateway 112, the authentication manager 116, the connector gateway 104, the IP security component 122, the firewalls 124, a synchrologic component 128 and a routing component 130. The routing component 130 may be used to route messages to and from respective sources and destinations. Once the synchronization message is received by the email application 126, the email application 126 will begin to synchronize data on a mobile email application located on the mobile device 102 what the appropriate data from the end user's account from the email application 126 located on the customer network 114.

[KC Note: Per our discussion, we should remove the 'Mobile Provisioning Application' box on FIG. 1 and the associated description here.

As set forth above, there may be two primary web-based provisioning tools that are included in the mobile provisioning tool system 103. The CRM provisioning tool 142 may be used by a CRM Rep to set up and administer customers and end users for MSB service. The CRM front end 142 may be a website that interfaces with the provision tools business logic to record company and end user information in the database 120 and interface with back-end systems on the carrier network 110 to validate and set up customers and end users for billing and so forth. The IT Admin provisioning tool 140 of the provisioning tool component 138 may be used by the IT Admin of a customer to set up and administer end users for MSB service.

The external front end 140 may be a website that interfaces with the provisioning tool component 138 to record end user information in the MSP database 120 and interface with back-end systems on the carrier network 110 to validate and set up end users for authentication, billing, and so forth. The IT Admin provisioning tool 140 also includes functions to establish an MSP menu tailored to the company and to more easily provision end user devices 102.

In the normal deployment scenario, depending on the project requirements for availability and carrier policies on the nature of the separation of presentation and business logic, the MSP provisioning tools can be implemented in a variety of ways. The specific deployment will be determined by the joint carrier and an installation project team as appropriate for each installation. Because there are different security requirements for the CRM provisioning tool and the IT Admin provisioning tool, these may be on separate domains and therefore on separate servers.

As set forth in greater detail below, the CRM provisioning tool 142 may provide the following functions: add new customers to the MSB service; view, edit, and delete information about existing MSB customers; add new end users to the MSB service; view, edit, and delete information about existing MSB end users; add new services (PDA access to email, laptop access to email, intranet access, business apps, etc.); view, edit, and delete information about existing MSB services; manage IT Administrators; manage authorizations; view logging and detailed server status to assist in troubleshooting problems encountered by end users; link to instructions site for pairing phone and PDA; MSB menu configuration/personalization (tailor look-and-feel, add comp any logo, set up links to other sites and applications from company menu); automated Pocket PC device configuration (configure ActiveSync for MIS (or install and configure iMobile for Synchrologic RSS), install MSB menu); and automated/scripted Palm device configuration (install and configure iMobile for Synchrologic RSS, install MSB menu). Generally speaking, the IT Admin provisioning tool 140 may provide the following functions: view company statistics (number of end users enrolled in MSB, status of end users, etc.); add new end users to the MSB service; view, edit, and delete information about existing MSB end users; link to instructions site for pairing phone and PDA; MSB menu configuration/personalization (tailor look-and-feel, add company logo, set up links to other sites and applications from company menu); automated Pocket PC device configuration (configure ActiveSync for MIS (or install and configure iMobile for Synchrologic RSS), install MSB menu); and automated/scripted Palm Device Configuration (install and configure iMobile for Synchrologic RSS, install MSB menu).

Referring to FIG. 1, the carrier network 110 may include a carrier middleware component 144. In some cases, the carrier network 110 may have an existing carrier middleware component 144 that controls the interfaces with its relevant back end systems. The back-end systems that typically interface with the MSB may include a billing component 146, a contracts component (not illustrated, but often included in the billing component 146), a lightweight directory access protocol directory component (not illustrated), a general packet radio service (GPRS) component 148 and a customer management component 150.

The mobile provisioning system tool 103 may interface with the carrier middleware component 144 to automatically perform the necessary back-end system validations and updates that are required to set up and manage customers and end users. Some validations and updates (e.g. setting up contracts) may be required by legal or corporate policy requirements to be done manually. Others may be done manually depending on the cost or schedule to automate.

The billing component 146 may be responsible for billing customers or end users for using the carrier network 110. In other words, the billing component 146 may monitor usage of the carrier network 110 and charge the end user based on what type of contract the end user has with the operator of the carrier network 110. The GPRS component 148 may be responsible for controlling access to the carrier network 110 by mobile devices 102. The GPRS component 148 may allow mobile devices 102 to use the carrier network 110 to communicate with other devices and to send and receive data over the carrier network 110. The customer management component 150 may allow customer service representatives to set up, configure and delete end users. The billing component 146, the GPRS component 148, and the CRM component 150 are illustrative of typical backend systems with which the provisioning tools may interface through the carrier middleware 144. They are not meant to be an exhaustive list. Other relevant systems include procurement, mediation, contracts and so forth.

As further illustrated in FIG. 1, the carrier-network 110 may also include a short message service connector component 152, a short message service billing component 154 and a wireless access protocol gateway component 156. The short message service connector component 152 allows mobile devices 102 to send and receive short messages over the carrier network 110 to various other types of devices that are capable of sending and/or receiving short messages. The short message service billing component 154 may keep track of usage of the short message service connector component 152 by end users and will bill the end users for use of the service based on their respective contractual terms with the owner of the carrier network 110. The wireless application protocol gateway 156 provides a gateway for the mobile devices 102 to use and gain access to various types of Internet or web based services.

In one embodiment, end users set up rules for email-driven or application-driven notification of predetermined events. If a predetermined event occurs on the customer network 114 that meets criteria established by the end user, an email component 126, an SAP component 158, a database component 160 or any other type of business service 162 (such as PIM) on the customer network 114 may generate a short message service alert. The short message service alert may travel from the customer network 114 to the short message service billing component 154 to be recorded for billing (if carrier bills for SMS), and then on to the short message service connector component 152 for delivery to the appropriate mobile device 102.

The mobile solution platform (MSP) disclosed herein may support email-driven notifications and data-driven notifications. Email-driven notifications are short message service alerts that may be generated when the user receives an email that meets some predefined user criteria. For example, "Send me an SMS when I receive an urgent email from my boss". There may also be direct support for email-driven notifications from other PIM functions (e.g.—Calendar, Contacts, Tasks, and so forth). However, the most commonly requested interface to the Calendar function (i.e. "Notify me when I receive a new meeting request") may be handled by forwarding the email that normally accompanies a meeting request.

Data-driven notifications are short message service or email alerts that are generated when an update to a database meets some predefined use criteria. From a user's perspective, this appears as if there is an automated agent looking for information on the user's behalf. For example, "Send me an SMS when there is a traffic incident on the road where I normally commute at the time I normally commute". There are a wide variety of potential data-driven notifications. When building an application using the MSP, the potential for data-driven notifications will be evaluated on a case-by-case basis.

End users may set their preferences for email-driven notifications using a rules engine that may come with the email client on their laptop/desktop computer. One common rules engine may be found in Outlook 2000 and Lotus Notes, both of which allow users to establish a wide variety of rules. Outlook's Rules Wizard allows users to be notified when they receive any message, a message from a specific person or distribution list, a high priority message, a message with specific words in the subject or body, a message sent only to the end user, a message where the user is in the To:, a message where the user is in the CC:, etc. It also allows the end user to specify up to 24 different exceptions (i.e.—don't forward notes with attachments) to further filter messages about which they are notified.

Lotus Notes' Create Agent function also allows end users to be notified when they receive any message, a message from a specific person or distribution list, a high priority message, a message with specific words in the subject or body, a message sent only to the user, a message where the end user is in the To:, a message where the user is in the CC:, etc. In addition, it allows the end user to specify a large variety of both positive and exception criteria in any field in the email.

As previously set forth, the mobile provisioning tool system 103 may be a web-based front-end that allows a Customer's IT Administrator to provision devices 102 as well as setup and manage end-users for various types of mobile services. Another aspect of the mobile provisioning tool system 103 allows the CRM Account Processing (CRM) team to setup customers (companies) as well as end-users for mobile services. Provisioning tool Supervisors or administrators will also be able to manage business services and authorization levels. The mobile provisioning tool system 103 simplifies the process of provisioning a large number of customers and end-user mobile devices 102.

In one preferred embodiment of the present invention, Microsoft products may be used to develop the mobile provisioning tool system 103. Although Microsoft products may be used in one preferred embodiment, those skilled in the art should recognize that other products may be used as well. Some of the technologies used to develop the mobile provisioning tool system 103 may include Active Server Pages (ASP), ActiveX Data Objects (ADO), Component Object Model (COM/COM+), ActiveX and Style Sheets. Some of the languages used may include HyperText Markup Language (HTML), Extensible. Markup Language (XML), VB Script, JavaScript, Visual Basic (VB) and Structured Query Language (SQL).

Some of the software used may include Windows 2000 or higher, SQL Server 2000, Internet Information Server 5.0 (IIS), Microsoft Transaction Server (MTS) and Message Queuing Services (MSMQ). Finally, some of the end-user platform requirements may include an Internet connection speed of a predetermined bit rate, a web browser, a Windows 2000 and above workstation, Pentium Processor or better, Active Sync 3.5, Visual Basic 6 Runtime, Pocket PC 2002 device (preferably Bluetooth-enabled) and a GPRS phone (preferably Bluetooth-enabled).

The customer network 114 may include a mobile middleware component 164 (e.g. Microsoft Mobile Information Server Enterprise Edition (MIS EE) or Synchrologic Email Accelerator (SEA) for email) that may be used to help synchronize data from the various business services 126, 158-162 offered on the customer network 114 with data files contained on the mobile devices 102. User names and passwords are contained in the customer's LDAP directory that authenticates the end-user to be able to synchronize data from the email and PIM applications 126, the SAP application 158 (for example), the customer database 160 (for example) and other back end applications 162.

The customer network 114 may also include a routing component 166 that is used to route packets of data to and from the carrier network 110 and the customer network 114. The routing component 166 may be used to transfer the synchronization data from the business services applications 128, 158-162 to the mobile devices 102. The customer network 114 may also include an Internet component 168 that may provide various types of company news and data. The mobile devices 102, when authorized, may be able to access the Internet component 168. Other applications 170 may also be included on the customer network 114 that are capable of being used or synchronized to the mobile devices 102.

Login

Figure 2:
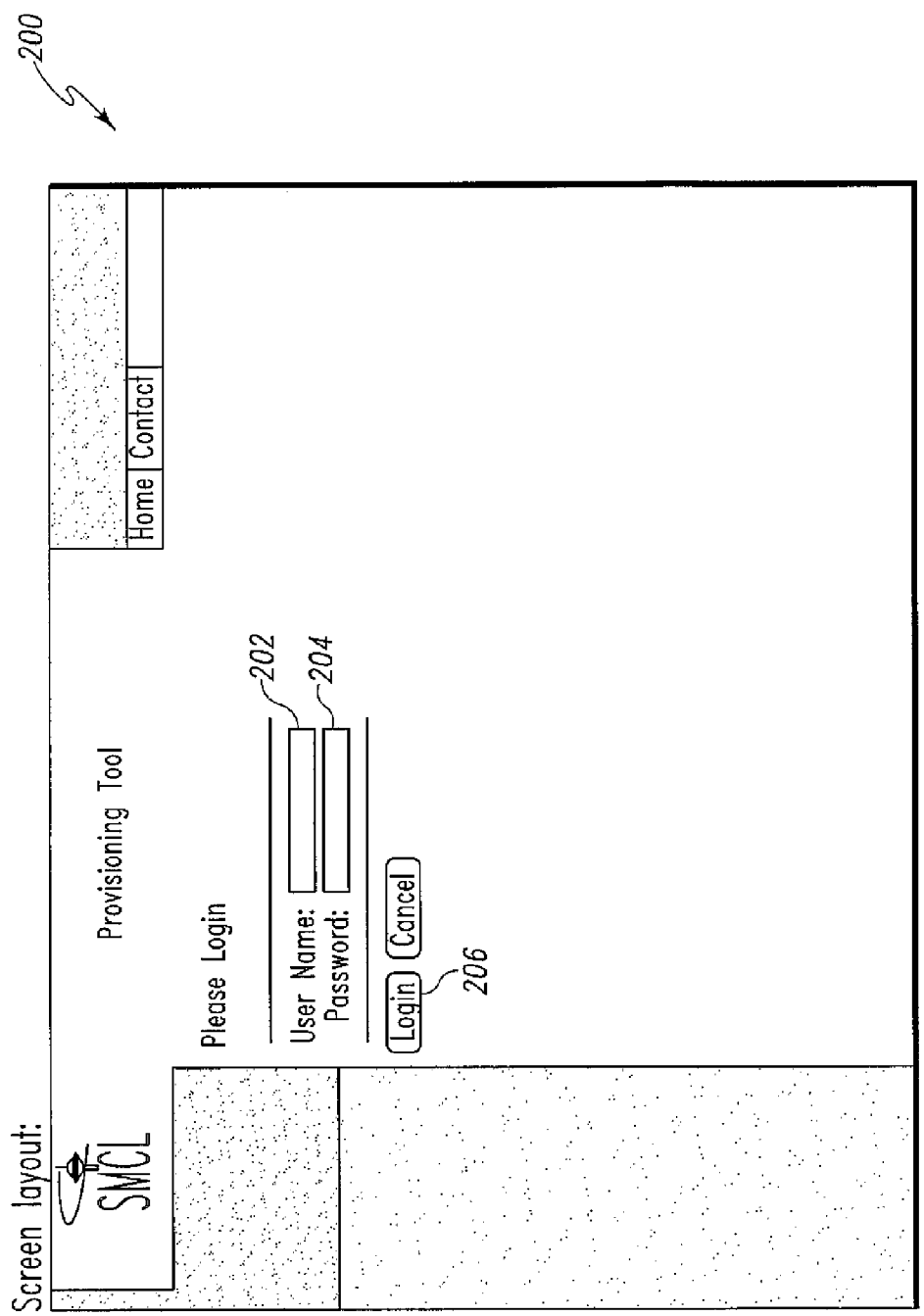
FIG. 2 illustrates an exemplary initial provisioning tool login view of the mobile provisioning tool system.

Referring to FIG. 2, as previously set forth, the mobile provisioning tool system 103 may be located on a website at a predetermined web address. As such, for a user to access the mobile provisioning tool system 103, they may have to access the website at the predetermined web address. After a user goes to the website, an initial provisioning tool login view or page 200 may be generated that may request user authentication. The initial provisioning tool login view page 200 is a custom logon screen that allows the user accessing the mobile provisioning tool system 103 to provide credentials (e.g., a user name 202 and a password 204) that provides access to an appropriate provisioning tool view. Once the user clicks or selects a Login button or link 206, a back end process may send the username 202 and the password 204 to the active directory 108. The active directory 108 may be used to authenticate all users of the mobile provisioning tool system 103.

After querying the active directory 108, the following checks may be performed: a password check, a check of the expiration date of the account and a check to see if the account is blocked. If these checks are successful, the mobile provisioning tool system 103 may lookup what authorization rights can be assigned to the user (security group). Security groups will be maintained in the active directory 108. Based on the security group, the user will be granted access to only the data and functionality that he/she is authorized to access. So, customer users will not have access to other customer's data Consequently, CRM Representatives will not have access to all of the functionality provided to Supervisors (Administrators). Although not illustrated, if any of the security checks above fail or a cancel button is selected, an "Access Denied" screen or page will be generated.

Customer Management—List Customers—Active Customers View

Figure 3:
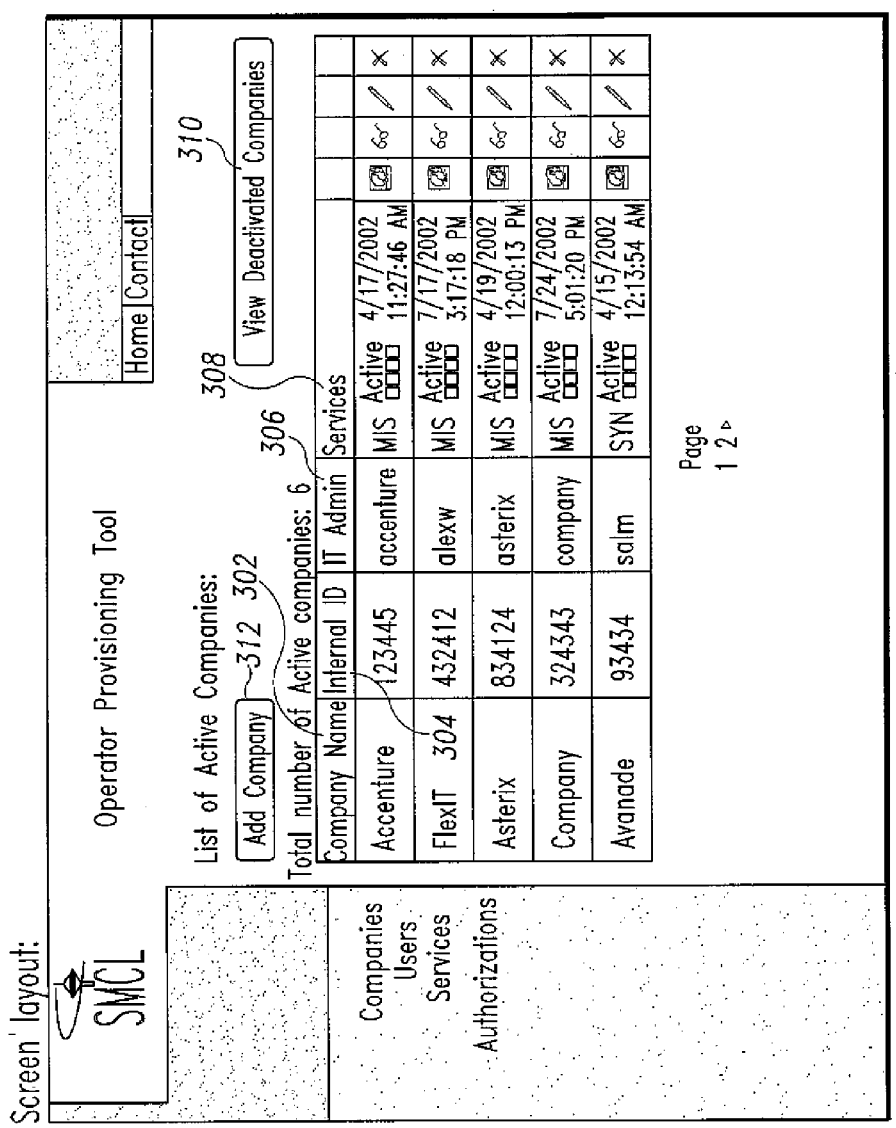
FIG. 3 illustrates an exemplary active customer's view of the mobile provisioning tool system.

Referring to FIG. 3, an active customer's view 300 may be generated after the initial provisioning tool login view 200, which will depend on the type of user that is logging in to the mobile provisioning tool system 103. The active customer's view 300 may list all active customers 302 under a company name category, along with an associated internal company D 304 and an IT Administrator 306 that is associated with the customer 302. All business services 308 that have been subscribed to by the active customer 302 may also be listed on the active customer's view 300. From the active customer's view 300, a CRM Rep may link to various types of customer information as well as manage end-users for each of the customers 302. The active customers view 300 may serve as the starting point for CRM Reps.

Although not illustrated, given that thousands of customers 302 may be signed up for mobile business services 308 using the mobile provisioning tool system 103, the CRM Rep may also be able to enter a search to narrow down the list of customers 302. For example, the user may be able to enter the first few letters of a customer's name and click a search button, which will retrieve a list of matching customers 302. Search results may be broken down into "pages" for easier viewing. This way, CRM Reps can page through a large list of customers 302. The user may also be able to search using the customer ID 304 or the name of the IT Administrator 306.

Although not illustrated, the active customer's view 300 may also include an export button that exports all customers 302 to a spreadsheet file. The list of active customers 302 may be stored in an active customer's database located on the MSB server 132. The CRM Rep may also be able to detail a specific search based on a field and then export this list to excel. Active customers 302 have subscribed to a mobile service 308 and have the ability to subscribe and unsubscribe end-users to any respective mobile service 308. Inactive customers 302 have once subscribed to a mobile service 308 but have since unsubscribed to all of the mobile services 308. Their information may still be kept on record in case these customers 302 choose to reactivate certain business services 308 or subscribe to new services 308 as they become available.

As illustrated in FIG. 3, the active customers view 300 may also include a view deactivated company button 310 and an add customer button 312. The view deactivated company button 310 may open a deactivated company page that lists customers 302 that are associated with the CRM Rep that have been deactivated. The add company button 312 may open an add company page that allows the CRM Rep to add a new company by entering several network criteria and business services 308 that have been requested by the customer.

Figure 4:
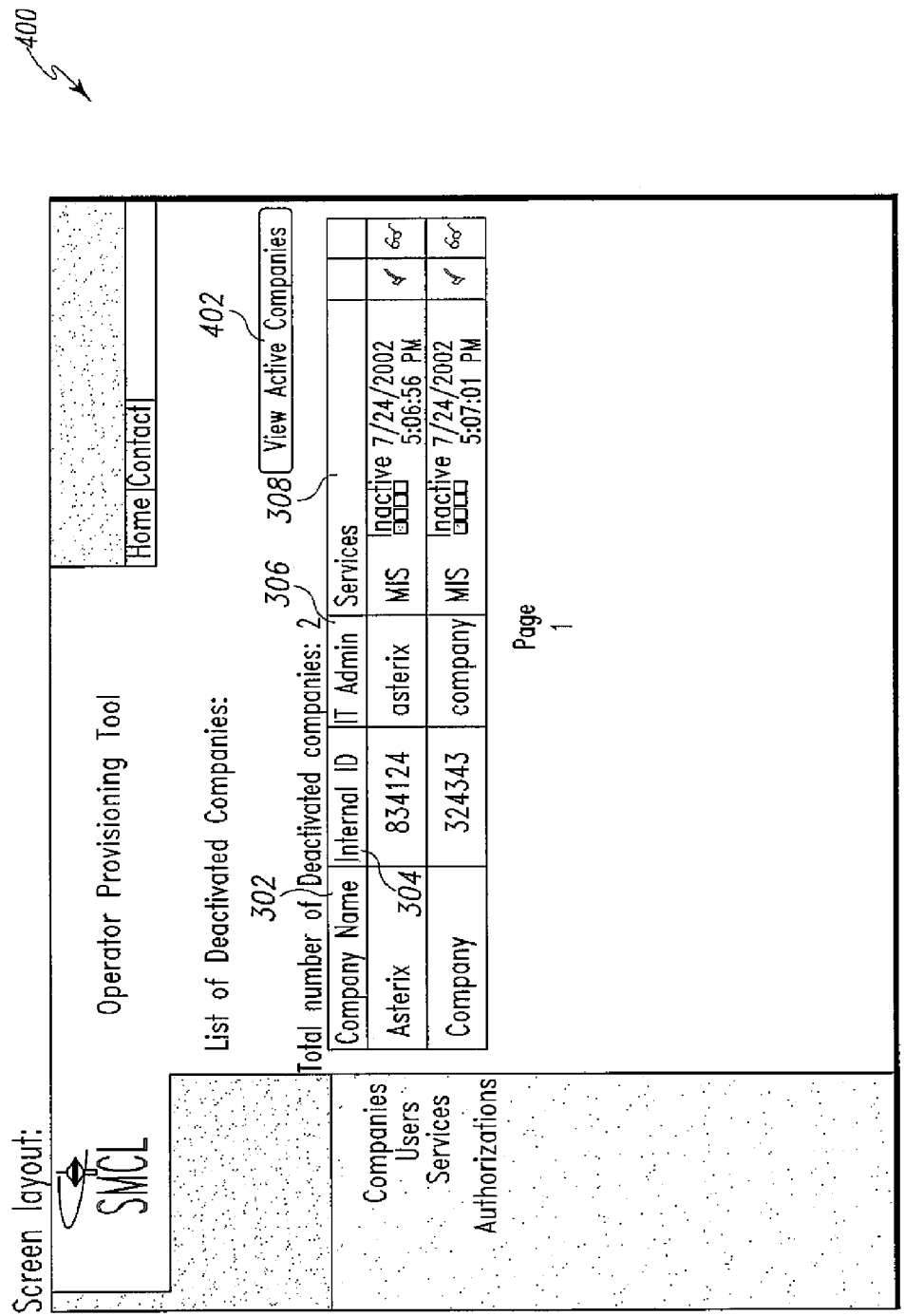
FIG. 4 illustrates an exemplary inactive customer's view of the mobile provisioning tool system.

Referring to FIG. 4, by selecting the view deactivated company button 310 an inactive customer's view 400 may be generated that lists all inactive customers 302 along with their associated Internal ID 304 and IT Admin 306. All business services 308 that have once been subscribed to by the customer 302 may also be listed. The inactive customers view 400 may allow the CRM Rep to re-activate disabled customers 302 as well as delete (clean up) customers 302 that will never be re-activated. A view active companies button 402 may also be included that will generate an active company or customer page that contains a list of all active companies together with their respective internal ID 304, IT Admin 306 and a list of services 308.

Although not illustrated, the mobile provisioning tool system 103 user may also be able to enter search criteria to narrow down the list of customers 302 or generate a different list of customers 302. For example, the user may enter the first few letters of a customer's name and click a search button, which will bring back a list of customer names that include the search term(s). Search results may be broken down into "pages" for easier viewing. This way, CRM Reps can page through a large list of customers 302. In addition, although not illustrated, an export button may also be included to export all users to a spreadsheet file. The CRM Rep may also be able to enter a specific search based on a field and then export this list to a spreadsheet file.

Figure 5:
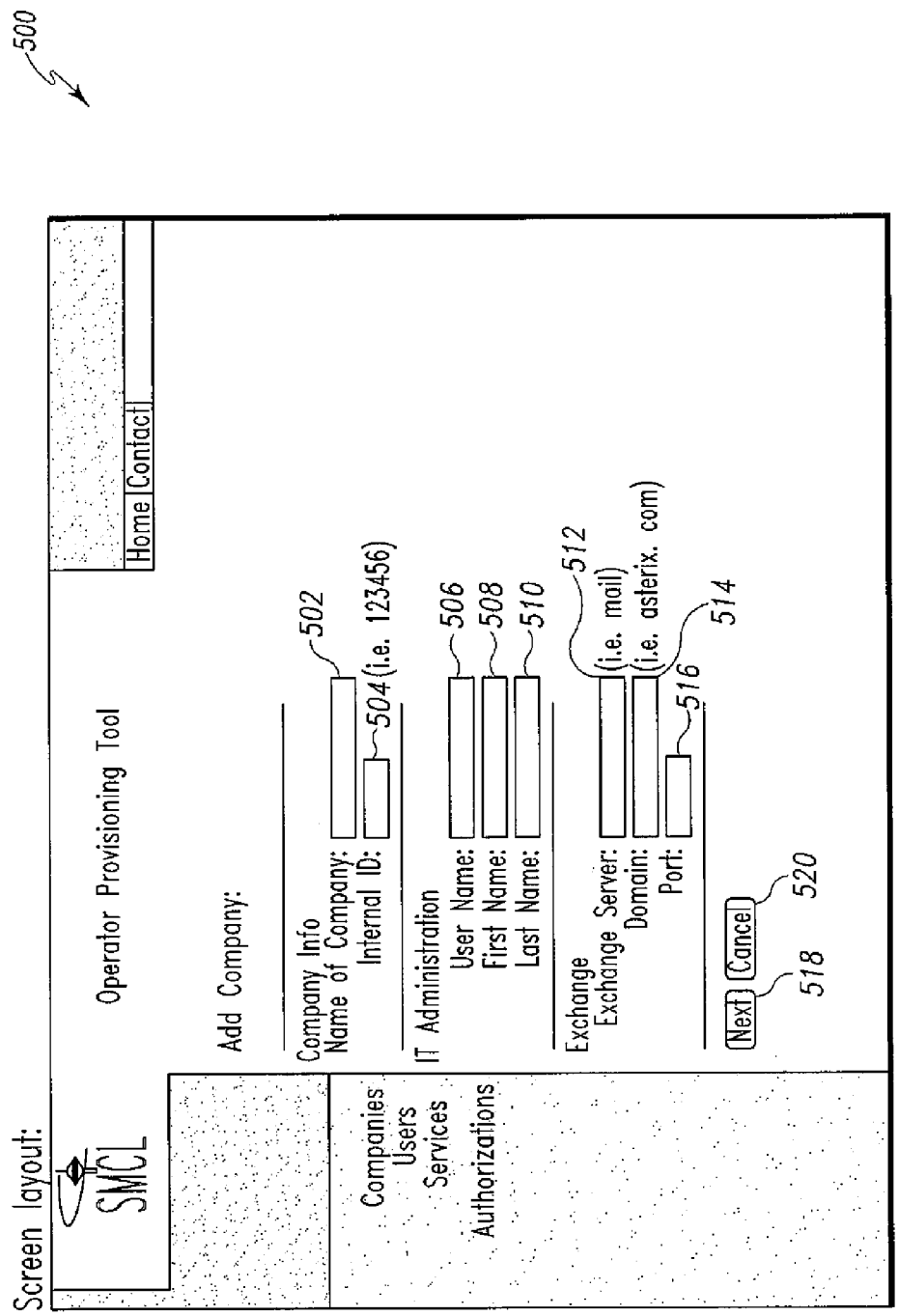
FIG. 5 illustrates an exemplary add company view of the mobile provisioning tool system.

As illustrated in FIG. 5, selecting the add customer button 312 may generate an add customer view 500, which is the initial input screen for adding new customers 302. The add company view 500 may assume that the customer 302 has already been created in the billing systems. Thus, the internal ID 304 and customer number may be known beforehand. The customer's Exchange information may also be known. AU of this information may be submitted in a service request form prior to input into the mobile provisioning tool system 103.

The add customer view 500 may contain a plurality of data entry fields that may be filled in by the CRM Rep. The data entry fields may include a customer name field 502, an internal ID field 504, a User Name field 506, a First Name field 508, a Last Name field 510, an Exchange server field 512, a Domain field 514, and a port field 516. The customer name field 502 provides the CRM Rep with a location to enter the name of the company for which the account is being created. The CRM Rep is also provided with the ability to enter information for an IT Admin that will be responsible for the customer. The User Name field 506, the First Name field 508 and the Last Name field 510 are used to enter information about the IT Admin. Later, CRM Reps may create as many such users for each customer.

The Exchange server field 512 is used to enter data about the name of the customer's exchange server (i.e.—mail server). The Domain field 514 is used to enter data about the address of the customer's web server or Internet site. The Port field 516 is used to enter data about the pathway into and out of the customer's web server or Internet site. A Next button 518 is used to take the CRM Rep to the next page in the add customer process or a Cancel button 520 may be used to cancel the process of adding the new customer.

Figure 6:
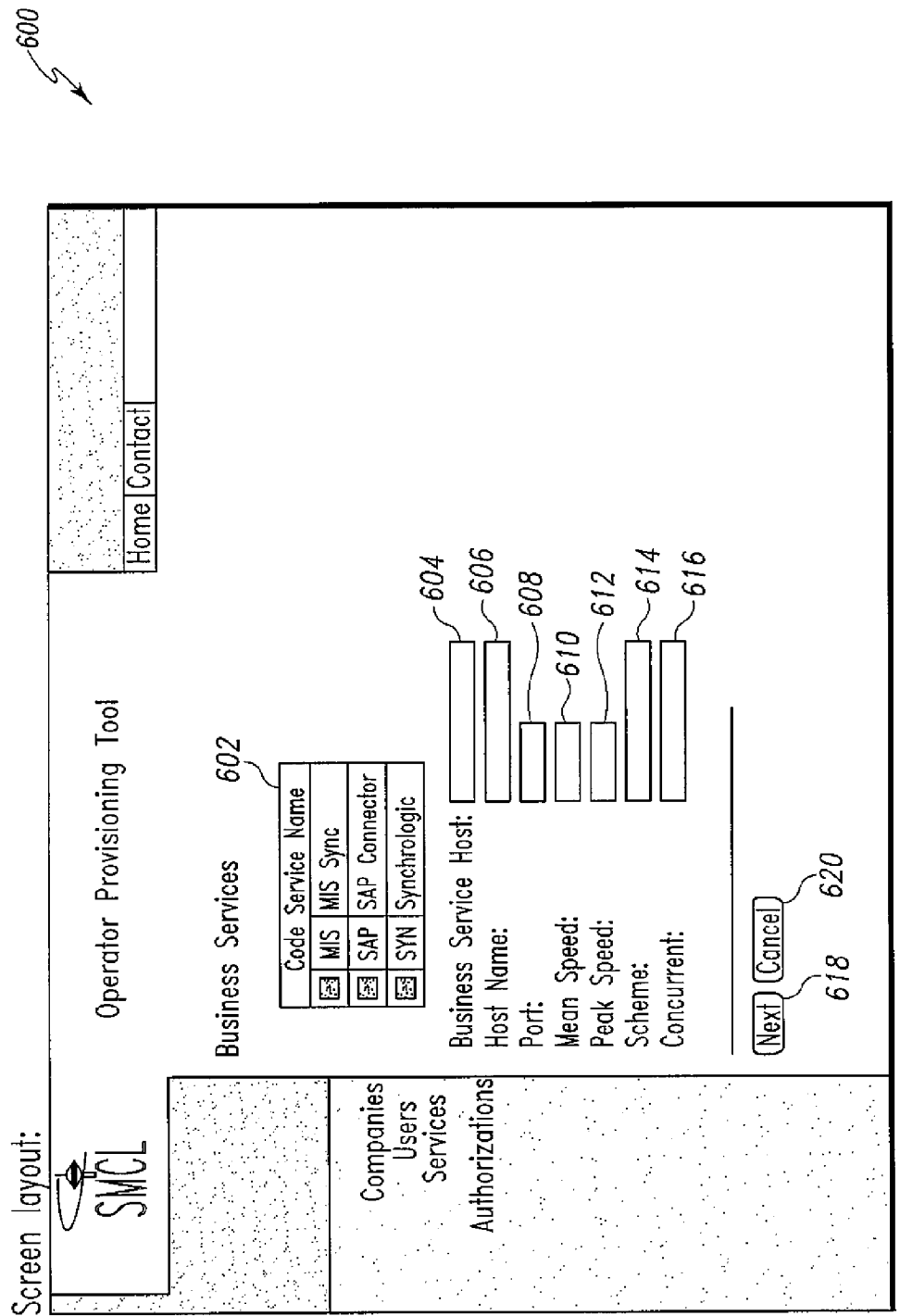
FIG. 6 illustrates an exemplary add customer business service view of the mobile provisioning tool system.

As set forth in FIG. 6, after the Next button 518 on the add company page 500 is selected, an add customer business service view 600 may be generated by the mobile provisioning tool system 103. This may be the second screen in the Add Customer process. The add customer business service view 600 may be used to subscribe a customer to one or more of the mobile business services provided to the customer network 114. Applicable customer server information will also be filled in here. This information will specify host names and server specifics for any of the business services (e.g. MIS or SEA) located on the customer network 114.

As illustrated, a service select field 602 is provided that allows the CRM Rep to pick at least one mobile service to which the customer will subscribe. The service select field 602 may contain a plurality of mobile services such as Microsoft Mobile Information Server (MIS), Session Announcement Protocol (SAP) Connector, Synchrologic and so forth. Several other types of mobile services may also be included and those listed above should be construed in an illustrative sense and not as a limitation of the present invention.

A business service host field 604 may also be included that allows the CRM Rep to enter data about the business service host, which is the computer that will act as the source of information or data signals for the mobile services. A host name field 606 may also be included that allows the CRM to enter a fully qualified domain name or IP address of the customer network 114 to be resolved by the connector gateway 104 that is part of the mobile provisioning tool system 103. A Port field 516 may be included for entering data about the pathway into and out of the customer's web server or Internet site that will be used to provide the respective mobile services.

A mean speed field 610 may be included for allowing the CRM Rep to enter data relating to the speed in bits per second that may be sustained for longer transfers. A peak speed field 612 may be included for entering data relating to the speed in bits per second that may be allowed for transfers above the mean speed but for less than a maximum size of bits. A scheme field 614 may be included for entering data relating to whether or not data that is sent through the gateway will be encrypted or not. A concurrent field 616 may be included for entering data relating to the maximum number of connections that will be accepted by the customer network 114 at any given point in time. A Next button 618 may be included for taking the CRM Rep to an add customer confirmation page and a Cancel button 620 may be included for canceling the process of adding a new customer.

Referring to FIG. 7, an add customer confirmation view 700 may be generated by the mobile provisioning tool system 103 after the CRM Rep completes the process of entering data in the add customer business service view 600. As illustrated, the add customer confirmation view 700 lists all of the information that has been entered using the previously discussed pages. The add customer confirmation page 700 gives the CRM Rep a chance to abort the addition of the new customer. Selecting a Save button 702 will cause the information to be saved by the mobile provisioning tool system 103 in the customer database of the MSB server 132. Selecting a Cancel button 704 will lose all of the information that has been entered up to this point and cancel the process.

If the CRM Rep decides to save the new customer by selecting the Save button 702, a number of processes will be kicked off by the mobile provisioning tool system 103 that are invisible to the user. First, although not illustrated the customer's information will be saved in a provisioning tool database. Second, that customer's primary tool user is created in the active directory 108. This will allow that customer's user or IT Admin to log on and provision end-users to use the mobile business services. Finally, all business service host information is saved to the provisioning tool database and will immediately be loaded into a connector gateway lookup table. So, when an end-user first uses one of the mobile services, all traffic will first route through the connector gateway 104. The connector gateway 104 will then look up the corresponding customer's business service host based on the end-user's mobile connection details (similar to a proxy) uploaded in the provisioning tool database and the connector gateway lookup table.

Figure 8:
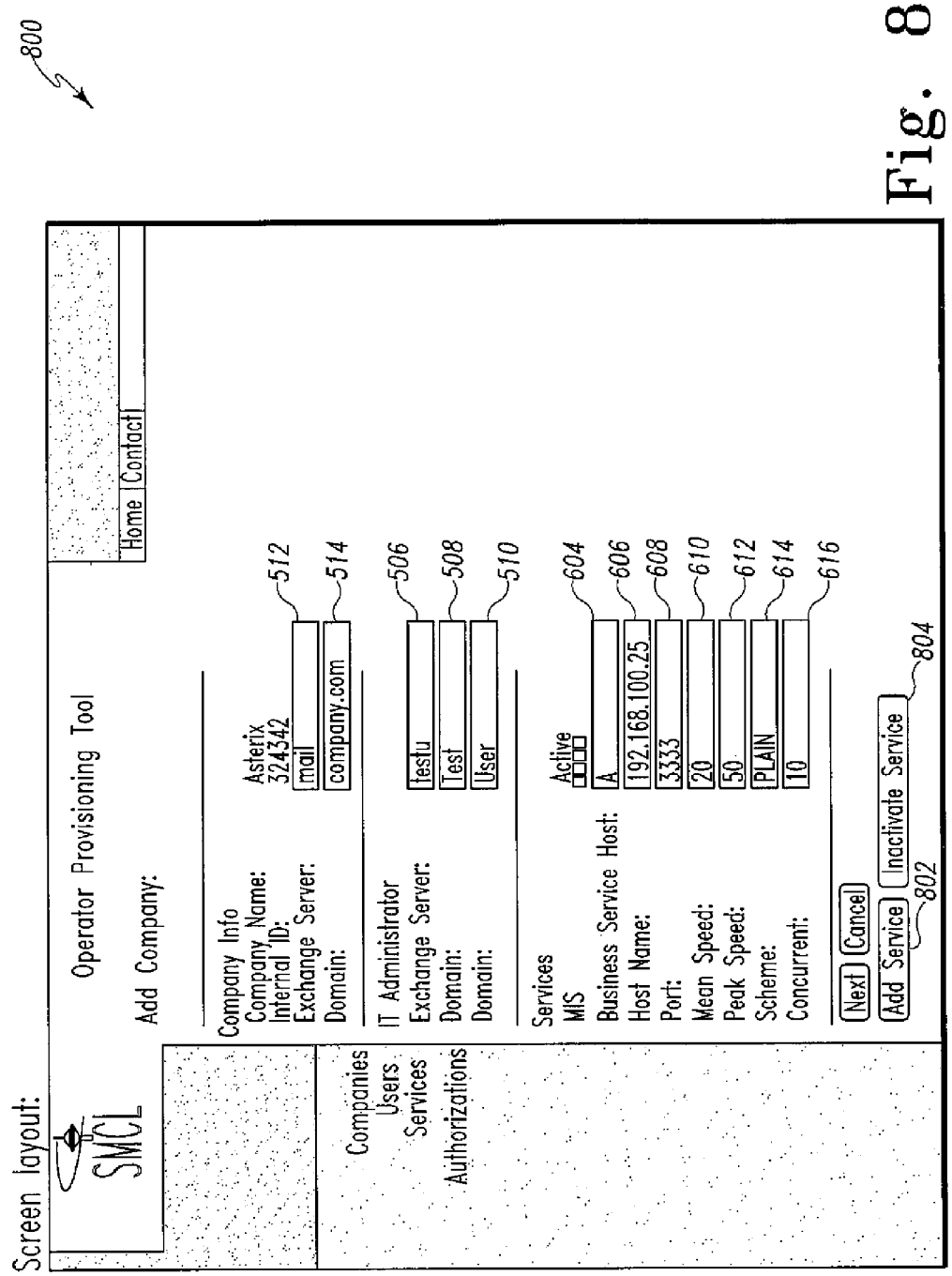
FIG. 8 illustrates an exemplary edit customer view of the mobile provisioning tool system.

Referring to FIG. 8, the mobile provisioning tool system 103 may also include an edit customer view 800 that allows the CRM Rep to change or update customer information. This may include the activation and deactivation of mobile services, which may be accomplished by selecting an add service button 802 and a inactivate service button 804. The following details may also be changed: Exchange server 512 and domain 514; IT Administrator information 506-510; Business Service Host information 604-616. Note that the customer name and Internal ED may not be editable. Also note that there may be customers with the same company name. However, their Internal ID numbers will always be unique. Selecting a Next button 806 may cause the mobile provisioning tool system 103 to generate a confirmation view similar to the add customer confirmation page 700 and selecting a Cancel button 808 will cancel the editing process.

Figure 9:
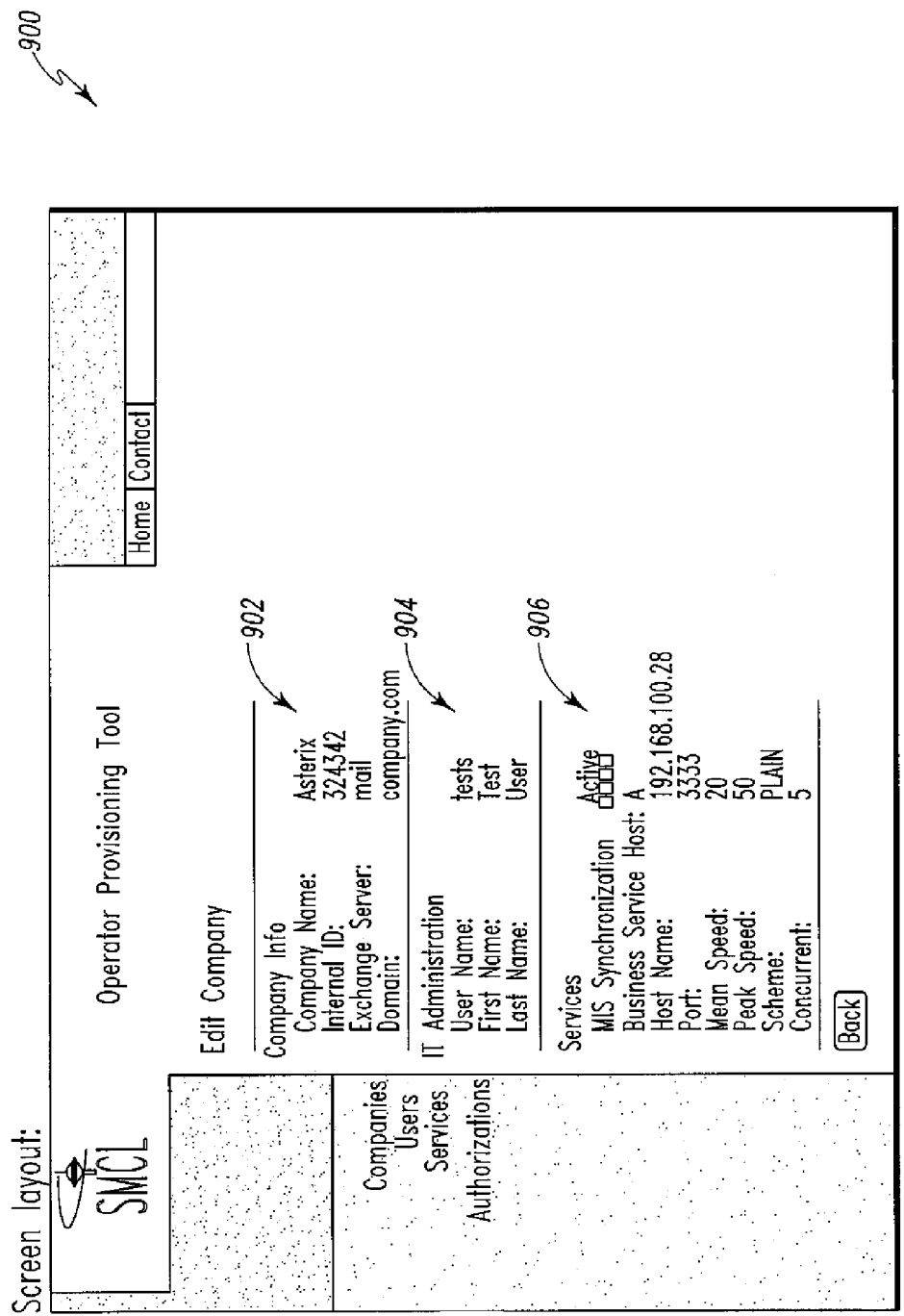
FIG. 9 illustrates an exemplary view customer view of the mobile provisioning tool system.

As set forth in FIG. 9, the mobile provisioning tool system 103 may also include a view customer view 900 that allows the CRM Rep to view all key customer information. As illustrated, the view customer view 900 contains key customer information that may be needed by the CRM Rep. Some of the information that may be included may be placed in a company information field 902, an IT Administrator field 904, and a business service host information field 904. The information that may be set forth in these fields 902-906 has previously been discussed and as such, a detailed explanation of the information contained in these fields 902-906 is not necessary.

Figure 10:
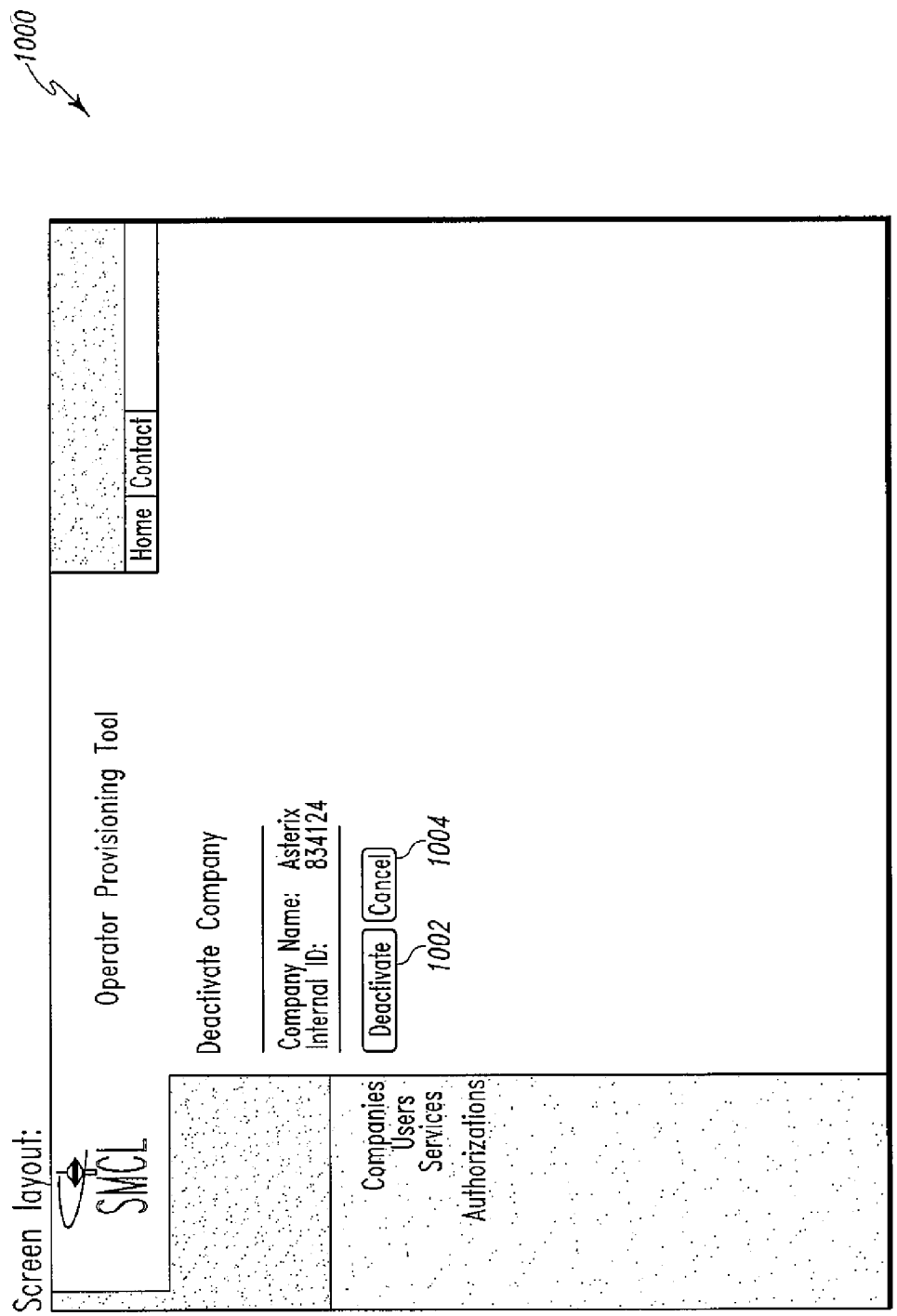
FIG. 10 illustrates an exemplary deactivate customer view of the mobile provisioning tool system.

As illustrated in FIG. 10, the mobile provisioning tool system 103 may also include a deactivate customer view 1000. The deactivate customer view 1000 may be used for deactivating a customer, which will block any usage of mobile services for the given customer and their respective end-users. Once the customer has been selected to deactivate, the deactivate customer view 1000 will be generated and a Deactivate button 1002 may be used to deactivate the customer. As such, all business services that the customer had subscribed to will become inactive if the Deactivate button 1002 is pressed. Also, all end users assigned to that company will become blocked (blocked flag set in the active directory 108) and all IT Admin will no longer be able to log onto the system and provision users. In some cases, customers may only be deactivated if all end-users within the customer's organization have been un-subscribed (i.e. inactive) from all mobile services, otherwise deactivation may be denied. A Cancel button 1004 may be included for canceling the deactivation process.

Figure 11:
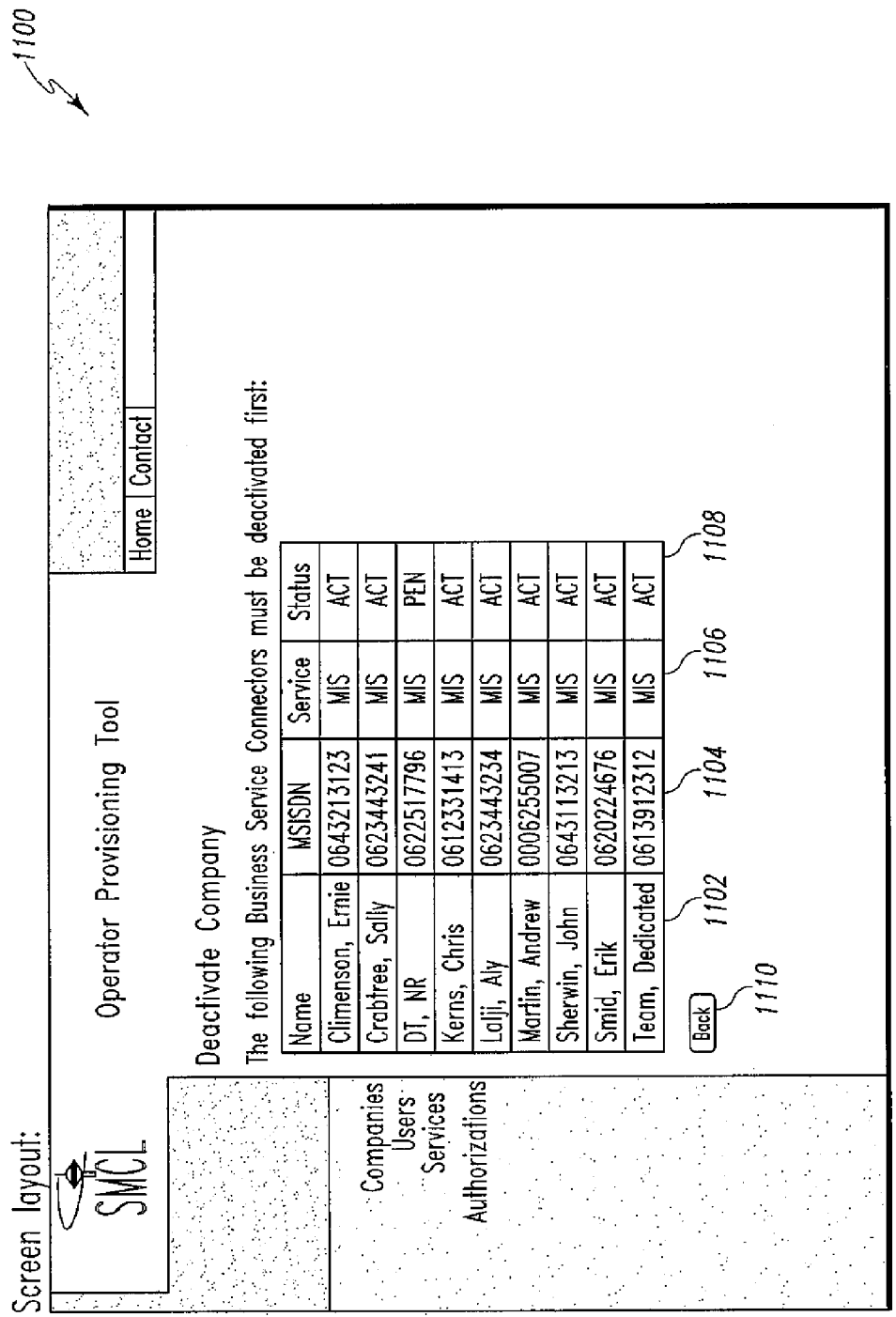
FIG. 11 illustrates an exemplary deactivate customer denied view of the mobile provisioning tool system.

As illustrated in FIG. 11, in case a CRM Rep tries to deactivate a customer with existing subscriptions, a deactivate customer denied view 1100 may be generated that will list all active end-users. As set forth above, the CRM Rep may have to deactivate all end-users before continuing with customer deactivation. As illustrated, the deactivate customer denied page may include a name field 1102, a mobile identification field 1104, a mobile service field 1106 and a service status field 1108.

The name field 1102 will contain the name of each Customer User that still has an active business service connector. The mobile identification (MSISDN) field 1104 may list the mobile ID that is attached to the active business service connector for each mobile device 102 being used by an end-user. The mobile service field 1106 may list the active mobile service that is being used by each end-user. The service status field 1108 may list any mobile service that is associated with the end-user that is pending, processing, or active that will block the deactivation of the customer. As set forth above, in one embodiment of the present invention only customers with no active subscribers can be deactivated. A back button 1110 may be used to cancel the operation or send the CRM Rep back to a list customer's view.

Figure 12:
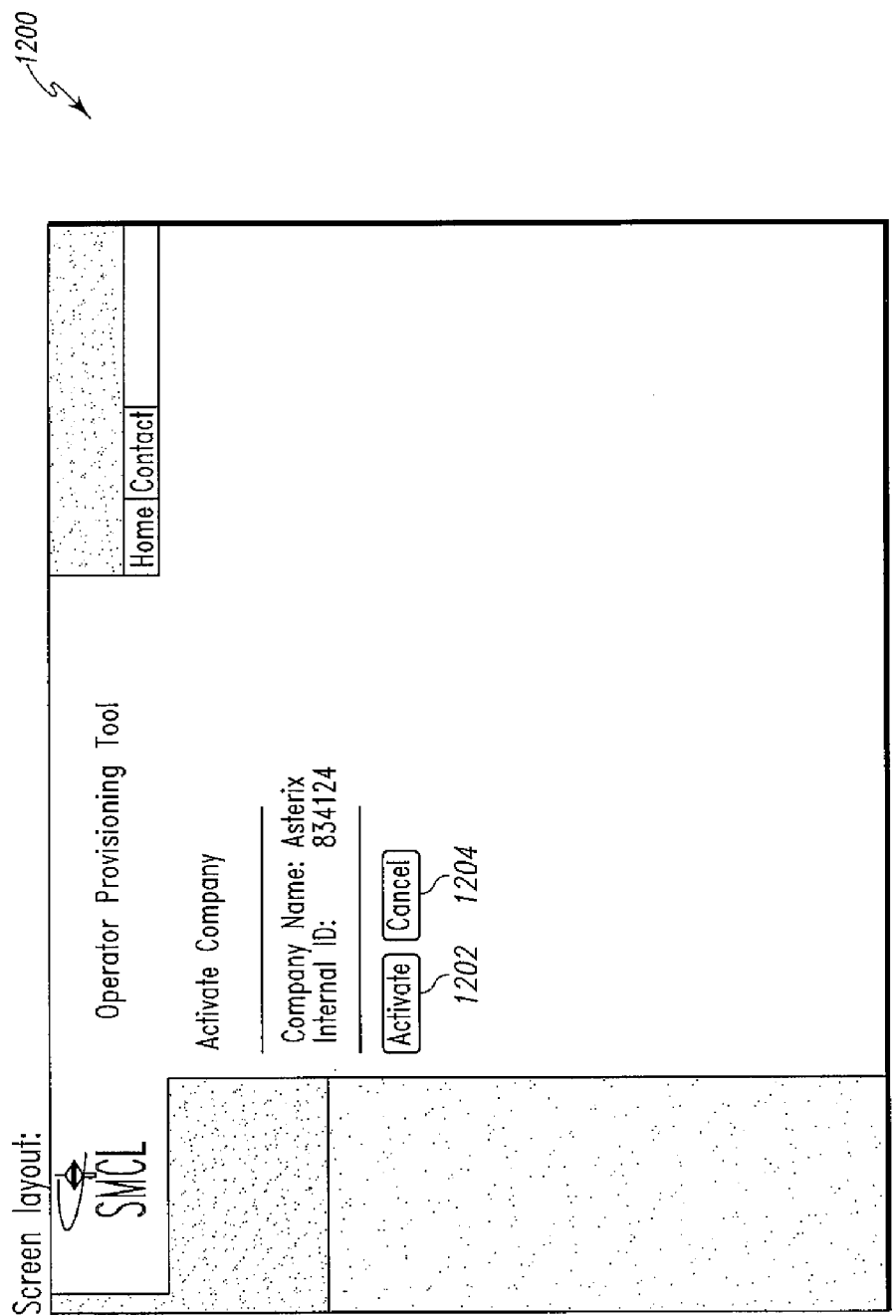
FIG. 12 illustrates an exemplary active customer view of the mobile provisioning tool system.

Referring to FIG. 12, the mobile provisioning tool system 103 may also include an activate customer view 1200. The activate customer view 1200 may be used by the CRM Rep to re-activate a customer that had once subscribed to one or many mobile services based on the original contract. All end-users belonging to this customer will become unblocked and the IT Admin capable of provisioning end-users once an activate button 1202 is selected from the activate customer view 1200. As such, all customers will again be able to subscribe end-users to mobile services. In addition, all IT Administrator accounts for that particular customer will be un-blocked. A cancel button 1204 may be used by the CRM Rep to cancel the activation process.

Authorization Management

Figure 13:
FIG. 13 illustrates an exemplary list tool user's view of the mobile provisioning tool system.

As set forth in FIG. 13, the mobile provisioning tool system 103 may also include a list tool user's view 1300. The list tool users view 1300 lists all unblocked tool users that are authorized to log onto and use the business services provided by the mobile service bureau system 100. From this view, the CORM Rep and Supervisor can manage all users that authenticate against the mobile service bureau 100 and mobile provisioning tool system 103. Given that there will potentially be thousands of customers and thus customer users using the mobile service bureau system 100, the CRM Rep or Supervisor will be able to enter search criteria in a search field 1302 to narrow down the list of authorized users. For example, the user can enter in the first few letters of the User Name and click a Search button 1304, which will bring back a list of matching accounts. Search results may be broken down into "pages" for easier viewing, which will allow CRM Reps or Supervisors to page through a large list of users.

A field selection 1306 may also be included to allow the CRM Rep or Supervisor to select a field to search within the database maintained in connection with users of the mobile service bureau system 100. In the embodiment illustrated in FIG. 13, the field selection 1306 is represented as a drop down box that may include the following search options or fields: User Name, Full Name, Security Group and Company/Customer. A CRM Rep may also be able to use the list tool user's view 1300 to view and edit information and mobile services provided to an authorized user or customer. Each item listed in search results provided in the list tool user's view 1300 may contain a link to more information about each user or a link to a page that allows the CRM Rep to edit information or mobile business services. As illustrated, the search results listed in the search results field of the list tool user's view 1300 may include a User Name category, a Full Name category, a Security Group category and a Company/Customer category.

Although not illustrated, CRM Reps may also be provided with the ability to block any account from the list tool user's view 1300. A selection icon or a link may be provided within the search results that will allow the CRM Rep to block any account. An add user button 1308 may also be included within the list tool users view 1300 that may provide a link to an add tool user view 1500, which will be described in greater detail below. An export button 1310 may also be included to export all users that are located by the search to a spreadsheet file. The export button 1310 may also open a new page or launch an application that allows the CRM Rep to view, save and edit the spreadsheet file. A view blocked user's button 1312 may also be provided that allows the CRM Rep to view blocked users or opens the block tool user view 2000.

Referring to FIG. 14, the mobile provisioning tool system 103 may also include a list blocked tool users view 1400 that lists all blocked tool users or customers. These users have either been explicitly blocked from accessing the mobile service bureau system 100 or their respective customer has been deactivated (thus, blocking their account). Although not specifically illustrated, CRM Reps may also be provided with a button or link that allows them to unblock accounts or delete accounts that will no longer be used by end-users. The information or data about blocked tool users may be stored in a database or file on the server that contains the mobile provisioning tool system 103 and all of its associated functionality or on another server.

The CRM Rep or Supervisor may be able to enter search criteria in a search field 1402 to narrow down the list of blocked users or customers. Selecting a Search button 1404 will bring back a list of matching accounts. As previously set forth, search results may be broken down into "pages" for easier viewing, which will allow CRM Reps or Supervisors to page through a large list of users or customers. A field selection 1406 may also be included to allow the CRM Rep or Supervisor to select a field to search within the database maintained in connection with blocked users of the mobile service bureau system 100. In the embodiment illustrated in FIG. 14, the field selection 1406 is represented as a drop down box that may include the following search options or fields: User Name, Full Name, Security Group and Company/Customer.

As illustrated, the search results listed in the search results field of the blocked tool user's view 1400 may include a User Name category, a Full Name category, a Security Group category and a Company/Customer category. A view authorized users button 1406 may be included that provides a link to the tool users view 1300. Although not specifically illustrated, the blocked tool user's view 1400 may also include an export button that may create a spreadsheet file based on the search results.

Figure 15:
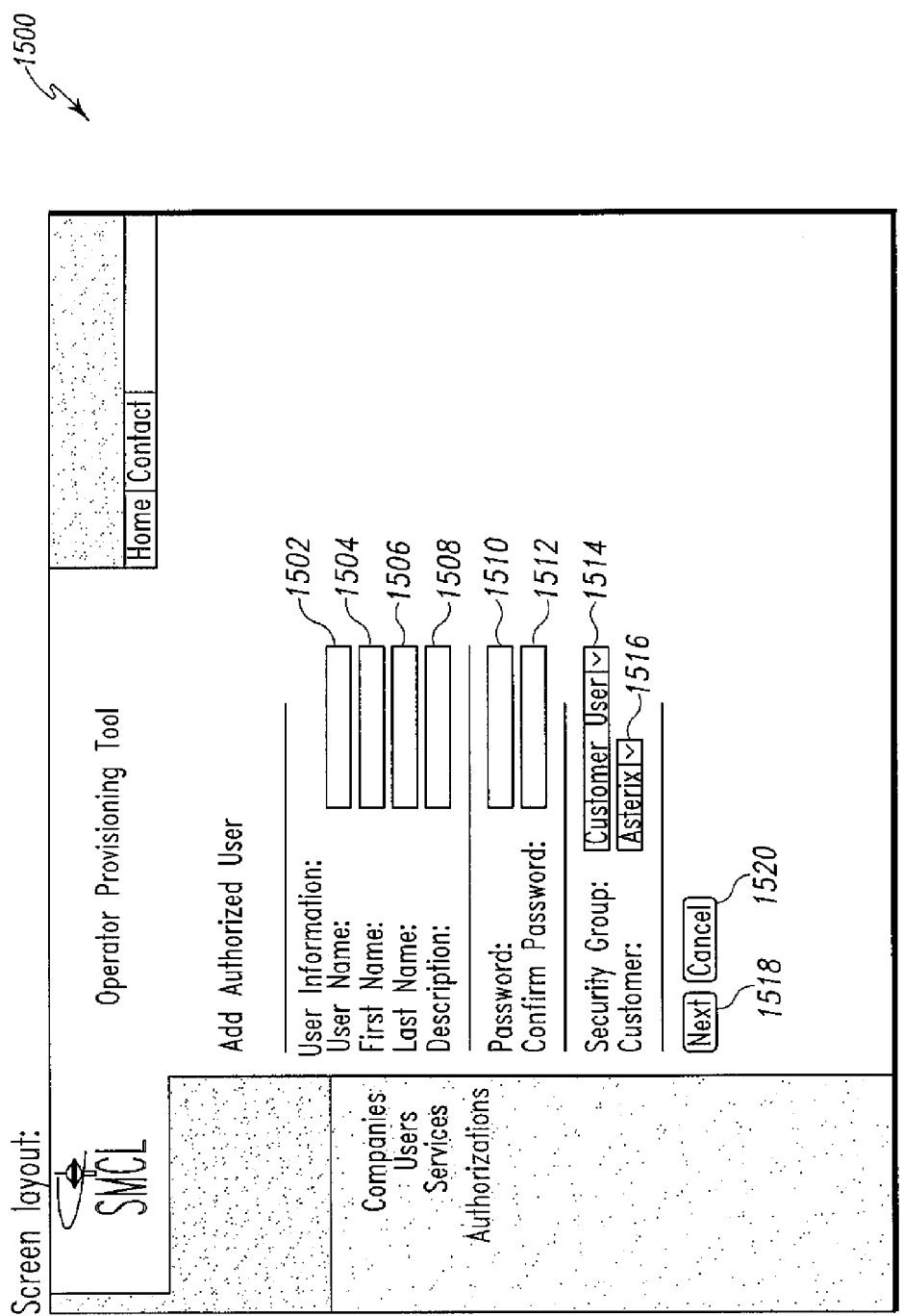
FIG. 15 illustrates an exemplary add tool user view of the mobile provisioning tool system.

Referring to FIG. 15, the mobile provisioning tool system 103 may also include an add tool user view 1500, which allows the IT Admins or CRM Reps to create an authorized user of the mobile service bureau system 100. The add tool user view 1500 may include a User Name input field 1502, a First Name input field 1504, a Last Name input field 1506, a Description input field 1508, a password field 1510 and a Confirm Password input field 1512. The data that may be input into the above-referenced input fields will vary for each respective user. A detailed explanation of the input fields set forth above is not necessary as those skilled in the art would recognize the nature of the data to be entered by the title of the input field.

A Security Group selection field or input field 1514 may also be included that allows the CRM Rep to designate the security level of each user that is created. In the embodiment illustrated in FIG. 15, the Security Group selection field 1514 is set forth as a drop down box or menu item that contains a list of security groups or levels. Based on the tool user's authorization level, certain users will be restricted to only being able to create IT Admins. Supervisors will assume control over all accounts.

A Customer selection item or input field 1516 may also be included that allows the CRM Rep to designate the customer that is associated with the user that is being added. Again, in this embodiment the Customer selection item or input field 1516 is a drop down box that contains a list of customers. A Next button 1518 may also be included that may save the newly added user or post the entered information into an add tool user confirmation view 1600. A Cancel button 1520 may be included that cancels the process of adding a new tool user.

Referring to FIG. 16, the mobile provisioning tool system 103 may also include the add tool user confirmation view 1600, which confirms the user to be created in the active directory 108. Once a Save button 1602 is clicked or selected, a process will be started that will add the end-user account into the active directory 108. This may be done via an Active Directory Services Interface (ADSI). The CRM Rep will also have one last chance to abort the creation of the tool user by selecting a Cancel button 1604.

Figure 17:
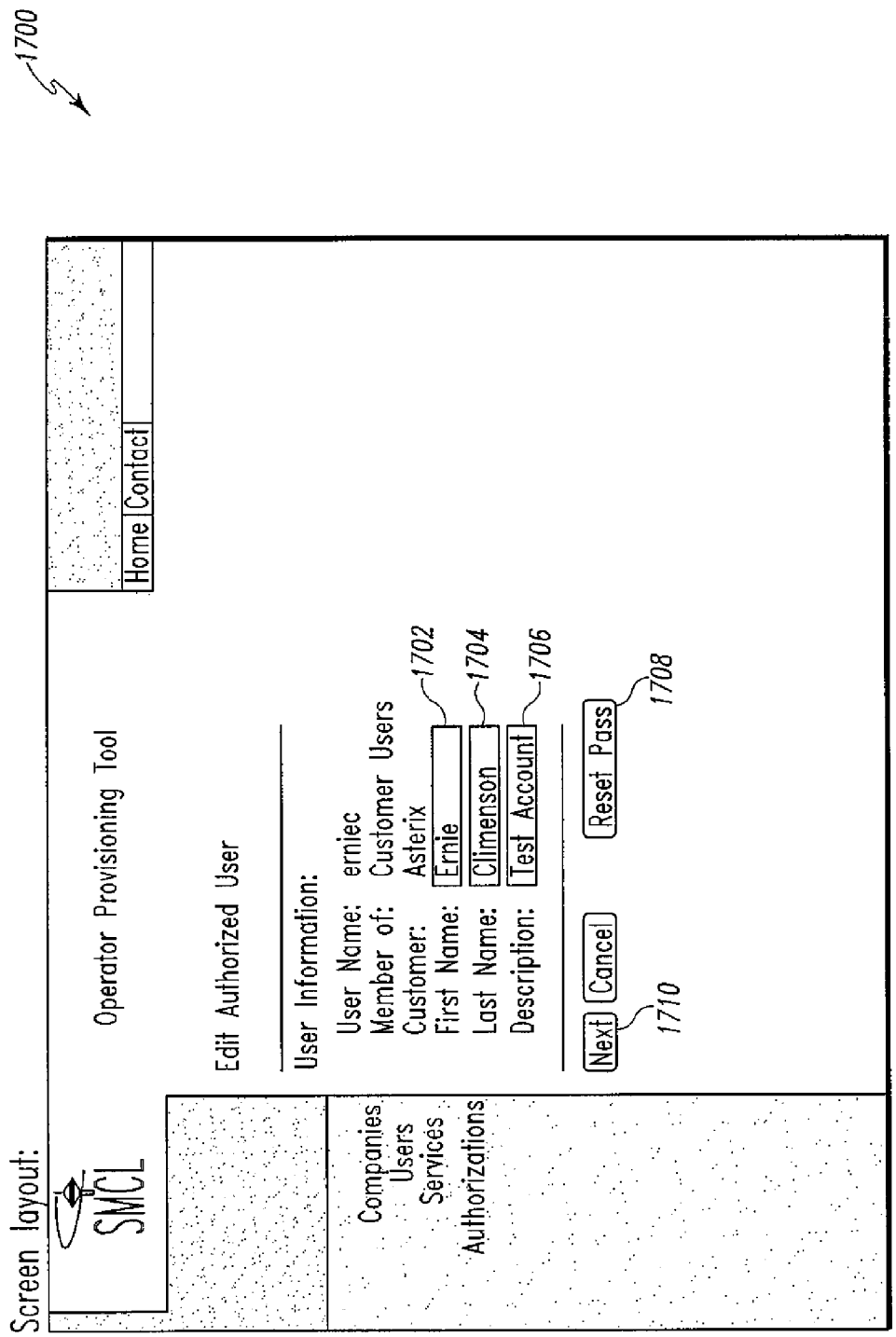
FIG. 17 illustrates an exemplary edit tool user view of the mobile provisioning tool system.

As illustrated in FIG. 17, the mobile provisioning tool system 103 may also include an edit tool user view 1700. The edit tool user view 1700 may include a First Name input field 1702, a Last Name input field 1704 and a Description input field 1706. The fields set forth above may be filled in with information about the tool user by data contained in the active directory 108. The User Name and the name of the customer may be displayed to ensure the proper tool user has been located. Although not illustrated, the Security Group and Username of the tool user may also be capable of being edited within the edit tool user view 1700.

In other embodiments of the present invention, if a username or security group needs to be changed, the CRM Rep may delete the tool user and recreate the account. The edit tool user view 1700 may also include a Reset Password button 1708 to allow the CRM Rep to reset the password of the account in question. This may come in handy if a tool user forgets his/her password. Although not illustrated, the password may be capable of being edited within the edit tool user view 1700. A Next button 1710 may be included that updates the information in the active directory 108 or takes the CRM Rep to an edit tool user confirmation view (not illustrated). A Cancel button 1712 may also be included to stop the process of editing the information associated with the tool user.

Figure 18:
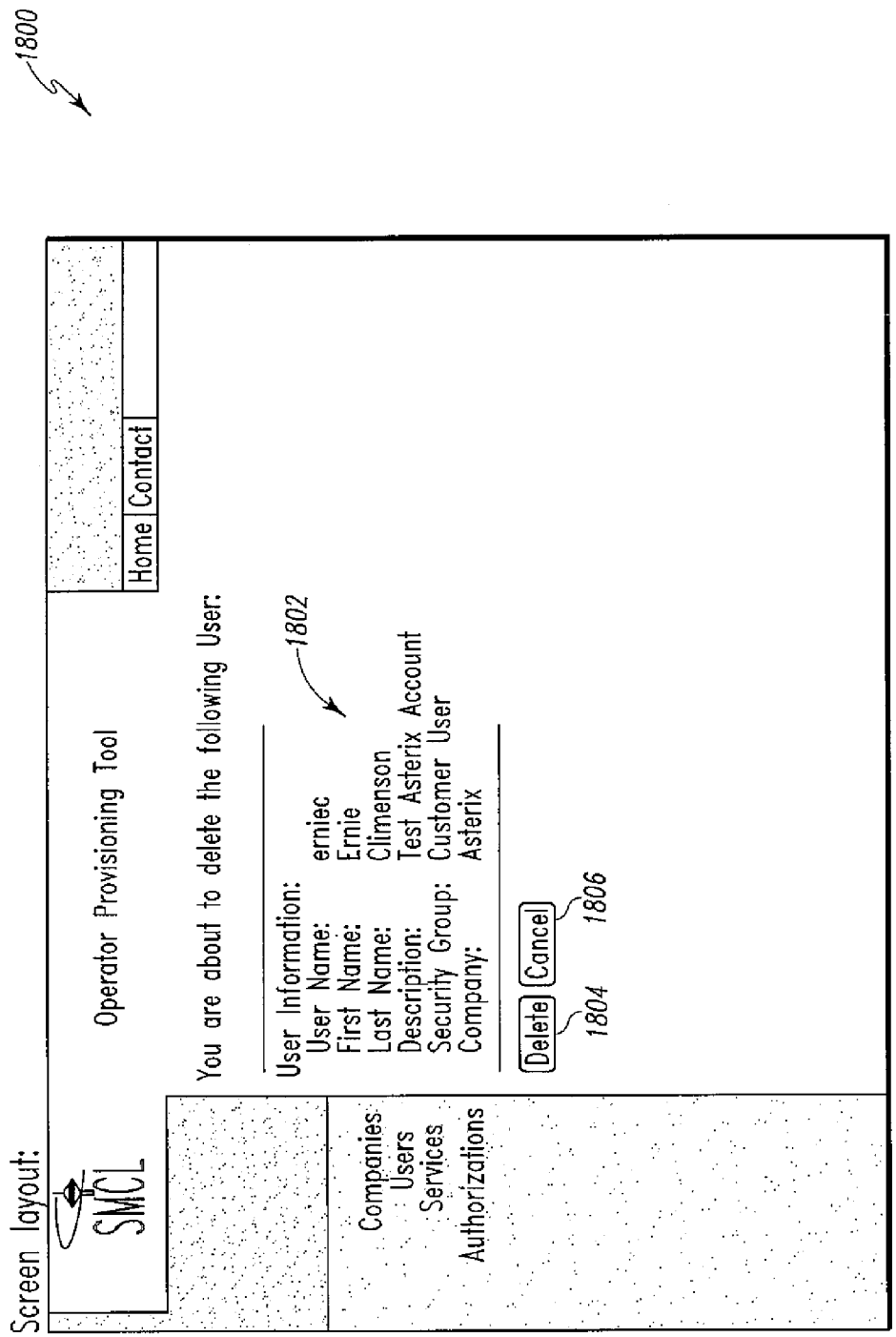
FIG. 18 illustrates an exemplary delete tool user view of the mobile provisioning tool system.

As set forth in FIG. 18, the mobile provisioning tool system 103 may include a delete tool user view 1800. The delete tool user view 1800 allows the CRM Rep to delete a tool user. This function is also handy when it is known that a blocked/disabled account will never be used again. The delete tool user view 1800 may include a user information section 1802 that sets forth various information about the tool user that is being deleted. Selecting a Delete button 1804 within the delete tool user view 1800 will delete out the user account in the active directory 108. Once deleted, the account cannot be recovered. A Cancel button 1806 may be used to cancel the process of deleting a tool user from the system.

Figure 19:
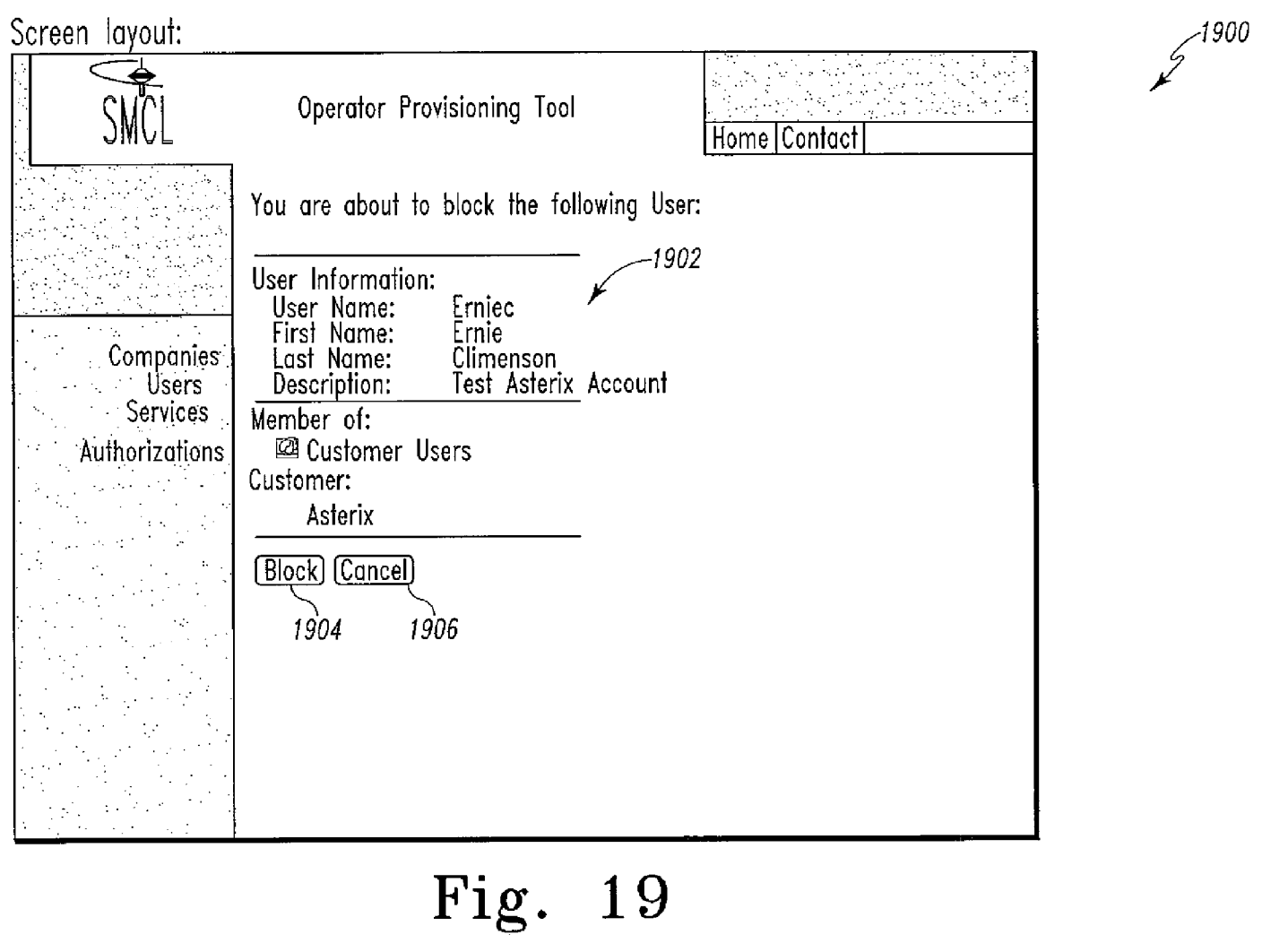

Referring to FIG. 19, the mobile provisioning tool system 103 may include a block tool user view 1900, which allows the CRM Rep or Supervisor to block certain tool users from accessing the mobile service bureau system 100. Once the block is initiated, a flag in the active directory 108 will be set to disallow further logon attempts to the tool user that is blocked. The next time that user tries to logon, an "Access Denied" message will appear and access will not be granted to any resources of the mobile service bureau system 100. A user information section 1902 may set forth various types of information about the tool user that is being blocked. Selecting a Block button 1904 within the block tool user view 1900 will block the tool user account. A Cancel button 1906 may be used to cancel the process of blocking a tool user.

Figure 20:
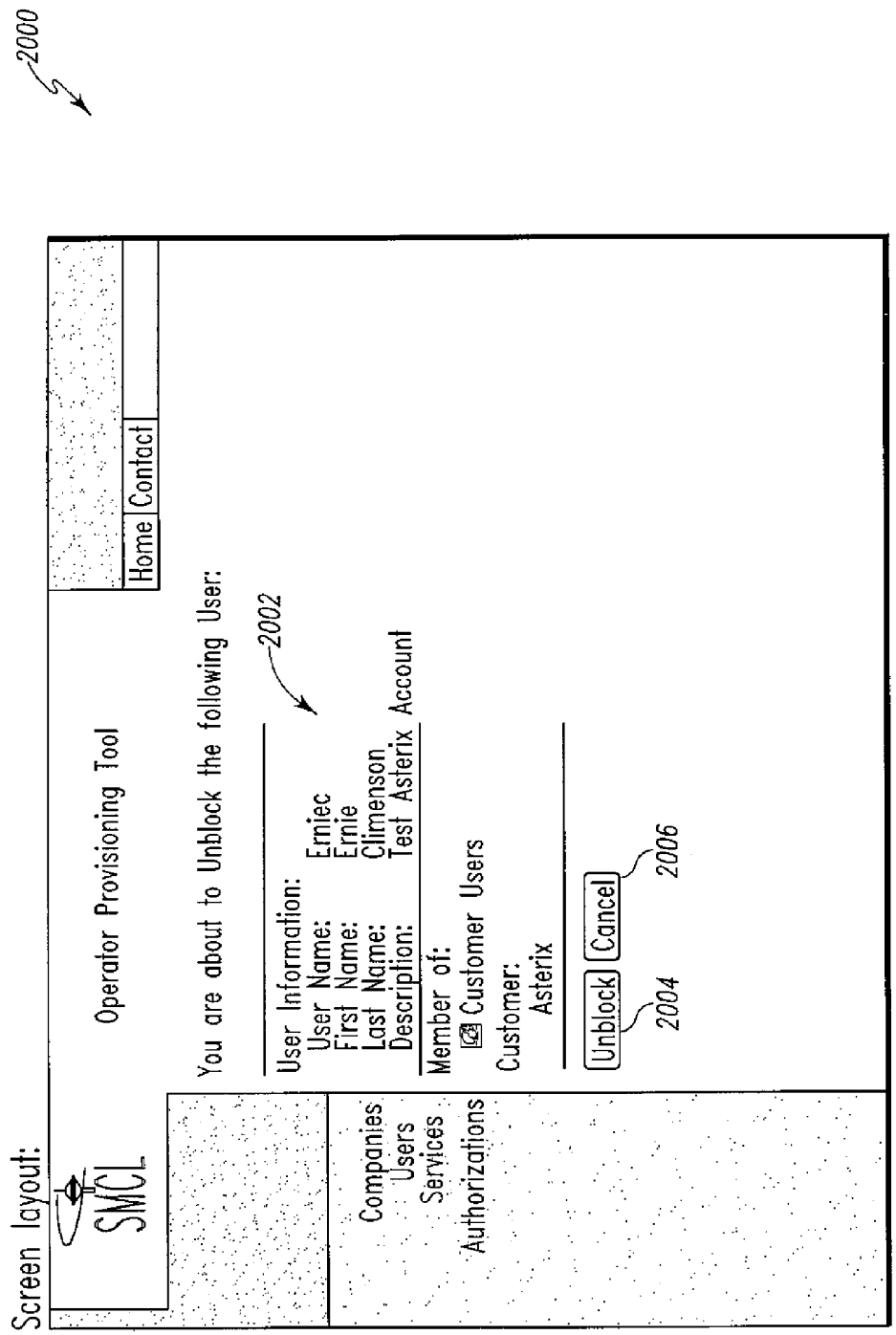
FIG. 20 illustrates an exemplary un-block tool user view of the mobile provisioning tool system.

As illustrated in FIG. 20, the mobile provisioning tool system 103 may include an un-block tool user view 20, which allows the CRM Rep or Supervisor to unblock an account. This will send another message to the active directory 108 to allow access to the given user for all future logon attempts (until blocked or disabled of course). A user information section 2002 may set forth various types of information about the tool user that is being un-blocked. Selecting an Unblock button 2004 within the block tool user view 2000 will un-block the tool user account. A Cancel button 2006 may be used to cancel the process of un-blocking a tool user from the system.

Although not specifically illustrated, the mobile provisioning tool system 103 may also include a set password page. The set password page will allow the CRM Rep or Supervisor to reset a tool user's password in the active directory 108. This function can be helpful when tool users lose or forget their password. The CRM Rep or Supervisor can then just specify a new password, which will be communicated to the user in question.

Business Service Management

Referring to FIG. 21, the mobile provisioning tool system 103 may include an active business services view 2100. The active business services view 2100 may list all business services that may be supported by the mobile service bureau system 100. In the illustrated embodiment, MIS and SEA email middleware are supported, but other Business Services may be supported as well depending on the particular needs of the customer. A display field 2102 of the active business services view 2100 may set forth a Service Name, a Service Type, a Service Number and a Gateway Address (which points to the proper connector gateway DNS address). The active business services view 2100 acts as the start page for Business Service management. From here, the CRM Rep or Supervisor can view, add, edit and deactivate business services.

The active business services view 2100 may include an Add Service button 2104 that will open an add business service view 2200. In addition, a View Inactive Business Services button 2106 may be included that will open an inactive business services view (not illustrated) that is similar to the active business services view 2100, but will list inactive business services. Although not specifically illustrated, the active business services view 2100 may also include an Edit Service button, a View Service button and a Deactivate Service button. The Edit Service button will open an Edit Business Service view 2300, the View Service button will open a View Business Service view 2400, and the Deactivate Service button will open a Deactivate Business Service view 2500, each of which will be described in greater detail below.

Figure 22:
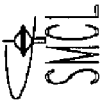
FIG. 22 illustrates an exemplary add business service view of the mobile provisioning tool system.

Referring to FIG. 22, the mobile provisioning tool system 103 may include the add business service view 2200, which will provide the initial entry fields necessary to add a new business service. This function may only be available to a limited number of specified CRM Supervisors and not to the at large CRM Reps or IT Admins. Most importantly, this service will be attached to an already existing Service Product Number. So, this screen assumes that the billing information for this service is known beforehand. Another thing to note is the Gateway Address. This address will be the generic DNS name of the connector gateway 104 instance that will handle traffic for this given business service. For the purpose of this discussion, it is assumed that the connector gateway 104 has already been set up and configured to handle the new Business Service addition. It is important to note that as business services are added, there may because to add in service-specific fields in a separate screen.

The add business service view 2200 may include a General Service Type field 2202, which may be used by the CRM Supervisor to set the general business service portfolio name. A Service Code field 2204 may also be included that allows the CRM Supervisor to enter a service code for the respective business services that is being added. A Service Number field 2206 may be included that may be used to enter a service product number. This is the internal billing number that has already been created in a billing system for the business service. A Service Name field 2208 may be provided for the CRM Supervisor to enter the name of the business service as it will appear throughout the system.

The add business service view 2200 may also include a Gateway Address field 2210. The mobile provisioning tool system 103 will validate this field to ensure that a proper DNS format is entered by the CRM Supervisor. The Gateway Address field 2210 is used to point to the connector gateway 104 instance for the given business service. Mobile devices 102 may be provisioned to have software required to be installed and/or configured on the mobile device 102 associated with the business service to point to this address. The connector gateway 104 will then deduce to which company IP address the synch requests will be forwarded. The add business service view 2200 may also include a Description field 2212 that provides the CRM Supervisor with the ability to enter a description of the business service.

A Next button 2214 may be included that may create the new business service and make it available to all customers. All customers willing to use the business service must first subscribe to the business service based on a contractual relationship with the operator of the mobile service bureau system 100. Although not illustrated, an add business service confirmation page may be generated upon selection of the Next button 2214. This will give the CRM Supervisor the ability to review the entries entered into the fields when creating the new business service before actually creating the new business service by selecting a Save button generated on the add business service confirmation page. A Cancel button 2216 may be included on each page to cancel the process of adding the new business service. Once the new service is saved, it becomes a valid value for the CRM reps to add as an available service to customer companies subscribing to the mobile service bureau and to CRM Reps and IT Admins who wish to assign the service to specific end users.

Figure 23:
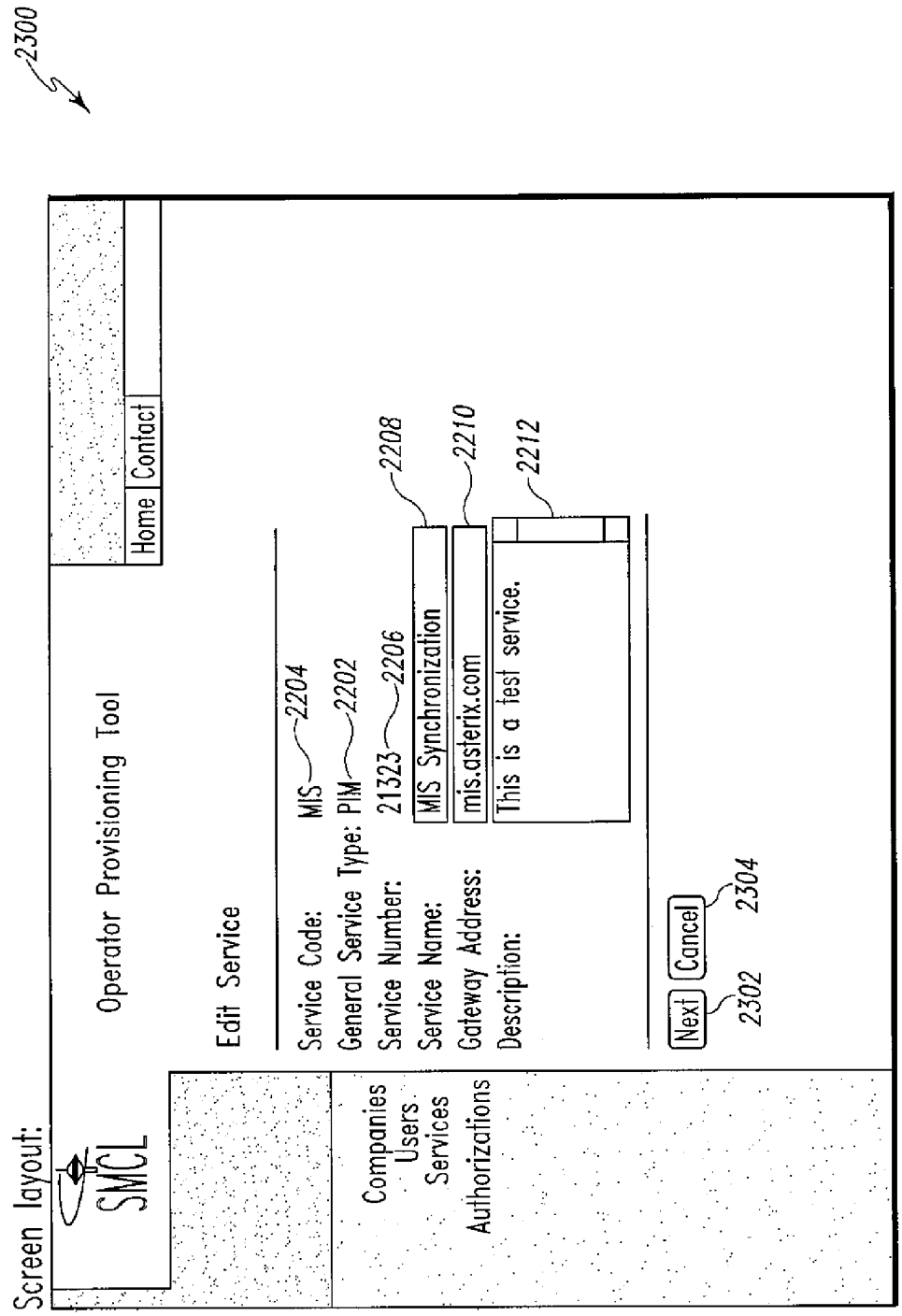
FIG. 23 illustrates an exemplary edit business service view of the mobile provisioning tool system.

As illustrated in FIG. 23, the mobile provisioning tool system 103 may also include an edit business service view 2300. In this embodiment, the key business service field that can be modified is the Gateway Address field 2210. This is an important function to have in case the DNS address of the connector gateway 104 has been changed. The CRM Rep or Supervisor may also change the Service Name field 2208 and the Description field 2212 of the business service, but these fields are most likely for display purposes only. Note that the Service Code field 2204, the General Service Type field 2202, and the Service Product Number field 2206 cannot be changed in this particular embodiment, but may be changed in other embodiments. A Next button 2302 may be included that saves the changes or opens an edit business service confirmation screen that includes a Save button so that the CRM Supervisor may review the changes before saving. A Cancel button 2304 may also be included that cancels the process of editing the business service.

Although not illustrated, the mobile provisioning tool system 103 may also include a view business service page. The view business service page may display all of the fields that have been entered for the business service. As such, the view business service page may list the information provided in the General Service Type field 2202, the Service Code field 2204, the Service Number field 2206, the Service Name field 2208, the Gateway Address field 2210 and the Description field 2212.

Figure 24:
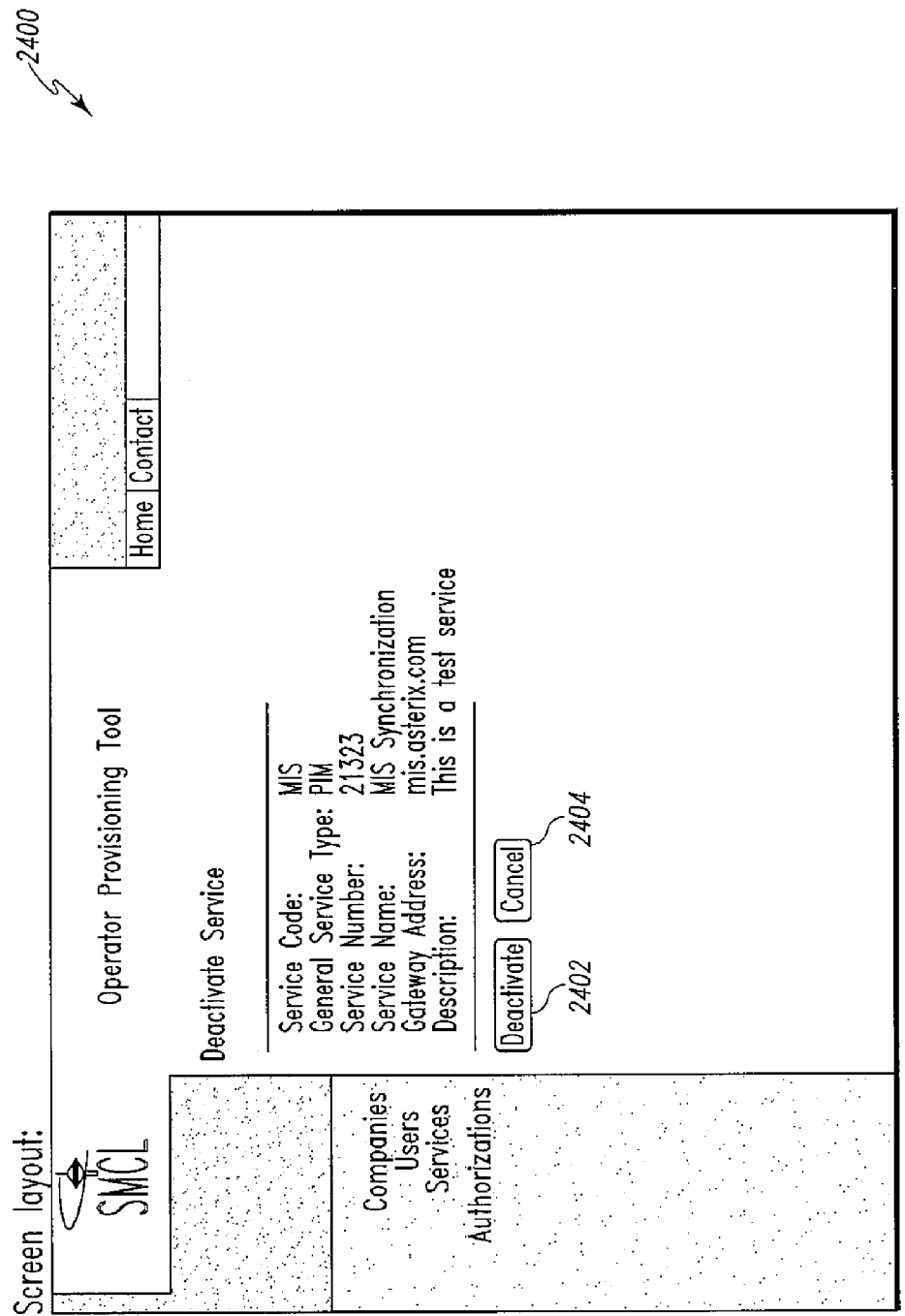
FIG. 24 illustrates an exemplary deactivate business service view of the mobile provisioning tool system.

As set forth in FIG. 24, the mobile provisioning tool system 103 may also include a deactivate business service view 2400. There may be cases when a business service must be deactivated or retired. In most cases, this functionality will likely not be used (except for testing purposes). Once deactivated, customers and end-users will no longer be able to subscribe to or use this business service. This function will have no impact on legacy systems however since interfaces to update these systems will not be built. In the preferred embodiment, all end-users and customers must have the business service deactivated before the business service may be deactivated. Selecting a Deactivate button 2402 on the deactivate business service view 2400 will make the business service no longer available to end-users and customers. A Cancel button 2404 may also be included that cancels the process of deactivating a respective business service.

Referring to FIG. 25, the mobile provisioning tool system 103 may also include a deactivate business service denied view 2500. As set forth above, in one embodiment of the present invention if the CRM Supervisor tries to deactivate a business service that still has active subscriptions, the deactivation process may be disallowed, which will cause the mobile provisioning tool system 103 to generate the deactivate business service denied view 2500. In this embodiment, in order to properly deactivate the business service, the CRM Supervisor will have to deactivate each and every customer and respective end-user before attempting the deactivation.

An end-user field 2502 may be displayed to notify the CRM Rep or Supervisor of the end-users who still has an active subscription attached to the business service. As illustrated, other information about each end-user may be set forth in the end-user field 2502. A customer or company field 2504 may also be included that lists the names of customers that still have an active subscription to the business service that is being deactivated. Other information about each customer may also be set forth in the customer field 2504. A Back button 2506 may be included that may take the CRM Rep to the active business services page 2100 or some other page.

Although not illustrated, the mobile provisioning tool system 103 may also include a reactivate business service view. There may be cases where a business service will need to be reactivated. This function will unblock the business service and allow customers/end-users the ability to subscribe to and once again use the business service. It is assumed that the connector gateway 104 will be configured to handle this reactivated business service. It is also assumed that the billing record for the billing service still exists in the billing systems. It may be necessary to perform this check in the billing system before re-activating this service. A Reactivate button may be included in the reactivate business service view for allowing the CRM Supervisor to reactivate the business service.

User Management

Figure 26:
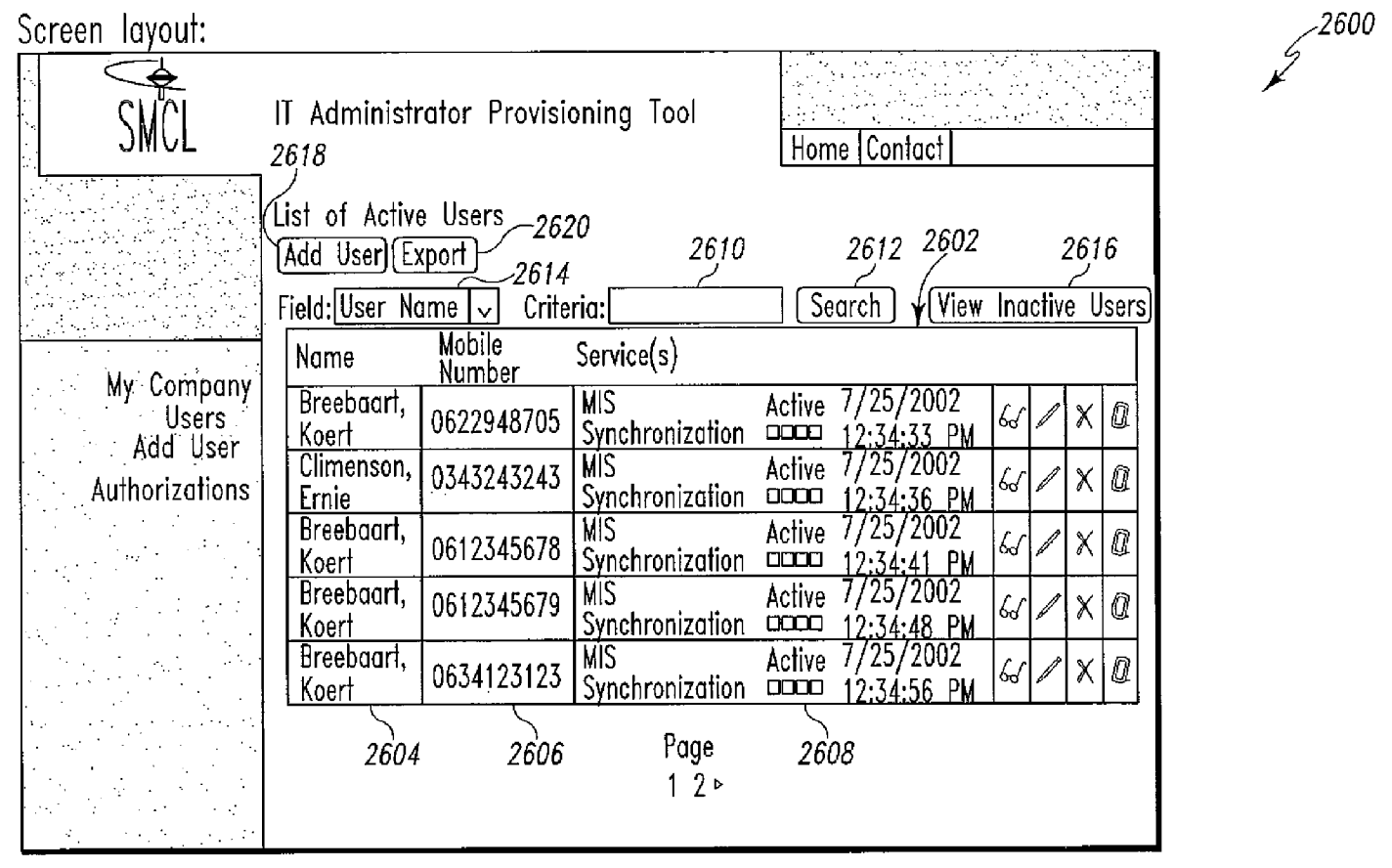

Referring to FIG. 26, the mobile provisioning tool system 103 may include an active user's view 2600. The active users view 2600 lists all active end-users associated with a customer along with the associated Mobile Connection number (MSISDN) assigned to each mobile device 102. All business services that have been subscribed to the end-user will also be listed. From this page, the IT Admin can manage end-user information as well, as provision mobile devices 102 for these end-users. The active users view 2600 serves as the starting point for IT Admins but may very well be used by the CRM Rep and Supervisor, as well.

The active user's view 2600 may include an end-user field 2602 that may include a Name field 2604, a Mobile Number field 2606 and a Service field 2608 that contain information about each respective end-user. The Name field 2604 may include the first and last name of each user. The Mobile Number field 2606 contains the MSISDN assigned to the end-user's mobile device 102. The Service field 2608 may list the business services for which the end-user has a subscription, the status of the subscription (active, processing, pending) and the last date and time the business service was modified.

The IT Admin or CRM Rep may be able to enter search criteria in a search input field 2610 to narrow down the list of end-users. For example, the user can enter in the first few letters of an end-user's name and click a Search button 2612, which will retrieve a list of matching end-user names. Search results may be broken down into several "pages" for easier viewing. This way, IT Admins or CRM Reps can page through a large list of end-users. A Field selection item 2614 may also be included that allows the IT Admins or CRM Reps to select a field to search from the list of fields set forth in the end-user field 2602. In the embodiment illustrated in FIG. 26, a drop down box is used as the Field selection item 2614 and may contain the following options: Last Name, Mobile Number, Business Service and Search Field (free-field).

The active user's view 2600 of the mobile provisioning tool system 103 may also include a View Inactive Users button 2616. As set forth below, selection of the View Inactive Users button 2616 will open an Inactive Users view 2700 that will list inactive end-users. The active user's view 2600 may also include an Add User button 2618 that will open an Add User view 2800 that provides the ability to add new end-users. An export button 2620 may also be included to export all users associated with a given customer to a spreadsheet file. Although not illustrated, the IT Admin may also detail a specific search based on a field and then export this list to a spreadsheet file. For the purpose of the present invention, active end-users are end-users that have subscribed to a mobile service and have the ability to use these synchronization services or other services offered on the customer network 114. Inactive end-users are end-users that have once subscribed to a mobile service but have since unsubscribed or have been deactivated.

Figure 27:
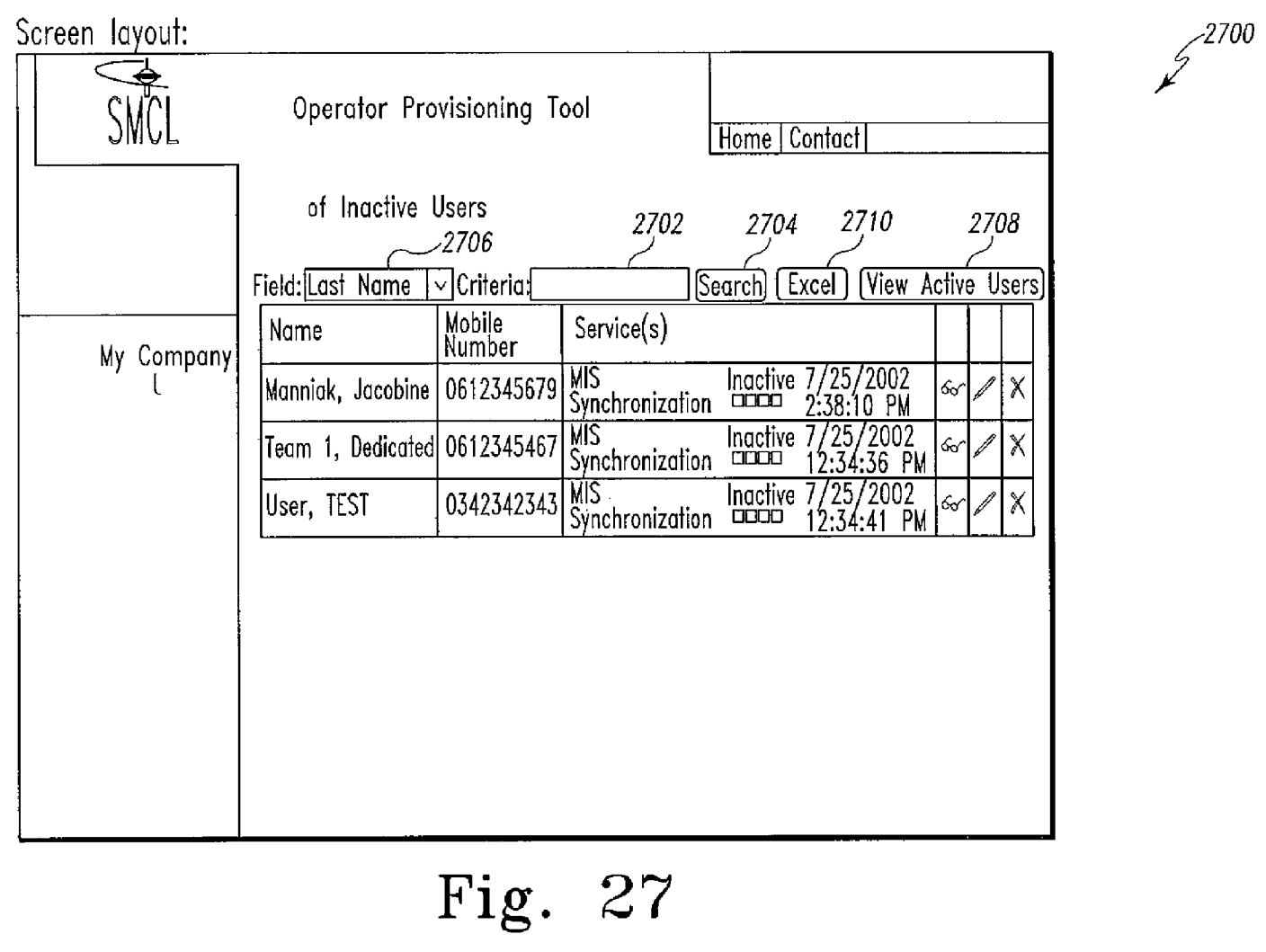

As illustrated in FIG. 27, the mobile provisioning tool system 103 may include the inactive user's view 2700. As clearly illustrated, the inactive user's page 2700 may list all inactive end-users along with their associated MSISDN. All business services that have once been subscribed by the end-user may also be listed. Although not specifically illustrated, this page may allow the IT Admin to re-activate inactive end-users as well as delete (clean up) end-users that will never be re-activated.

The IT Admin or CRM Rep may be able to enter search criteria in a search input field 2702 to narrow down the list of end-users. For example, the user can enter in the first few letters of an end-user's name and click a Search button 2704, which will bring back a list of matching end-user names. Search results will be broken down into several "pages" for easier viewing. A Field selection item 2706 may also be included that allows the Customer Reps or CRM Reps to select a field to search from a list of fields. In the embodiment illustrated in FIG. 27, a drop down box is used as the Field selection item 2706 and may contain the following options: Last Name, Mobile Number, Business Service and Search Field (free-field).

The inactive user's view 2700 of the mobile provisioning tool system 103 may also include a View Active Users button 2708. Selection of the View Active Users button 2708 will open the Active Users view 2600, which will list active end-users. An export button 2710 may also be included to export all inactivated users associated with a given customer to a spreadsheet file. Although not illustrated, the IT Admin may also detail a specific search based on a field and then export this list to a spreadsheet file.

Figure 28:
FIG. 28 illustrates an exemplary add user view of the mobile provisioning tool system.

As set forth in FIG. 28, the mobile provisioning tool system 103 may include an add user view 2800, which is the initial screen in the Add User process. The add user view 2800 allows the IT Admin to specify end-user details to a particular Mobile Number. It is required that this Mobile Number be "owned" by the provisioning customer. So, when the add user process is initiated, a check will be performed to make sure that the Mobile Number assigned to this particular end-user is a valid GPRS (or other) subscription and falls within the customer's domain. If not, the addition of end-user for this customer will be disallowed.

The add user view 2800 may include a First Name field 2802, a Middle Name field 2804, a Last Name field 2806, a Mobile Number field 2808, an Exchange Mailbox field 2810 and an Exchange Domain field 2812. The First, Middle and Last Name fields 2802-2806 may be used to enter the full or partial name of the end-user. The Mobile Number field 2808 is used to enter the Mobile Number (MSISDN) that is assigned to the end-users device 102. In the embodiment illustrated in FIG. 28, a Company field and an Internal ID field are illustrated but it should be noted that these fields are only visible if the add user page 2800 is being viewed by a CRM Reps.

The Exchange Mailbox field 2810 allows the IT Admin to specify the Exchange mailbox of the given user. The exchange mailbox name is used when provisioning the end-user's mobile device 102 and may be needed by Active Sync and Synchrologic on the mobile device 102. The Exchange Domain field 2812 is used to enter or select the customer's address of the exchange server that will be accessed by the mobile device 102. As set forth below, the Exchange fields are used exclusively by the device provisioning process as they are eventually entered into MIS/Synchrologic configuration settings on the mobile device 102. This prevents the end-user from having to manually enter these values on the provisioned mobile device 102.

Although not illustrated, an optional search field may also be provided in the add user view 2800. The search field allows the Customer User to specify some internal value that may be used for tracking purposes. This could be the customer's internal ID for example. A Next button 2814 may also be included that will open an add user services view 2900. In addition, a Cancel button 2816 may be included that cancels the add end-user process and may take the user back to the Active Users view 2600 or may open another page.

Figure 29:
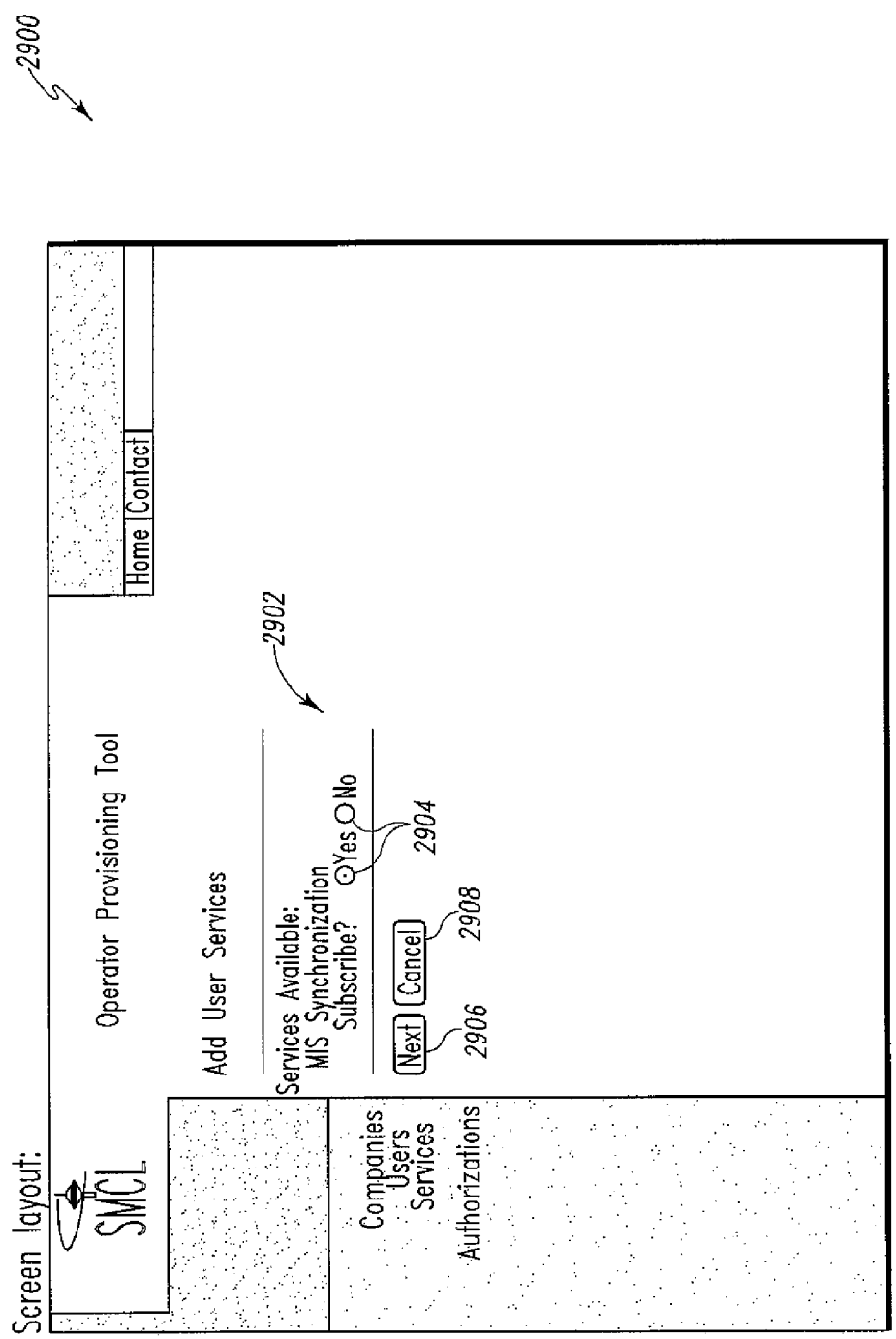
FIG. 29 illustrates an exemplary add user services view of the mobile provisioning tool system.

Referring to FIG. 29, the mobile provisioning tool system 103 may also include the add user services view 2900. The add user services view 2900 lists all business services that are available to the end-user in a business service field 2902. This list may depend on what business services a given customer has subscribed to in their contract. Although not specifically illustrated, end-users may eventually select more than one business service. The business service field 2902 may contain a selection button 2904 that allows the user to select whether or not the end-user will subscribe to a given business service. A Next button 2906 may be included that may open an add user confirmation view 3000 or the mobile provisioning tool system 103 may go ahead and create the new end-user. A Cancel button 2908 may also be included that cancels the process of adding a new end user and may return the user to the Active Users view 2600 or some other page.

Figure 30:
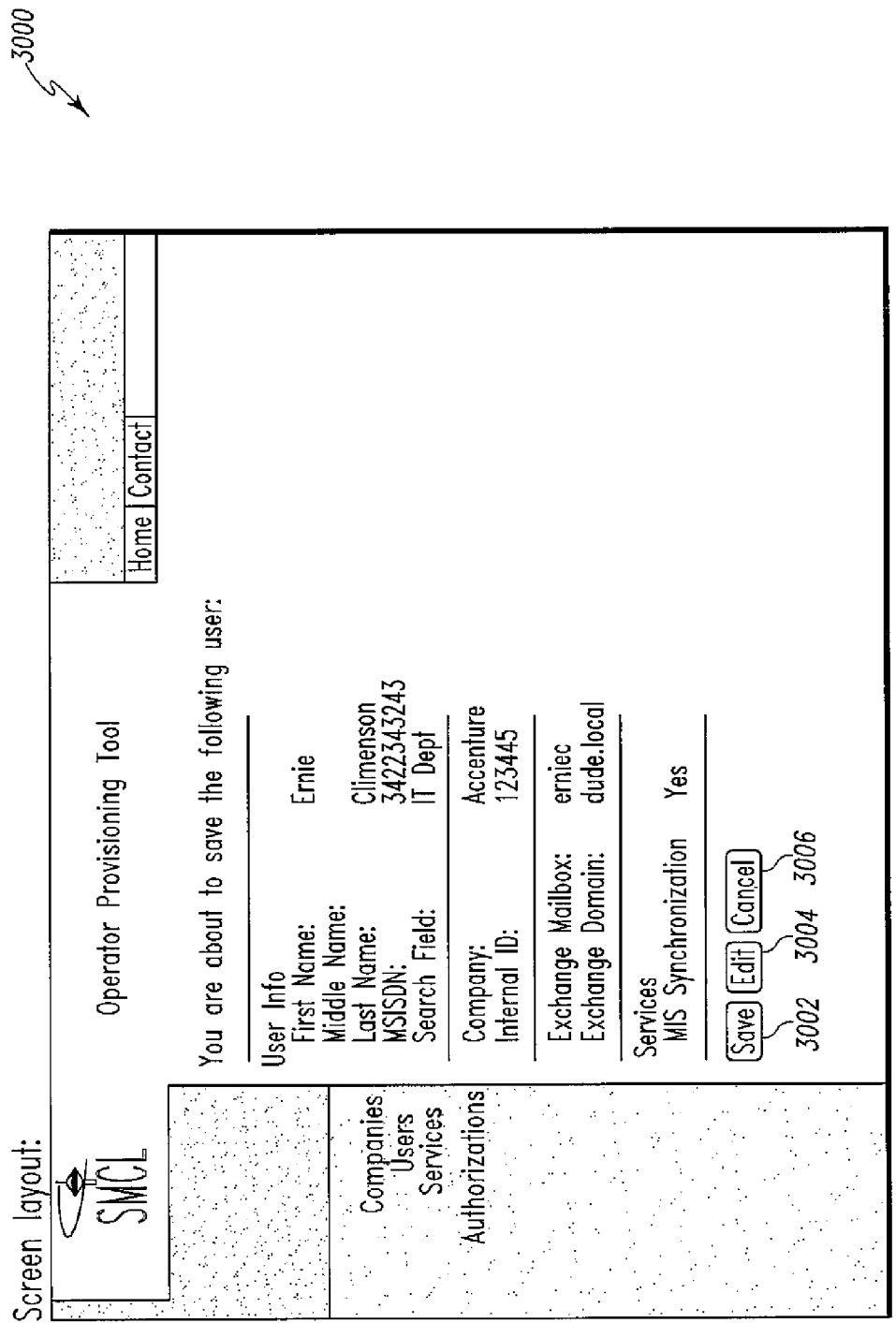
FIG. 30 illustrates an exemplary add user confirmation view of the mobile provisioning tool system.

As illustrated in FIG. 30, the mobile provisioning tool system 103 may include an add user confirmation view 3000, which confirms all entries made during the Add User process. The Customer User is given one last chance to abort the transaction. The Customer User may also go back and re-edit some of the values entered previously. Once the Customer User saves the end-user, a check will be performed to make sure that the Mobile Connection number is valid and that the number falls within the customer's domain. If the Mobile Connection number fails these checks, an error screen will appear with a descriptive message and the transaction will be disallowed. If successful, the end-user is added to the active directory 108 so that he/she may be authorized to synchronize over the mobile service network.

The add user confirmation view 3000 may include a Save button 3002, an Edit button 3004 and a Cancel button 3006. Selecting the Save button 3002 will cause the mobile provisioning tool system 103 to subscribe the end-user to the mobile business service. All authorizations associated with the Mobile Number will be sent to the mobile service authorization systems (i.e.—active directory 108). In addition, all billing system checks will be performed to ensure that the Mobile Number assigned is valid for the given end-user. The Edit button 3004 will take the user back to the add user view 2800 and all entered data will be posted back to the appropriate fields. The Cancel button 3006 may take the user back to the Active Users view 2600 or some other page and cancel the process of adding the new end-user.

Although not illustrated, the mobile provisioning tool system 103 may include an edit user view. The edit user view allows the Customer User to edit certain end-user fields. The Mobile Connection number normally cannot be changed once assigned. It may however, be deleted and then re-created to simulate the change effect. The domain field is initially disabled. This is due to the fact that this field would only change if you happened to re-provision the mobile device 102 to use another domain and mailbox. No legacy systems are affected by editing an end-user. The mobile provisioning tool system 103 may also include an edit business services view that allows the user to edit the business services to which the end-user is subscribed. Further, a view end-user view may also be included that allows the Customer User to view an end-user's information and service status.

Figure 31:
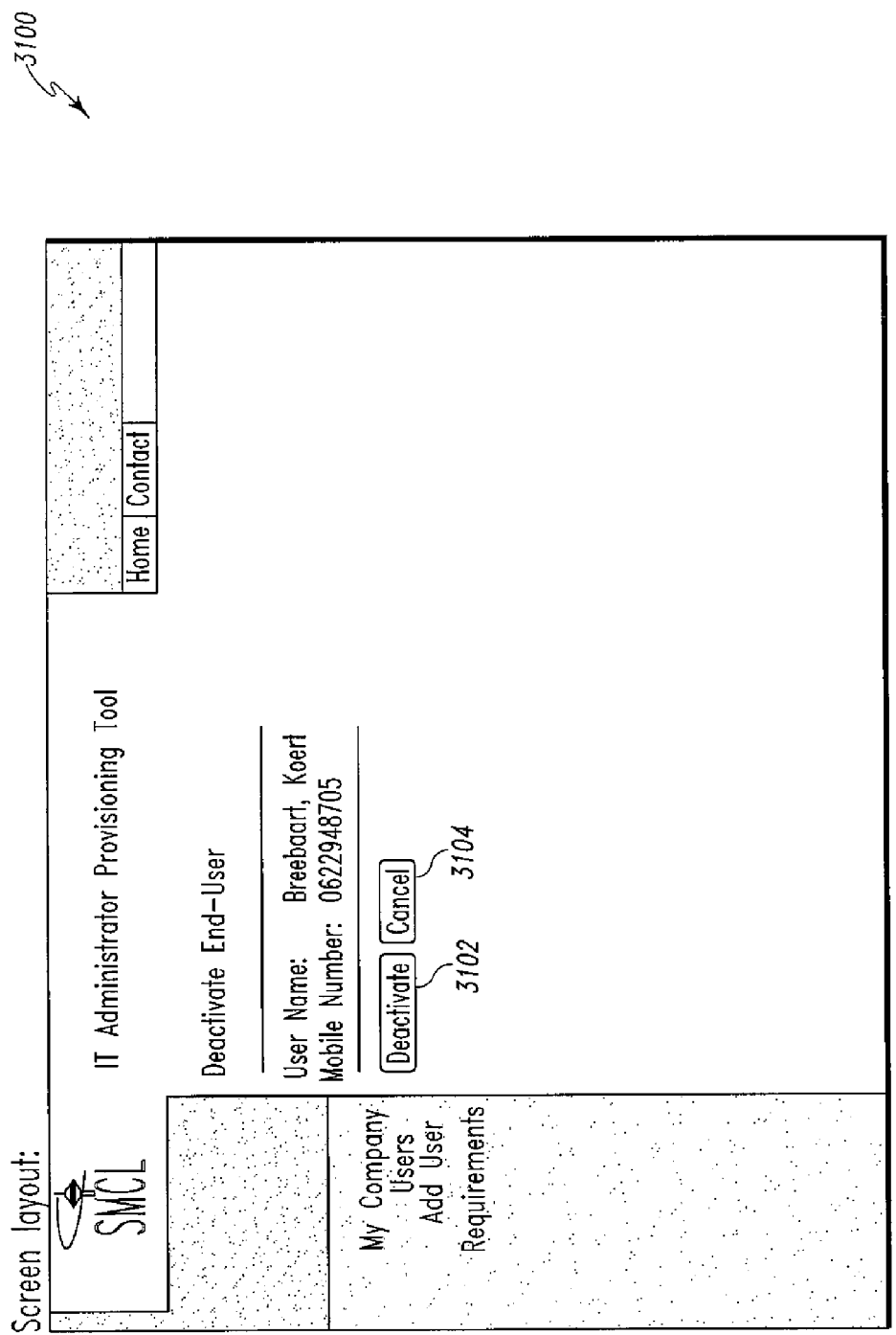
FIG. 31 illustrates an exemplary deactivate end-user view of the mobile provisioning tool system.

As set forth in FIG. 31, the mobile provisioning tool system 103 may also include a deactivate end-user view 3100. Once the proper user is located, selection of a Deactivate button 3102 in the deactivate end-user view 3100 will cause the mobile service bureau system 100 to deactivate the selected end-user. This function in essence blocks or deactivates the end-user from using any mobile service. Once the deactivation process is initiated, a transaction is kicked off to update all billing authorization systems. The end-user should not be able to access any of the mobile service functionality once deactivated. Also, all billing activity for his account will stop immediately (depending on back-end system availability) or soon after deactivation. A Cancel button 3104 on the deactivate end-user page 3100 will cancel the deactivation process and no changes will be made to the system.

Although not illustrated, the mobile provisioning tool system 103 may also include a reactivate end-user view. This function may re-activate a previous user under the same Mobile Connection number. The reactivate end-user view will kick off a process to update billing authorization systems in the same manner as what occurs during the Add User process (i.e. billing checks, add to the active directory 108, etc). An Activate button on the reactivate end-user page is used to reactivate the end-user.

Even though not illustrated, the mobile provisioning tool system 103 may also include a delete user page. Only deactivated end-users can be deleted from the mobile provisioning tool system 103. This function permanently deletes all record of an end-user entered into the provisioning tool database. Note that no legacy systems are affected by this function since the to-be-deleted user has already been deactivated or "cleaned" from participating billing/authorization systems.

Software Provisioning

Figure 32:
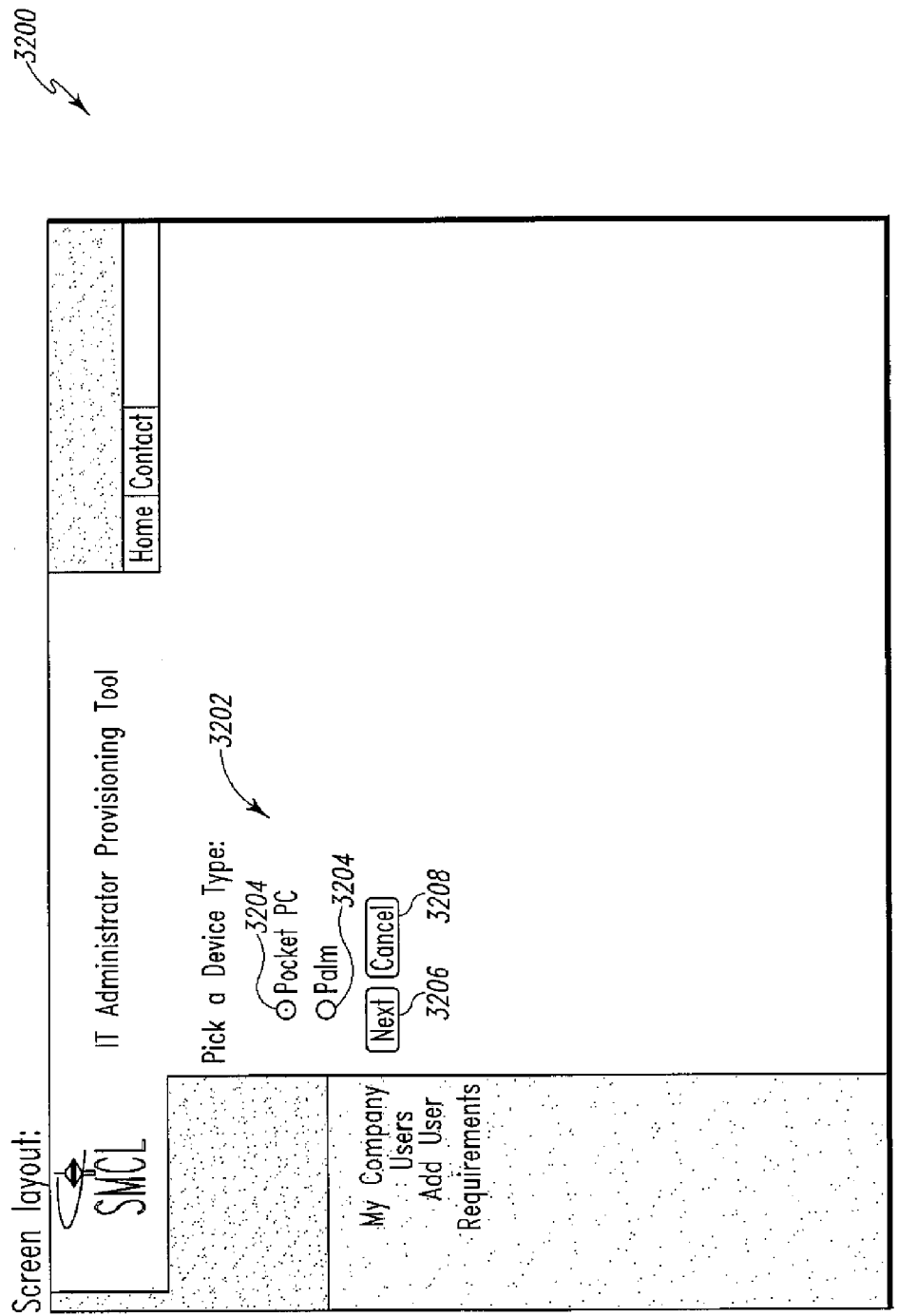
FIG. 32 illustrates an exemplary pick device type view of the mobile provisioning tool system.

Referring to FIG. 32, the mobile provisioning tool system 103 may also include a Pick Device Type view 3200. This is the initial page that is generated by the mobile provisioning tool system 103 during the process of provisioning a mobile device 102. Preferentially, the present invention provides the ability to automatically download and install software onto the mobile devices 102 as well as provision mobile devices 102 for use of assigned business services. The Pick Device Type view 3200 includes a device type list 3202 that includes a plurality of selection buttons or radio buttons 3204 that are associated with each respective mobile device 102 that is contained in the device list 3202. The device type list 3202 may be located in the provisioning tool database and may include a Pocket PC, a PALM, a wireless terminal, a laptop computer, and so forth. Preferentially, the mobile devices 102 are wireless computing devices.

The Pick Device Type view 3200 may also include a Next button 3206 that may open a Pick Supported Device view 3300. As set forth in FIG. 32, for illustrative purposes only the device type has been selected as a Pocket PC. Other device types may be set forth in the device list 3202 and the device types contained in FIG. 32 should be viewed in an illustrative sense and not as a limitation of the present invention. A Cancel button 3208 may also be included in the Pick Device Type view 3200 that may open the inactive user's view 2700 and cancel the process of provisioning the mobile device 102.

Figure 33:
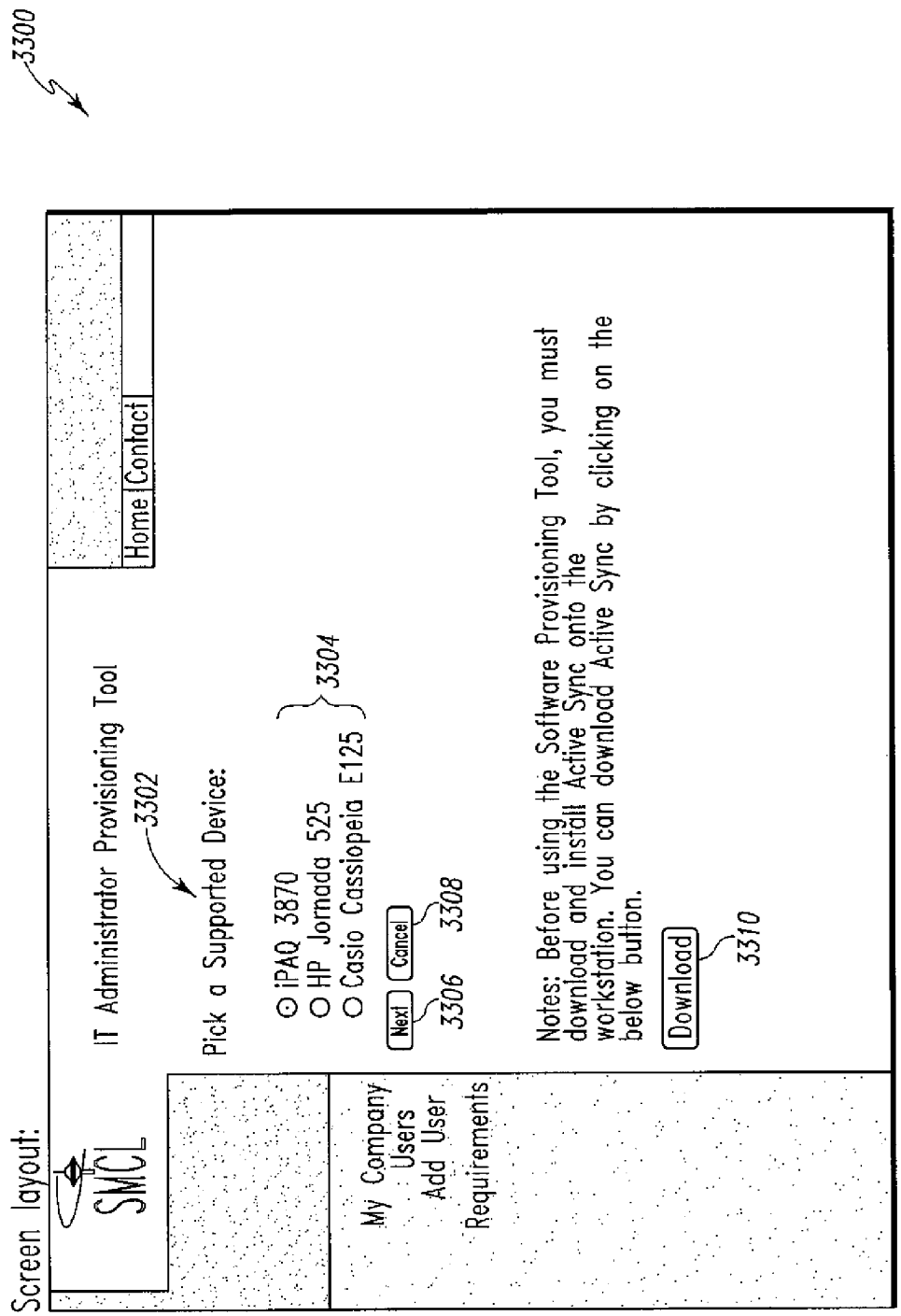
FIG. 33 illustrates an exemplary pick supported device view of the mobile provisioning tool system.

Referring to FIG. 33, as set forth above the mobile provisioning tool system 103 may also include the Pick Supported Device view 3300. Based on the type of mobile device 102 selected from the Pick Device Type view 3200, the mobile provisioning tool system 103 will generate a list of mobile devices 102 that are supported and present them to the Customer User in a Supported Device list 3302 located on the Pick Supported Device view 3300. The list of supported devices may be contained in the provisioning tool database. In addition, there may be a number of specific mobile devices 102 that have different types of processors. This screen is necessary for some mobile devices 102 due to the fact that for example, Pocket PC's have different processor types, which require completely different installation files. So, it is important that the Customer User chooses the correct mobile device 102 from the Supported Device list 3302.

A plurality of selection items or radio buttons 3304 may be included in the Supported Device list 3302 that correspond to each mobile device 102 listed in the Supported Device list 3302. In the embodiment illustrated in FIG. 33, the Customer User has selected the mobile device 102 as an IPAQ 3870 Pocket PC for illustrative purposes only. A Next button 3306 may be included that may be selected after the Customer User selects the correct mobile device 102 from the Supported Device list 3302. Selecting the Next button 3306 will open a Pick Software Configuration view 3400. A Cancel button 3308 may be included to cancel the provisioning process and open the active user's list view 2600 or some other view. A Download button 3310 may also be included that will allow the Customer User to download and install Active Sync on their respective workstation as it may be required in order to provision some of the mobile devices 102.

Figure 34:
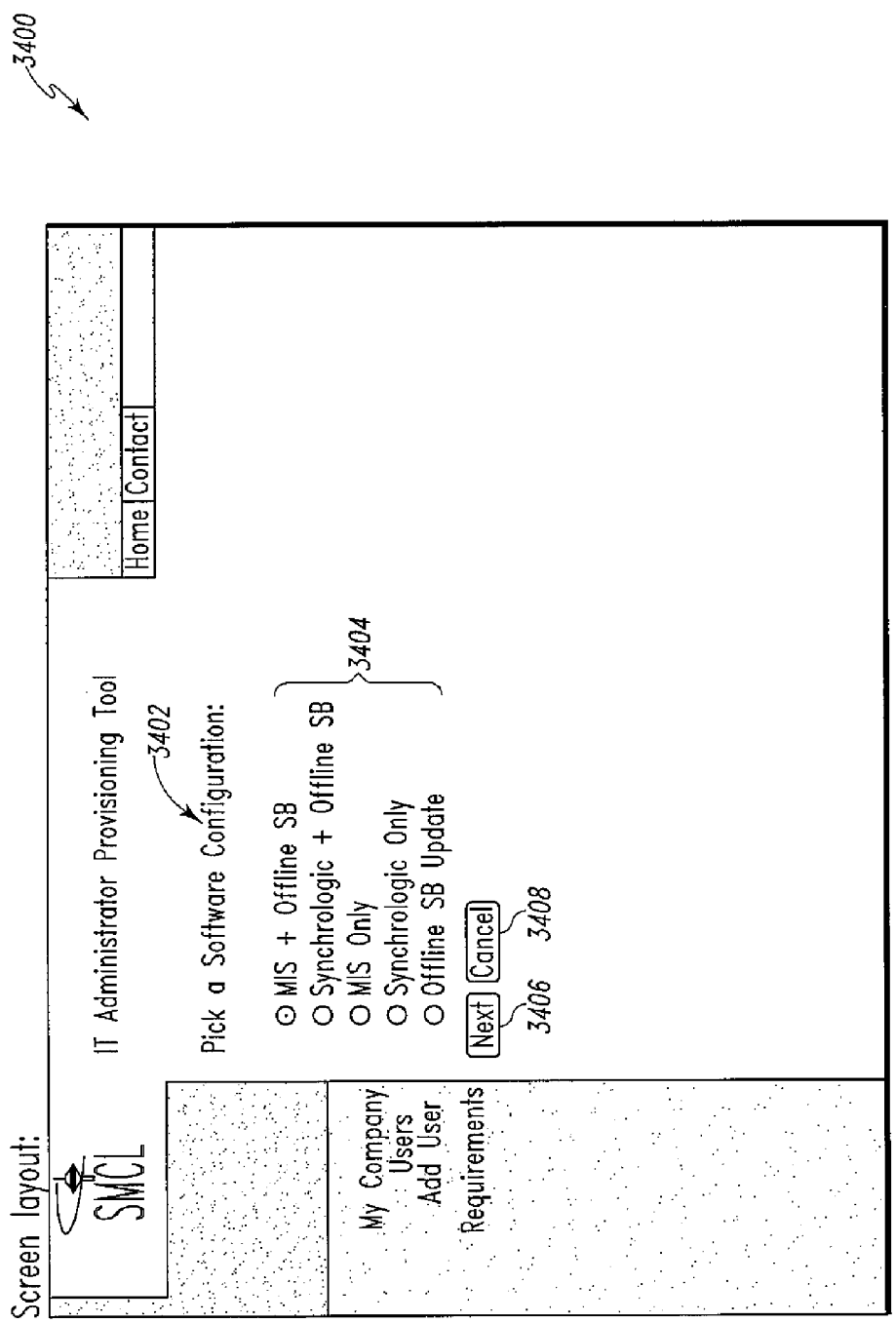
FIG. 34 illustrates an exemplary pick software configuration view of the mobile provisioning tool system.

Referring to FIG. 34, the mobile provisioning tool system 103 may include the Pick Software Configuration view 3400. A number of software applications, business services or synchronization service applications may be listed in a Software Configuration list 3402 on the Pick Software Configuration view 3400 and each software application listed may vary depending on the device type and the mobile device 102. A number of software applications can be configured in the provisioning tool database to be downloaded to the end-user's mobile device 102. A plurality of selection items or radio buttons 3404 may be provided that are associated with each software application contained in the Software Configuration list 3402. A Next button 3406 may be included for opening a Provision Device view 3500 after the proper software package has been selected from the Software Configuration list 3402. A Cancel button 3408 may be included for canceling the software configuration process and returning the user to the active user's list view 2600 or some other page.

In the preferred embodiment, only Supervisors may be able to modify and configure the data model in order to make new software applications available through the mobile provisioning tool system 103. An example of a software configuration might be Synchrologic+Offline Menu. Choosing this software package from the Software Configuration list 3402 would later download and install all software associated with that package on the selected device 102. Thus, in the present example SQL Server CE, Synchrologic client, Offline Menu, and connection settings may all be downloaded and installed onto the cradled mobile device 102.

Figure 35:
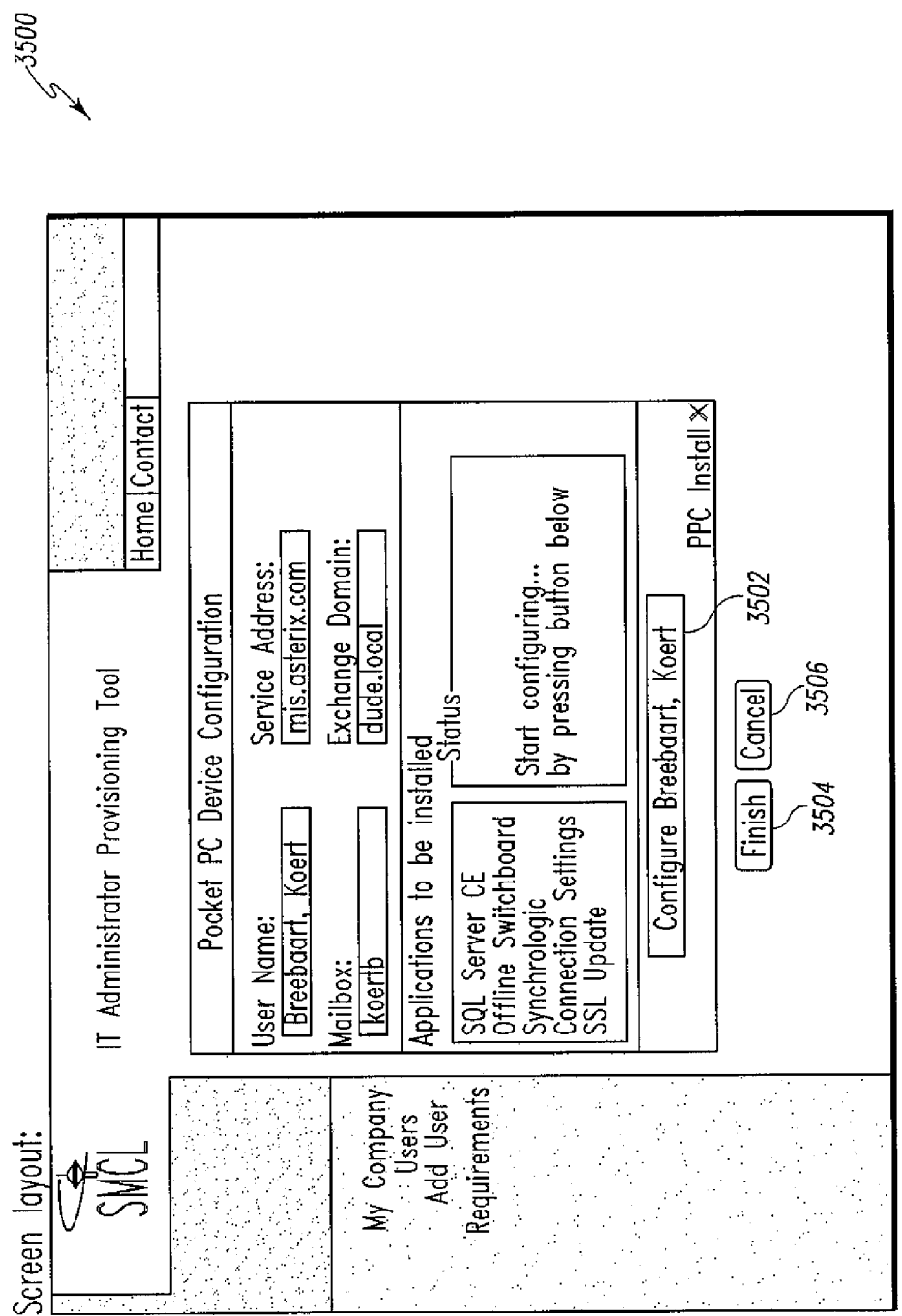
FIG. 35 illustrates an exemplary provision device view of the mobile provisioning tool system.

As illustrated in FIG. 35, the mobile provisioning tool system 103 may include a provision device view 3500. Once activated or opened, the Provision Device view 3500 performs all device-provisioning steps automatically for the end user. All provisioning functions may be encapsulated into an ActiveX control embedded in the Provision Device view 3500. An ActiveX control is like an applet that must be downloaded to the end-user's workstation before provisioning can commence. This may require the end user to add the web site where the mobile provisioning tool system 103 is located to their Trusted Sites list in a web browser located on the workstation. The mobile provisioning tool system 103 may also require that the end user to already have ActiveSync installed on the workstation.

The Provision Device view 3500 will display to the IT Admin or CRM Rep exactly what the end user is about to be provisioned by the mobile provisioning tool system 103. Once the mobile device 102 has been cradled to the workstation, the IT Admin will then click a Configure button 3502. This sets into motion the automatic installation of all software packages and connection settings included in the software configuration Ideally, no user intervention will be needed throughout the entire installation process. There are however, occasions when software applications or network settings may need to overwrite files. In these cases, a pop-up may appear on the mobile device 102 confining that it is permissible to write over that file. These cases are rare and should not appear in any of the initial software configurations.

Once the process has finished, the mobile device 102 will be completely ready or almost ready for use with mobile business services. For example, the only step that may need to be performed manually is the pairing of a Pocket PC device with a Bluetooth GPRS phone. Otherwise, all software configurations as well as network connection settings in the Connection Manager (configured to use Bluetooth or any other type of network) will already be set on the mobile device 102. A Finish button 3504 may be included that may open the active users view 2600 or another page. A Cancel button 3506 may be included that will cancel the provisioning of the mobile device 102 and may return the user to the active users view 2600.

Interfaces

The sections that follow describes the systems that may be required to fully automate the end-user provisioning process performed by the mobile provisioning tool system 103. All users of the mobile service bureau system 100 may be authenticated against the active directory 108, which is controlled within the provisioning tool network. End-users using mobile services will also be authenticated against the active directory 108. Subscribed end-users of mobile services must be added here in order to attain synchronization services.

The mobile service bureau system 100 may also include a billing tool. The billing tool will generally hold GSM/GPRS subscriptions for customer and bill-items for Business Service Connectors sold to customers. All end-users who subscribe to a mobile business service must also be updated in this system. A number of checks (i.e. does the end-user have a GPRS connection, etc.) will also be performed on billing before a mobile service is subscribed to a mobile connection.

The connector gateway 104 separates the carrier network 110 from the customer network 114 and protects the customer network 114 from outside intrusion. In addition the connector gateway 104 may provide access control. It acts as an intermediary between a mobile device 102 and the company server, providing access control, so that the company can be ensured of security and administrative control.

During operation, the connector gateway 104 receives a request for a business service (such as Exchange) from an end user. If it passes filtering requirements, the connector gateway 104, acting as a client on behalf of the user, uses one of its own IP addresses to request the information from the server. When the information is returned, the connector gateway 104 relates it to the original request and forwards it on to the mobile device 102. To the user, the connector gateway 104 is invisible. All requests and returned responses appear to be directly with the addressed customer network 114. The connector gateway 104 is not quite invisible; its IP address has to be specified as a configuration option to the client's protocol program.

A provisioning tool active directory (PT-AD) interface is responsible for creating, updating, and deleting tool user authorizations within the active directory 104. This interface will be used when initially creating tool users in the active directory lightweight directory access protocol store. During the Provisioning Tool's Add Tool User process username information will be sent to the back-end component object model (COM) component, which will then perform a lightweight directory access protocol query to carry out the user creation. Upon completion, a return code will be returned to the COM component. This interface will also be used to update/delete tool users. However, the only field that may be updated will be the password field as specified in the Set Password section.

When an end-user is created or activated in the mobile provisioning tool system 103, a number of checks are performed first off to make sure the Mobile Connection is a) a valid GPRS subscription and b) falls within the company's contract domain. If all checks are successful, then the user is added to the active directory 108 via the PT-AD interface. End-users can also be deleted via this interface but may not be updated. Rather, it is recommended that the user attached to the mobile connection is dropped and recreated to simulate a change.

The PT-AD interface also represents communication that will occur when a user logs onto the mobile service bureau system 100. Assuming the tool user is already created in the active directory 108, a simple LDAP query is all that is necessary to authenticate the user. However, since all business requests must be originated from a secure back-end server (security requirement), a COM component should be built to lock down these LDAP queries to the active directory 108. So, rather than performing an LDAP query directly from a web page (using script languages), all LDAP authentication queries should be performed through a back-end component.

Thus, the web page will call an interface of the back-end component passing in the username and password as arguments. This component will then initiate an LDAP query (read) based on the username to authenticate the user. If successful, the component will return a success code that the web page will interpret as a successful authentication. If unsuccessful, then the user will be denied access to the mobile service bureau system 100.

A billing provisioning tool (BILL-PT) interface will perform all validation checks in billing when adding customers and end-users. Most importantly, when an end-user is added, a check is performed to make sure that end-user belongs in the customer's pool of GPRS subscription numbers. If not, the end-user cannot be provisioner A check is also performed to make sure a GPRS connection already exists for that end-user. End-users will not be able to use mobile services without a GPRS subscription.

The BILL-PT interface will also be in place in the event that a Mobile Connection (MSISDN) is deactivated from within billing systems. If a Mobile Connection is deactivated, all corresponding entries related to that Mobile Connection must be deleted within the provisioning tool database. This will require a component to trigger a notification event whenever a Mobile Connection is deactivated within the billing system. This notification event will send a message via legacy middleware (XML over HTTP) to the mobile provisioning tool system 103. In addition, a component on the mobile provisioning tool system 103 will sit and listen for incoming messages on a predetermined port.

The content of the message will simply contain the Mobile Connection number to be deleted from the mobile provisioning tool system 103. The component will then check to see if the Mobile Connection records exist in the database. If yes, all corresponding records (business Service Connectors) will be wiped clean in the provisioning tool database. If not, no changes will be made to the provisioning tool database. If all is successful, a success code will be returned to the calling billing system component.

The connector gateway 104 uses the provisioning tool database as a reference list for Business Services and server IP-addresses when filtering synchronization requests. After doing a lookup of the session database to determine the customer based on MSISDN, the connector gateway 104 will then find the corresponding Business Service Host (host name, port, scheme, etc). This Business Service Host information originates in the web-based mobile provisioning tool system 103 as CRM Reps add customers to the system. The following fields are stored initially in the provisioning tool database: Customer ID; Business Service Code (MIS, SYN); Business Service Host (A, B, C, . . . ); Scheme (Plain, TSL); Hostname; Port; Mean Speed; Peak Speed; and Concurrent Users.

Figure 36:
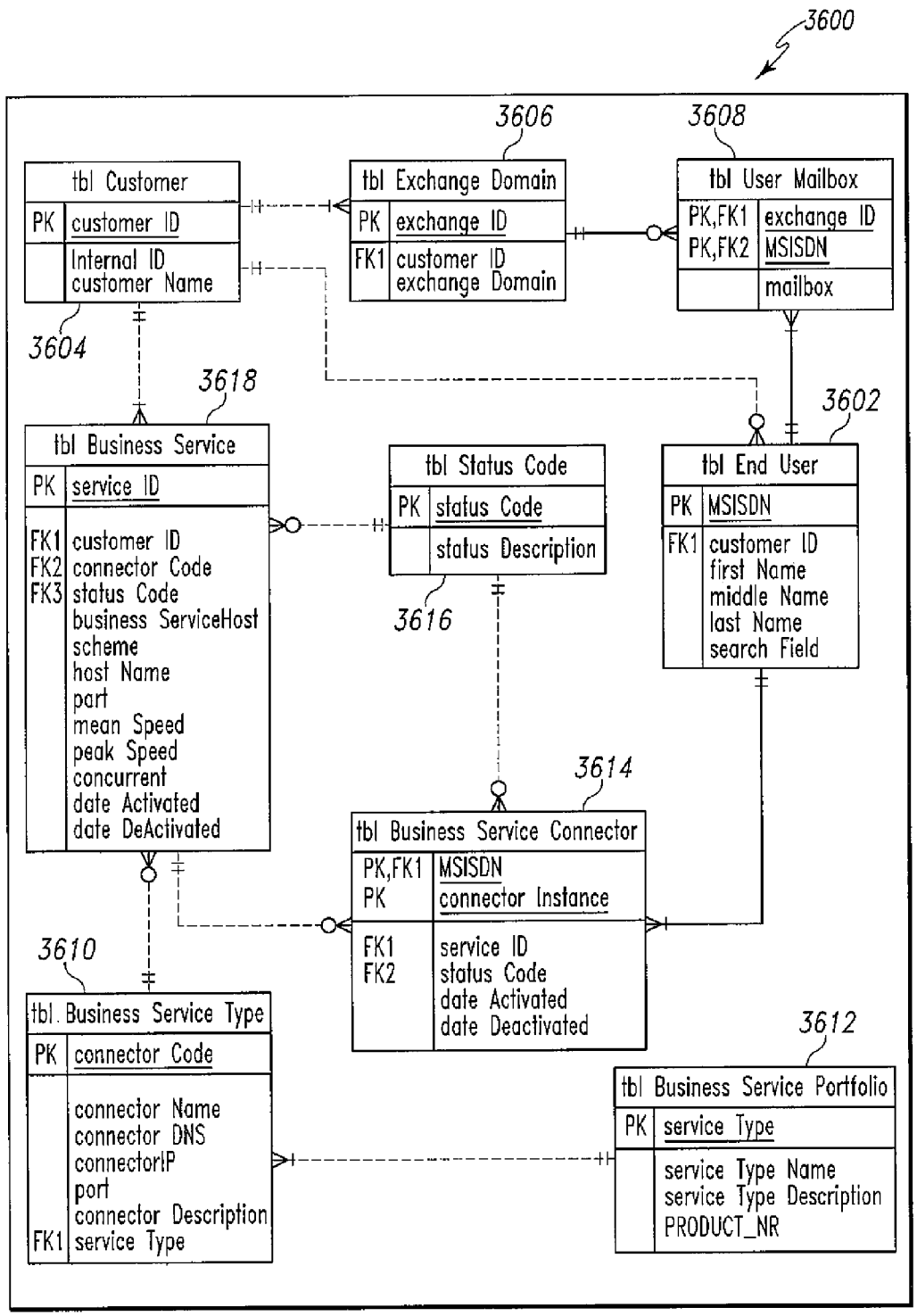
FIG. 36 illustrates an entity-relationship diagram of objects stored in the provisioning tool database of the mobile provisioning tool system.

FIG. 36 illustrates an Entity-Relationship diagram 3600 of all objects to be stored in the provisioning tool server database located on the MSB server 132. Most of this data is necessary to track customer and end-user specific data as well as certain display fields. Some data objects (i.e. exchange domain and user mailbox) are stored in the database to later be written to the device during the device provisioning process. The explanations below also include entities that are necessary for the connector gateway 104.

The provisioning tool database may include an End User table 3602 that stores name information for all end-users of the provisioning tool mobile services as well as the unique Mobile Connection number (MSISDN) assigned to each mobile device 102. The End user table may include a MSISDN attribute that is the mobile connection number that is assigned to each mobile device 102 as a unique identifier. A customer ID attribute may be included that sets forth the customer that the end-user belongs to or works for through which they have received the mobile device 102. The End User table 3602 may include a First Name attribute, a Middle Name attribute, a Last Name attribute that indicate the name of the end-user. A Search Field attribute may be included as a free-field that will allow IT Admins to associate the end-user with an internal number or ID.

A Customer table 3604 may be included that stores information for customers, which may be the customer/company name and an associated contract/account structure or Internal ID. All other customer information may already be stored in billing/legacy systems. As such, the Internal ID may be the link to these billing systems. The Customer table 3604 may include a Customer ID attribute, an internal ID attribute and a Customer Name attribute. The Customer ID attribute may be a separate identifier that is created automatically. The Internal ID attribute is an ID that links to billing systems, which defines the customer's contract structure. The Customer Name attribute may simply be the name of the customer and may be for display purposes only.

The provisioning tool database may include an Exchange Domain table 3606 that stores a customer's exchange domains since a customer may have more than one child domain controlled by MIS or Synchrologic. These domain names will be needed during the provisioning of mobile devices 102 to automatically fill in the end-user's mailbox and domain. Otherwise, the end-user would have to manually enter his/her mailbox and domain information. The Exchange Domain table 3606 may include an Exchange ID attribute that may be a numeric value that is an auto-generated unique ID. A Customer ID attribute that may be a foreign key of the customer who controls the domain. An Exchange Domain attribute may be included that is a string of data that indicates the domain of the customer (e.g.—asterix.com).

A User Mailbox table 3608 contains all mailboxes that can be associated with a specific user since one user may have several mailboxes in different child domains. Exchange mailbox information will be needed during the provisioning of mobile devices 102 to automatically fill in the end-users mailbox and domain. Otherwise the end-user would have to manually enter his/her domain/mailbox information. The User Mailbox table 3608 may include the Exchange ID attribute, the MSISDN attribute, and a Mailbox attribute. The Mailbox attribute indicates the exchange mailbox of the end-user (i.e.—johns).

The provisioning tool database may also include a Business Service Type table 3610. This table defines each business service type as well as its associated connector gateway DNS information. An example of a Business Service Type would be MIS Synchronization (MIS) or Synchrologic Synchronization (SYN). Each business service type will be given a generic DNS name (i.e. mis.asterix.com) that will later be input on all provisioned mobile devices 102 using this service type. Along with the DNS name will be the associated IP. So, this table primarily serves as a lookup table for the connector gateway 104.

The Business Service Type table 3610 may include a Connector Code attribute that is a data string that may be used for validation (e.g.—MIS or SYN). A Connector Name attribute may be included that is a short descriptive name of the connector for display purposes. A Connector DNS attribute may be included that indicates the generic DNS name that will be associated with this service connector (e.g.—pim.asterix.com). A Connector IP attribute is the IP address associated with the DNS name (e.g.—194.151.124.139). A Port attribute may also be included that indicates the port that the connector gateway 104 will use to enter or access the customer network 114. A Connector Description attribute may contain a description and purpose of the connector. A Service Type attribute may be included that contains a description of the general business service type that this connector belongs to. For example, the Synchrologic (SYN) connector belongs to the PIM Synchronization (PIM) general service type.

The provisioning tool database may also include a Business Service Portfolio table 3612, which may be used to define a group of related Business Service Types. For example, PIM can describe MIS Synchronization (MIS) as well as Synchrologic Synchronization (SYN) defined in the Business Service Type table 3610. SAP may be another example used to describe a set of related SAP service types.

The Business Service Portfolio table 3612 may include the Service Type attribute. In addition, a Service Type Name attribute may be included that indicates the service type name for display purposes. A Service Type Description attribute may be included for display purposes only. A Product attribute may also be included that indicates an internal billing number.

A Business Service Connector table 3614 may be included in the provisioning tool database that associates subscribed connectors to each user along with the current status of the business service. For example, end-user John Doe may be subscribed to the MIS connector thus having an Active status. The Business Service Connector table 3614 may include the MSISDN attribute that indicates the mobile connection where the subscription exists and the Connector Code attribute that is the foreign key to the business service that is subscribed to. A Connector Instance attribute may be included that may be an integer that may be used for validation. A Status Code attribute may be a string that indicates the status of the end-user's subscription (e.g.—active, processing, pending or inactive). A Date Activated and a Date Inactivated attribute may also be included that indicates the date the subscription became active and was deactivated, if applicable.

A Status Code table 3616 may be included in the provisioning tool database that contains all status codes in regards to Business Service Connectors. Status Codes may include Active, Inactive, Pending, and Processing. These status codes will be required if queuing mechanisms are necessary between the provisioning tool and legacy system interfaces. The Status Code table 3616 may include the Status Code attribute and a Status Description attribute that may be used for general purposes only.

A Business Service table 3618 may be included in the provisioning tool database that associates all business services that a customer has signed up for. The number of business services that a customer has access to will constrain which business services are available to that customer's end-users. Also, each business service entry will contain the customer's MIS or Synchrologic server information to be accessed by the connector gateway 104.

The Business Service table 3618 may include the Customer ID attribute and the Connector Code attribute. A Business Service Host attribute may be included that is used to indicate the business service host. A Scheme attribute may be included that indicates how data will be transferred. The data may be transferred with no encryption and use a normal server connection or through an encryption method, such as TSL, which will encrypt the server connection.

A Hostname attribute may be included that indicates the fully qualified domain name of the server to be resolved by the connector gateway 104. A Port attribute may be included that indicates the port of the customer network 114 that the carrier network 110 should use when it creates a session. A Mean Speed attribute may be included that sets forth the speed in bits/s that will be sustained for longer transfers. A Peak Speed attribute sets forth the speed in bits/s that will be allowed for transfers above the mean speed but for less than a maximum amount of bits. A Concurrent attribute that may indicate the maximum number of connections that will be accepted by the server on the carrier network 114 at any given time. In addition, the Date Activated attribute and the Date Inactivated attribute may be used by the Business Service Table 3618.

Authentication and Authorization

The majority of online users of the mobile provisioning tool system 103 will be Customer Users, also known as IT Administrators. When logging on to the mobile provisioning tool system 103, these Customer Users will only be able to view data in respect to their companies. Thus, the mobile provisioning tool system 103 must be secured in a way that prevents Customer Users to see other customers' data.

There will also be several internal accounts accessing the mobile provisioning tool 100. These members will include Supervisors as well as CRM representatives. These users will be able to perform functions above and beyond that of the Customer User. Mainly, Supervisors will be able to manage customers, business services, and authorizations while CRM Reps will be able to manage customers and customer authorizations.

The end-user's logon account is created in the active directory 108 of the mobile service bureau system 100. Thus, all users of the mobile service bureau system 100 and mobile provisioning tool system 103 will be authenticated against the active directory 108. Note that only the key data elements of the account will be stored here. The key data elements to be stored in the active directory 108 may be: Username; Password; Full Name; Description; Security Group; Customer ID (if applicable); Expire Date; and Blocked Status.

Authorization is required by the mobile provisioning tool 103 to restrict the user such that they see data relevant only to the business roles they are authorized to use. This will be imperative, since customers may obtain other customers' information if the system is not properly secured.

Many of the lock-down procedures (Access Control Lists, Virtual Directory security, etc) will be performed manually. This includes the definition of security groups as well as the restriction of these groups to a set of pages, folders, virtual directories, and download files (e.g. objects). Permission levels will also need to be configured for data access to allow specification of permission levels on the SQL database (create, read, update, delete).

Software Provisioning Tool

Figures 37, 38:
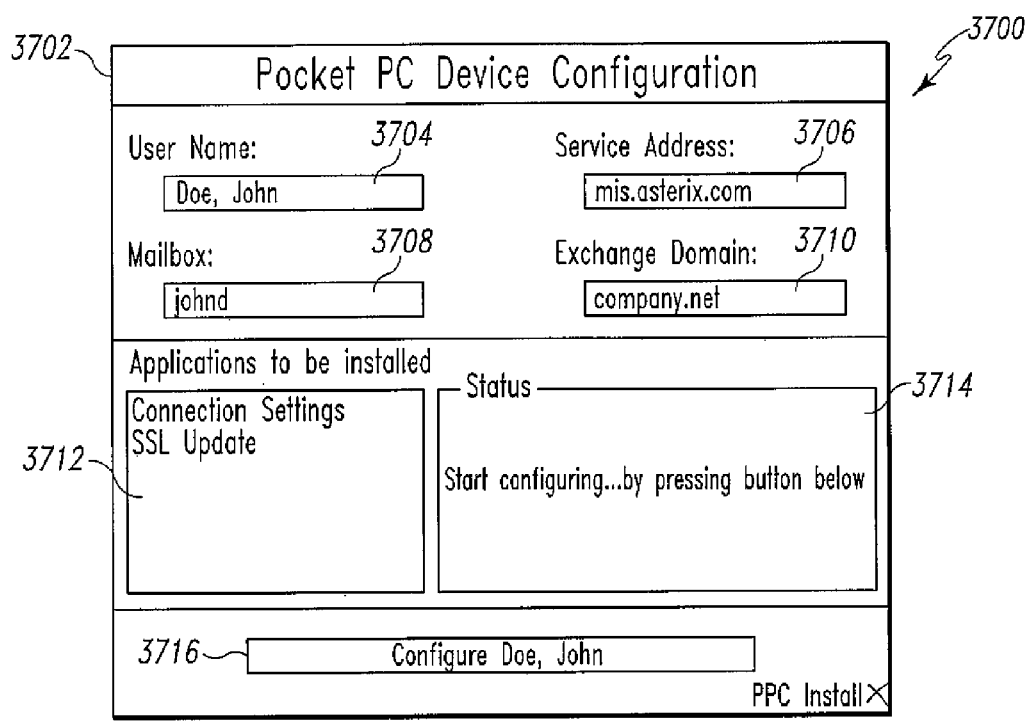
FIG. 37 illustrates an exemplary view of an application manager of the mobile software provisioning tool.
FIG. 38 illustrates an exemplary setup package.

Referring to FIG. 37, another aspect of the present invention discloses a mobile software provisioning tool 3700 that facilitates the download and installation of software and connection settings via a web browser onto a mobile device 102. The mobile software provisioning tool 3700 may be employed as a combination of Active Server Pages (ASP) as well as an ActiveX control. As illustrated, the software provisioning tool 3700 may include an application manager 3702 that is generated when the user is installing software and connection settings onto the mobile device 102. Although not illustrated, the user may use a provisioning workstation to use and gain access to the software provisioning tool 3700 and the provisioning workstation should be connected with the mobile device 102.

In the preferred embodiment, the following software requirements should be met by the provisioning workstation before the software provisioning tool 3700 is used in connection with installing software and network connection settings on the mobile device 102. Although not illustrated, the provisioning workstation is used to provide (install and/or configure) the mobile device 102 while cradled or connected with the mobile device 102. The provisioning workstation may include an operating system (e.g.—Windows 2000 and above), a web browser (e.g.—Internet Explorer 5.0 and above), an application manager (e.g.—Active Sync 3.5 and above), and Visual Basic Runtime 6. The mobile device 102 should include at least an operating system (e.g.—PPC 2002 Operating System and above) that is installed on the mobile device 102. Other software may be substituted for the above-referenced exemplary software applications and are envisioned to be used in connection with the software provisioning tool 3700.

Although not illustrated, the user may cradle the mobile device 102 before initiating the provisioning process in a cradle or docking station that is connected with the provisioning workstation. The cradle provides a connection between the mobile device 102 and the provisioning workstation. Also, a website that is used to access the mobile software provisioning tool 3700 may be added to the web browser's list of trusted sites, since the software provisioning tool 3700 may make use of ActiveX controls while installing and configuring the mobile device 102.

Application Manager

As illustrated in FIG. 37, the mobile software provisioning tool 3700 may be designed around an application manager 3702 that may be initiated by the end user selecting an icon or accessing a trusted website via a web browser installed on the workstation. The application manager 3702 is a set of screens/functionality a user sees when installing/uninstalling software and configuring mobile devices 102. The screen, web page or view set forth in FIG. 37 is set forth for illustrative purposes and should not be construed as a limitation of the mobile software provisioning tool 3700. As illustrated, the screen may include a User Name field 3704, a Service Address field 3706, a Mailbox setting field 3708, a Mailbox or Exchange Domain setting field 3710, an Application to be Installed field 3712, a Status field 3714 and a Configure selection button 3716.

The User Name field 3704 may set forth the name of the end user that will use the mobile device 102 once provisioned by the mobile software provisioning tool 3700. The Service Address field 3706 may set forth the domain name of the business service that may be set-up and configured by the mobile software provisioning tool 3700. The Mailbox field 3708 may indicate the mailbox that the end user subscribes to on the customer network 114. The Exchange Domain field 3710 indicates the domain of the email server 126 on the customer network 114. The Applications to be Installed field sets forth the software applications that are being installed on the mobile device 102. The Status field 3714 may set forth the current status of the provisioning process, which will change or be updated according to the relevant status. The Configure button 3716 initiates the provisioning process performed by the software provisioning tool 3700.

Many of the functions performed by the application manager 3702 may be reproduced within an ActiveX control of the mobile software provisioning tool 3700. Since the application manager 3702 may form the basis for design of the mobile software provisioning tool 3700, a brief overview of its functions is set forth in order to gain a better understanding of the scope and spirit of the present invention.

Referring to FIG. 38, when a user clicks a set-up icon (e.g.—Setup.exe) 3800 to install a software application, business service or configure the mobile device 102, the first thing that the application manager 3702 may do is check to make sure that the mobile device 102 is connected with the provisioning workstation. If the mobile device 102 is connected with the provisioning workstation, the install process proceeds. Otherwise, the application will be queued by the application manager 3702 until the mobile device 102 is cradled and synced with the provisioning workstation.

The next function that may be performed by the application manager 3702 is to ensure that a proper auto install or CAB file 3802 is sent to the mobile device 102 as a function of the architecture or processor type of the mobile device 102. Each software application setup package for the various types of mobile devices 102 may contain files similar to those set forth in FIG. 38. In this example, there are four different CAB files 3802 differentiated by processor type. Various mobile devices 102 will contain different processor types and as such, a unique CAB file 3802 may be required for the varying types of mobile devices 102.

When running Setup.exe, the application manager 3702 may poll the mobile device 102 to check the processor type. Once the processor type is known, the appropriate CAB file 3802 is transferred onto the mobile device 102. A program on the mobile device 102 will then automatically extract/install this CAB file 3802 on the mobile device 102 without the assistance of any user. The installation and configuration process is thereby finished. In summary, the main functions performed by the application manager 3702 are: 1) check to see if the mobile device 102 is connected to the provisioning workstation; 2) identify processor type of the mobile device 102; 3) copy over processor-specific CAB file to the mobile device 102; and 4) Extract/install the CAB file on the mobile device 102.

Software Provisioning Tool—Application Install Process

As mentioned in the previous section, a number of major functions are performed by the application manager 3702 of the mobile software provisioning tool 3700. All of these functions are performed automatically with a click of one button. The first function or process performed by the application manager 3702 is to check to see if the mobile device 102 is connected with the provisioning workstation. This step should be performed to ensure that the mobile device 102 is cradled or connected to the provisioning workstation. If no mobile device 102 is connected or the application manager has been disabled on the mobile device 102, a warning message will appear instructing the user to cradle their device (see figure below). Otherwise, if connected, the download and install process will commence.

Figures 39, 40:
FIG. 39 illustrates another exemplary view of the application manager of the mobile software provisioning tool.
FIG. 40 illustrates another exemplary view of the application manager of the mobile software provisioning tool.

Referring to FIG. 39, if the application manager 3702 determines that the mobile device 102 is connected with the provisioning workstation, the application manager 3702 will begin to download a processor-specific auto-installation file 3802 from a predetermined Internet Download location. The status section 3714 of the application manager 3702 may be updated with a message that indicates that the file 3802 is being downloaded and may provide a download progress indication that sets forth the progress of the download. The application manager 3702 will download the CAB installation file 3802 from the Internet Download location onto the provisioning workstation.

In one illustrative embodiment, in order to control the software packages on the server-side, which is the Internet Download location, all software CAB installation files 3802 to be loaded on the mobile device 102 may be stored on the web server under a software virtual directory. The folder structure may be as follows: Software→<Application Name>→<processor Type>→<cab file>. So, an example download location for SQL Server CE for a Strong Arm processor type (e.g.—iPaq 3870) may be: http://BaseURL/Software/SSCE/SA1100/SQL_CE.SA1100.CAB, where BaseURL equals the appropriate web server IP or DNS address of the download site.

Prior to this process, the end-user may have indicated what specific mobile device 102 will be provisioned. Thus, choosing the right processor-specific Cab file 3802 is a matter of looking in the appropriate directory based on the processor type of the chosen mobile device 102. As such, after ensuring that the mobile device 102 is connected with the provisioning workstation, the mobile software provisioning tool 3700 may initiate a download of the installation file in question from the web server.

The installation file may by default be stored in a temporary or predetermined directory on the provisioning workstation. Before downloading the file, the mobile software provisioning tool 3700 may check this directory to make sure that the file doesn't already exist on the provisioning workstation. If it does already exist, the download process is cancelled and the next step is performed. This is because a provisioner may configure hundreds of mobile devices 102 and after having downloaded the install file once, time will be saved running installations from the already existing local file rather than re-downloading. For example, if the provisioner is provisioning one hundred mobile devices 102 and it takes one minute to download the installation file, the provisioner may save up to one hundred minutes of time in connection with provisioning the mobile devices 102.

Referring to FIG. 40, once the download of the CAB installation file 3802 is complete, the mobile software provisioning tool 3700 will automatically begin the next step of copying the CAB installation file 3802 over to the mobile device 102. As illustrated, the status section 3714 of the application manager 3702 will be updated to reflect that the current status of the provisioning process is copying the installation file to the mobile device 102. In addition, the application manager 3702 may provide an installation progress indication that sets forth the progress of the copying process.

In one embodiment, to copy the CAB installation file 3802 to the mobile device 102 the mobile software provisioning tool 3700 may employ a Remote Application Programming Interface (RAPI), which may be the same set of functions employed by the application manager 3702. Using the RAPI functions, the CAB installation file 3802 in the temporary or predetermined directory of the provisioning workstation may be copied over to the root (\) directory of the mobile device 102.

After the CAB installation file 3802 has been copied over to the mobile device 102, the mobile software provisioning tool 3700 may again use RAPI functions to kick off a software installation component located on the mobile device 102. The software installation component is responsible for extracting all processor-specific CAB files 3802 including the recently copied-over installation file. The end-user will now see the application being installed on the mobile device 102, and in most cases, no interaction will be needed. In some rare cases (i.e. re-installation), the end-user may receive "Do you want to overwrite" messages and the like.

Figure 41:
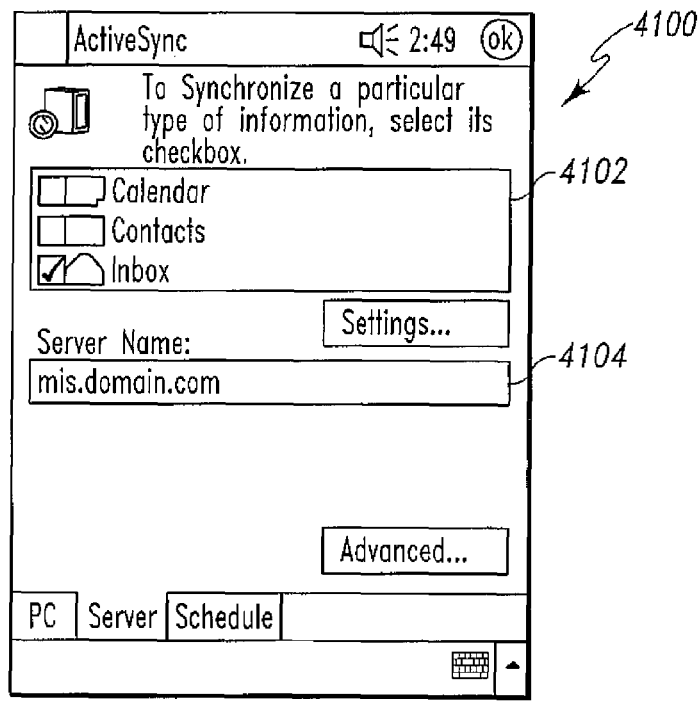
FIG. 41 illustrates an exemplary view of network configuration settings installed in a connection manager.
Figure 42:
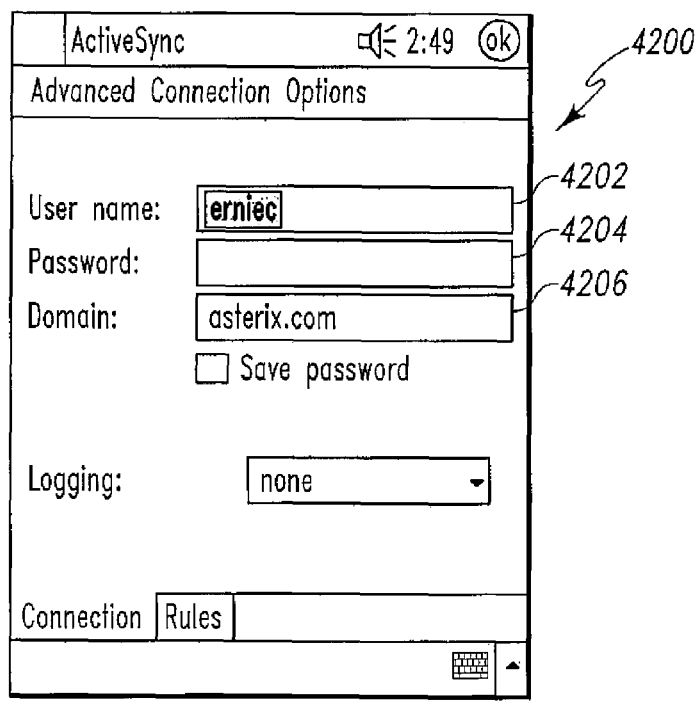
FIG. 42 illustrates another exemplary view of network configuration settings installed in a connection manager.
Figure 43:
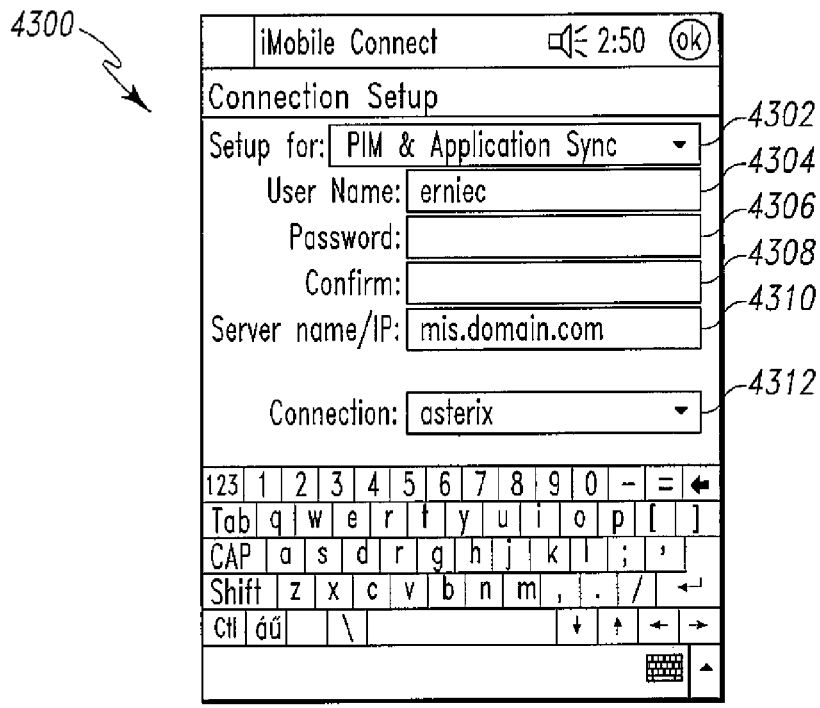
FIG. 43 illustrates another exemplary view of network configuration settings installed in a connection manager.

Referring to FIGS. 41-43, a number of network configuration settings may automatically be written to a registry of the mobile device 102 once all applications have been installed onto the mobile device 102. For instance, the settings for MIS and Synchrologic may be configured and include: a User Mailbox; an Exchange Domain; and an Exchange Server. These settings are included in the actual code of the ActiveX control since these values will change from user to user. The above settings would otherwise have to be manually entered in by the user and are required for synching e-mail. Note: registry entries that are static (i.e. won't change from user to user) should be installed on the mobile device 102 using CAB files (see next section).

As illustrated in FIG. 41, the mobile software provisioning tool 3700 may automatically setup an active sync server setting 4100 on the mobile device 102. The active sync server setting 4100 may include a plurality of information services 4102 that need to be synced with a respective server. As such, the software provisioning tool 3700 will automatically select the appropriate information services 4102 and fill in a server setting 4104 on the mobile device 102. The user will not have to manually setup any settings in the active sync server setting 4100, which will save time and resources.

Referring to FIG. 42, the mobile software provisioning tool 3700 may also automatically setup an active sync mailbox and domain setting 4200 on the mobile device 102. The active sync mailbox and domain setting 4200 may include a user name field 4202, a password field 4204, and a domain field 4206. As illustrated, the software provisioning tool 3700 may automatically provide the appropriate entries to these fields 4202-4206 for each respective user of the mobile device 102. The user name field 4202 and the password field 4204 will vary from user to user, but the domain field 4206 will remain the same for each respective company or entity.

As illustrated in FIG. 43, the mobile software provisioning tool 3700 may also automatically setup a synchrologic server and mailbox setting 4300 for the mobile device 102. The synchrologic server and mailbox setting 4300 may include a setup field 4302, a user name field 4304, a password field 4306, a password confirmation field 4308, a server name field 4310, and a connection setting field 4312. The setup field 4302 is used to setup the services for which the synchronization will occur. The user name field 4304, the password field 4306 and the password confirmation field 4308 will vary from user to user and will be used to identify and log in a respective user. The server name field 4310 will be used to identify the server that the mobile device 102 will connect to in order to sync the mobile device 102. The connection setting field 4312 will be used to select the type of connection that the mobile device 102 will use to connect to the server.

Software Provisioning Tool—Connection Manager Configuration

Figure 44:
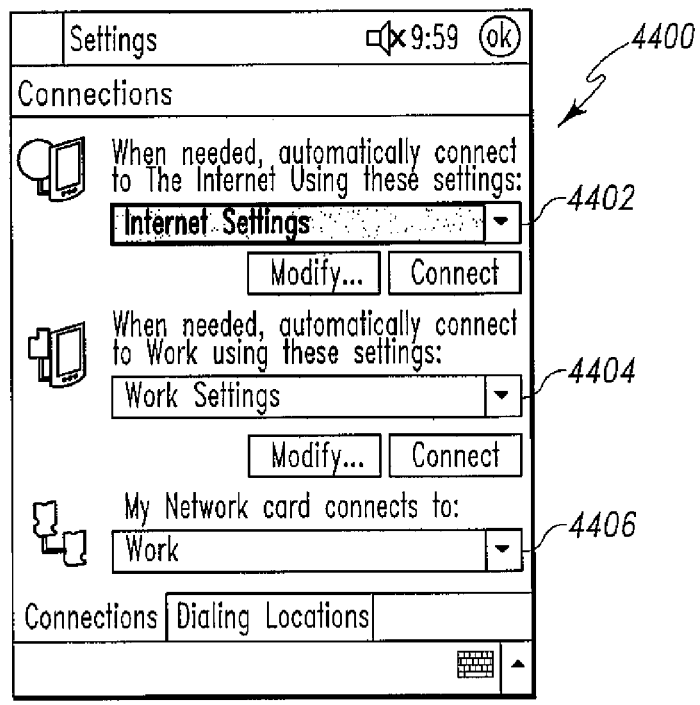
FIG. 44 illustrates another exemplary view of network configuration settings installed in a connection manager.

Referring to FIG. 44, as briefly set forth above in addition to downloading and installing software, the mobile software provisioning tool 3700 may also automatically configure a plurality of network connections (i.e. Bluetooth, GPRS and so forth) within a Connection Manager 4400 of the mobile device 102 that would otherwise have to be entered manually. As illustrated, the Connection Manager 4400 may include an Internet network connection setting field 4402, a work network connection field 4404 and a network card connection field 4406. The Internet network connection setting field 4402 allows the mobile device 102 to be setup to connect to the Internet. The work network connection field 4404 allows the mobile device to connect to the customer network 5100. The network card connection field 4406 determines what network a network card on the mobile device 102 will be used to connect to.

Automatically setting up network configuration settings on the mobile device may save approximately 5 minutes of manual configuration per mobile device 102 on average. Manual configuration of the connection settings has been known to take hours of trial and error. Needless to say, the manual configuration of connection settings is one of the most error-prone activities involved when configuring a mobile device 102. However, with the mobile software provisioning tool 3700, several different kinds of network connections can be scripted and installed automatically using CAB files 3802 as the delivery mechanism.

CAB files 3802 can automatically install and register software components, but they can also change registry settings on the mobile device 102 during installation. All of the settings and values in the Connection Manager 4400 are stored in the registry of the mobile device 102. So, using a program called Cab Wizard (CabWiz), custom CAB files 3802 can be designed that contain whatever registry entries need to be populated within the Connection Manager settings. For example, a registry.cab file may be scripted to contain a generic Bluetooth connection. However, other network connection types (e.g.—RDA, WLAN) can also be built into a CAB file 3802 and installed onto the mobile device 102.

Once these CAB files 3802 have been built containing all registry settings necessary to build a generic connection entry, they may be treated as normal applications in regards to the mobile software provisioning tool 3700. Meaning these CAB files 3802 can be distributed in much the same fashion as other software applications using the software provisioning tool 3700. For example, the registry.cab file containing a Bluetooth connection will be added to all software packages. During the provisioning process, this file may be downloaded from the Internet, copied to the mobile device 102, and extracted and installed on the mobile device 102. When extracted, all necessary registry entries will automatically be written via the installation component (wceload.exe). All static registry entries that may be grouped together should be created as a separate download CAB file 3802. This may include registry entries to auto-configure future software applications.

Overview of Technologies that May be Employed

All web pages of the mobile software provisioning tool 3700 may be written as Active Server Pages (ASP). An ASP is a server-side script that builds a regular HTML page. ASP is a main feature of the Microsoft Internet Information Server, but since the code is performed on the server, content can be viewed on almost any browser including Netscape. All ASP pages supporting the mobile software provisioning tool 3700 may be written in VBScript (Visual Basic Script), which is an interpreted script language based on a subset of Visual Basic. Client-side VBScript may also be implemented within the software provisioning tool 3600, which is not supported on any other browsers. So again, only Internet Explorer may be supported in this embodiment.

ADO (ActiveX Data Objects) is an object-oriented application-programming interface that allows the developer to easily access almost any relational database system. In fact, ADO is a set of Microsoft supplied COM objects. Whenever a Provisioning Tool ASP page queries or updates the database, it does so by instantiating the ADO object and then making ADO calls to SQL Server (although any data store supported can be used here). ADO may be used to retrieve software and device data needed by the software provisioning tool 3600.

HTML (Hyper-Text Markup Language) may be used to provide the user interface of the Active Server pages. HTML forms are used when user input is needed. An ActiveX control is a program that can be run within a browser. ActiveX controls are roughly equivalent in concept and implementation to a Java applet. The core of the mobile software provisioning tool 3700 may be built using ActiveX since the code performs activities that may not be handled by simple scripting languages. For example, scripting languages don't have the security access to move files to a connected PDA. The provisioner must accept and download this ActiveX control before being able to use the program. When accessing the ASP page that contains a control for the first time, the user is prompted to accept or deny the download of this control. Once accepted, the control may be downloaded and software can then be automatically installed to the connected mobile device 102.

ActiveX controls are currently only supported in Internet Explorer. Netscape is not presently supported. There are $3^{rd}$-party products that wrap ActiveX controls into Netscape plug-ins; however, the mobile software provisioning tool 3700 may use functions made available by the Remote Application Programming Interface (RAPI), which is not supported by these products at the present time. Thus, tool users may be forced to download and install Internet Explorer to use the mobile software provisioning tool 3700 until other browsers support this functionality.

In order to download the necessary ActiveX control, the website that hosts the mobile software provisioning tool 3700 should be added to the tool user's list of trusted sites. The preferences for trusted sites must then be set to allow for the download and installation of ActiveX controls. Simple instructions may be made available on the site to walk the Provisioner through modifying the Internet Explorer security settings. Alternatively, the System Integrator may modify these settings during client install. Appropriate style sheets may be applied to all ASP pages of the mobile software provisioning tool 3700 according to client standards. Style sheets define a standardized look-and-feel of HTML pages.

The Remote Application Programming Interface (RAPI) is a Remote Procedure Call (RPC) mechanism in which the mobile device 102 is the server and the PC application is the client. In other words, RAPI allows PC applications to call functions that are executed on the mobile device 102. With RAPI, the registry, file system, database, and configuration of the mobile device 102 are available to the PC application (in this case the ActiveX control). RAPI functions are used within the Software Provisioning ActiveX control to access functions on the mobile device 102 (i.e. move an installation file onto the device, execute extract program, write registry settings, and so forth).

Figure 45:
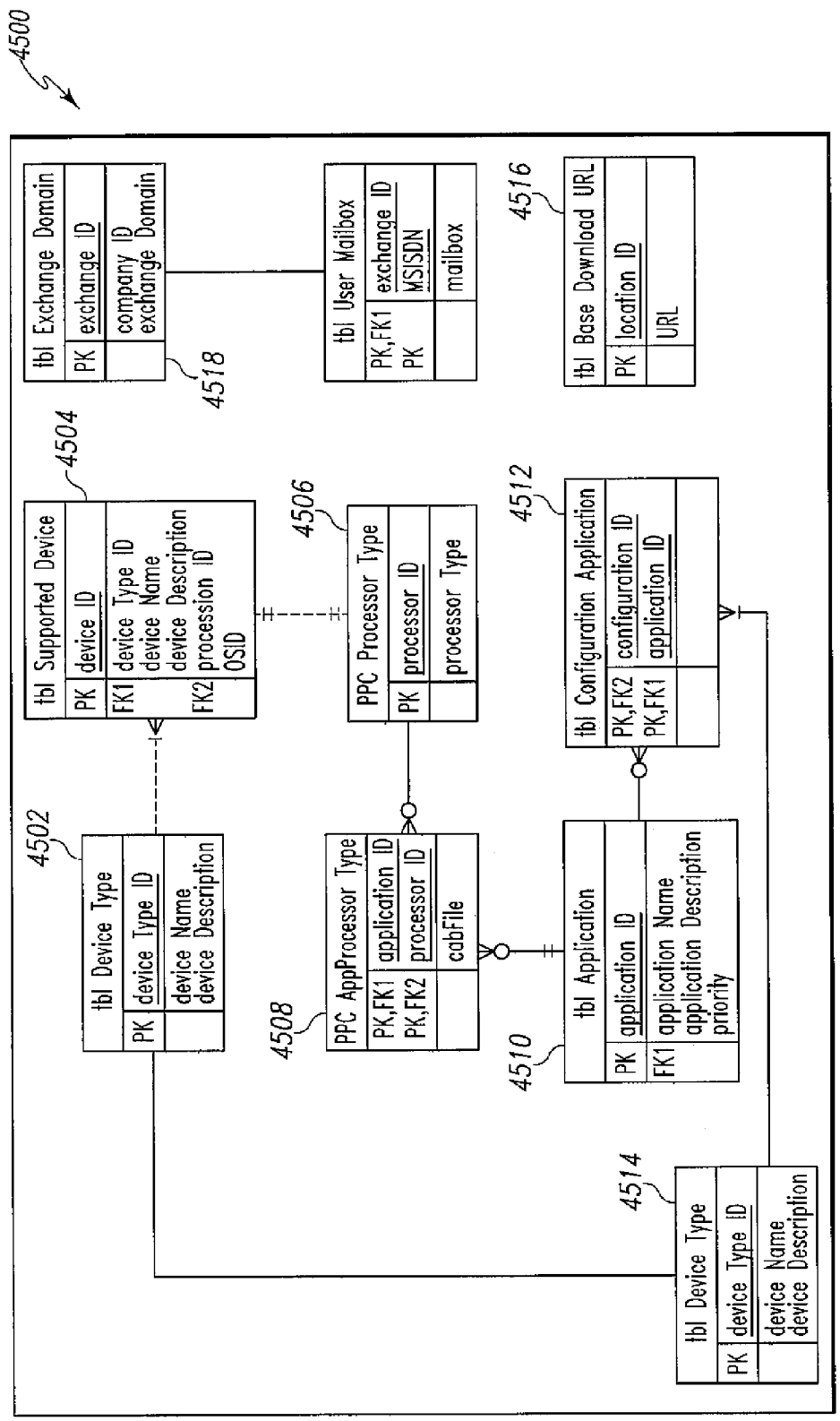
FIG. 45 illustrates an exemplary view of an entity-relationship of the data model used to support the mobile software provisioning tool.

Referring to FIG. 45, an entity-relationship diagram 4500 of a data model that may be used to support the mobile software provisioning tool 3700 is illustrated. The mobile software provisioning tool 3700 may include a Device Type table 4502, which stores all mobile device types. This table will be used to store mobile device types including Pocket PCs, Palm devices, laptops, symbian devices, and so forth. The data needed to automatically install and configure software applications, provide synchronization services with PIM applications located on a server, and configure network settings for the mobile devices 102 may be stored in a database located on a server, which is preferentially the MSB server 132.

The Device Type table 4502 may include a device type ID attribute, a device name attribute and a device description attribute. The device type ID attribute may be a data integer that may be an auto-generated unique D for each type of mobile device 102. The device name attribute may be a data string that indicates whether the mobile device 102 is a Pocket PC, a Palm device, a laptop, a wireless phone, and so forth. The device description attribute may also be a data string that may set forth an optional description of the mobile device 102. Attributes with the same names in the discussion below may be contained in multiple tables and a detailed discussion of the type of data these values indicate will be omitted after the initial description of the data type.

A Supported Device table 4504 may also be included that keeps track of all of the mobile devices 102 that are supported by the mobile software provisioning tool 3700. The mobile devices 102 that are kept track of are set forth in the device type table 4502. An illustrative example might be the iPaq 3870 for the Pocket PC device type. The Support Device table 4504 may include the device type ID attribute, a device ID attribute, the device name attribute, the device description attribute and a processor ID attribute. The device ID attribute may be an integer that represents a foreign key to the device type category. The processor ID attribute may be an integer that may operate as a foreign key to a processor type data table 4506. As set forth above, each mobile device 102 that uses the mobile software provisioning tool 3700 may contain a unique processor. For example, Pocket PCs each operate on a certain processor chip and the software applications that are installed on these mobile devices 102 may need to be processor specific.

A Processor Type table 4706 may be included that may be specific to each mobile device 102 contained in the Device Type table 4502. For example, each Pocket PC processor type may be stored in the Processor Type table 4508. Some processor types that may be found in Pocket PC mobile devices 102 include Strong Arm, MIPS and SH3. The Processor Type table 4506 may include the processor ID and a processor type data field. The processor type attributes may be a string of data that indicates the type of processor that is associated with each respective type of mobile device 102. In addition, it may act as a foreign key to an Application Processor Type table 4508.

The Application Processor Type table 4508 may store data specific for all of the different types of processors that may be used by the mobile devices 102. The Application Processor Type table 4508 may include an application ID attribute, the processor ID attribute and a Cab file attribute. This table links software application cab file names with a particular processor type. As such, when downloading the software application, the correct cab installation file will be downloaded for the particular type of processor being used by the mobile device 102. The cab file data may be a data string that sets forth the full file name of the processor-specific cab file used for installation of the software package on the mobile device 102. The Application Processor Type table 4508 may also act as a foreign key to an Application Table 4510.

The Application Table 4510 stores data related to all of the software applications that are managed by the mobile software provisioning tool 3700. The Application table 4510 may include an application ID attribute, an application name attribute, an application description attribute and a priority attribute. The application ID attribute may be an auto-generated ID that is associated with a particular software application. The application name attribute may be a data string that may be used to display the name of the software application that is being installed on the mobile device 102. The application description attribute may be an optional data entry field that may be used to provide a string of data that provides a general description of the software application. The priority attribute may be an integer that sets forth dependencies the software application being installed may have on other software applications.

Certain software applications have dependencies on other applications to be installed first before allowing the software application to be installed and this data field sets forth these software applications. When software applications are installed on the mobile device 102, the lowest number priority in the software configuration is installed first. Thus, if a software application needs to be installed before all others, it should be given a low priority number (e.g. #1). Priority numbers may be assigned by default in increments of 10 for scalability reasons, which may be for adding additional software applications in the future.

The Application table 4510 may also provide a foreign key to an Application Configuration table 4512 and a Configuration table 4514. The Application Configuration table 4512 may function to group all software applications that need to be installed before the software application at issue is installed into a given configuration or software installation package. As such, when a mobile device 102 is provisioned with the mobile software provisioning tool 3700, all of the necessary software applications will automatically be installed in proper order one after another. The Application table 4510 may include a configuration ID attribute and an application D attribute. The configuration ID attribute may be a numeric data value that provides a foreign key to the Configuration table 4514. The application ID attribute may provide a numeric data value that provides a foreign key to the software application included in the configuration that is being set up for the mobile device 102.

The Configuration table 4514 may be used to define the software packages or a number of related software applications that will need to be installed on the mobile device 102 in order to properly provision the mobile device 102. The Configuration table 4514 may include a configuration ID attribute, a configuration name attribute and the device type ID attribute. The configuration ID attribute may be a numeric data value that is an auto-generated ID; The configuration name attribute may be a data string that provides a descriptive software package name. The device type ID attribute may be an integer that provides the type of mobile device 102 that the software application is designed to support.

A Base Download URL table 4516 may also be included that stores the URL of the software download site that will be used to download and install the software application on the mobile device 102. This value may be grabbed by the mobile software provisioning tool 3700 when initialized before downloading any of the software applications. The Base Download URL table 4516 may include a location ID attribute and a URL attribute. The location ID attribute may be an integer that provides an auto-generated unique ID for each of the download sites. The URL attribute sets forth the URL of the software download location where the software application may be found or located (e.g.—http://provision-.asterix.com/software).

An Exchange Domain field 4518 may also be included that stores each customer's exchange domains. These domain names will be needed during the provisioning of mobile devices 102 to automatically fill in end user mailbox and domains. Otherwise, the end user would have to manually enter his/her mailbox and domain information. The Exchange Domain field 4518 may include an exchange ID attribute, a customer ID attribute and an exchange domain attribute. The exchange ID attribute may be a numeric data value that represents an automatically generated unique ID associated with each customer. The customer ID attribute may be a numeric data value that provides a foreign key associated with the customer who controls each particular domain. The exchange domain attribute may be a numeric data string that provides the domain of the customer (e.g.—asterix.com).

A User Mailbox field 4520 may also be included that may contain all mailboxes that can be associated with a specific end user. The User Mailbox field 4520 may include the exchange ID attribute, a Mobile Subscriber Integrated Services Digital Network (MSISDN) attribute and a mailbox attribute. The MSISDN attribute is the telephone number of a GSM cell phone. The MSISDN attribute is stored in a SIM card inside the mobile terminal 102. The mailbox attribute may be a data string that provides the data value associated with the end user's mailbox (e.g., johns).

Figure 46:
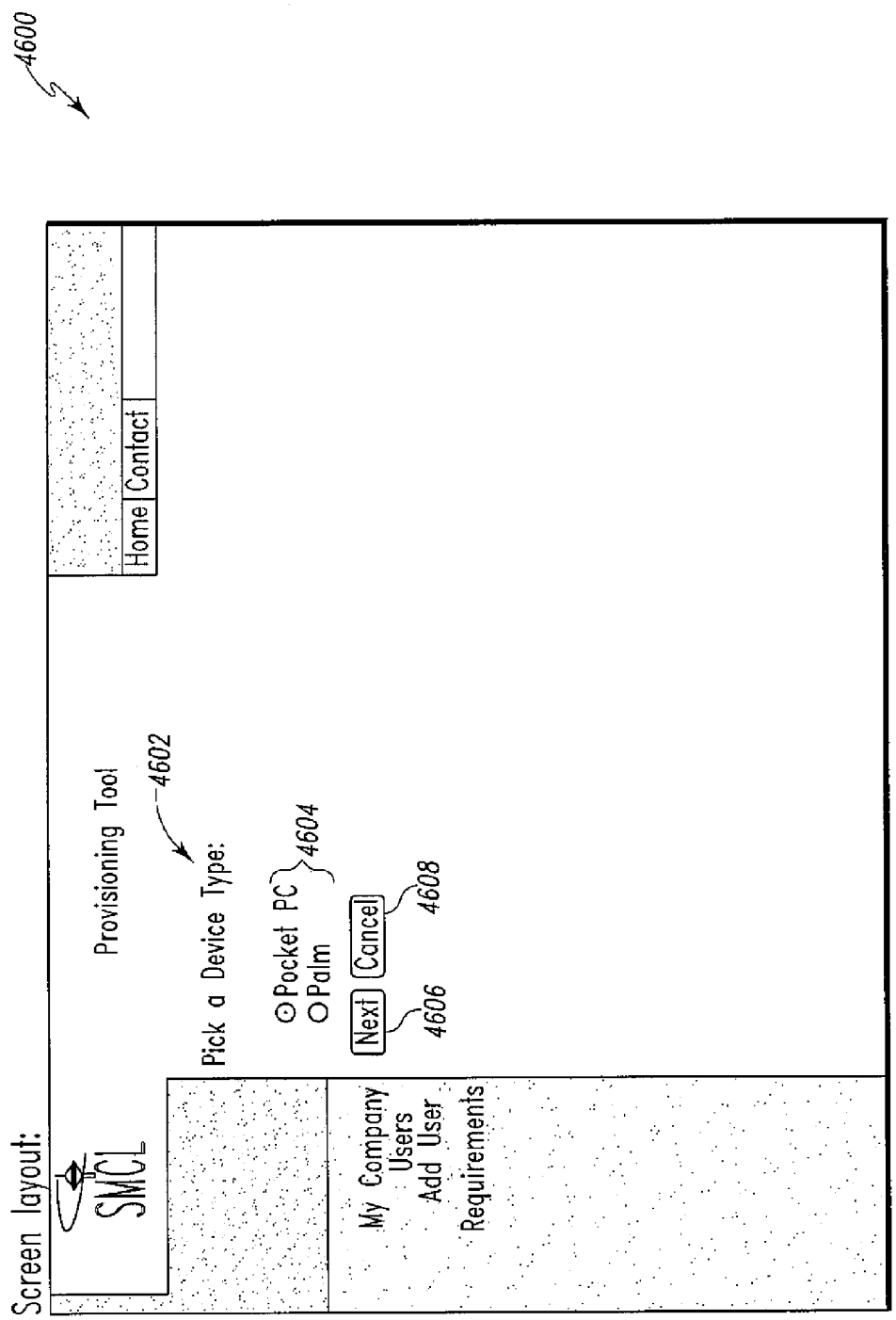
FIG. 46 illustrates an exemplary view of a pick device type page.

Referring to FIG. 46, an exemplary provision device ASP 4600 is illustrated that may be generated by the mobile software provisioning tool 3700 when a respective mobile device 102 is being provisioned or set up for an end user. This may be the initial screen that is generated on the provisioner's workstation during the process of provisioning the mobile device 102. The provision device ASP 4600 may include a pick a device type field 4602 that includes a plurality of device type selection buttons or icons 4604. Other ASPs may be generated to lead the provisioner to the provision device ASP 4600, as well.

The device type selection buttons 4604 may be designed to set forth different categories of mobile devices that are supported by each particular customer network or may be designed to illustrate all mobile devices that may be supported by the mobile software provisioning tool 3700. During provisioning, the provisioner will select the appropriate type of mobile device that is being provisioned at that particular time and select a Next button 4506. A Cancel button 4508 may be provided to cancel the process of provisioning a mobile device 102. In this example, Pocket PC has been selected as the device type or general category for illustrative purposes only.

Figure 47:
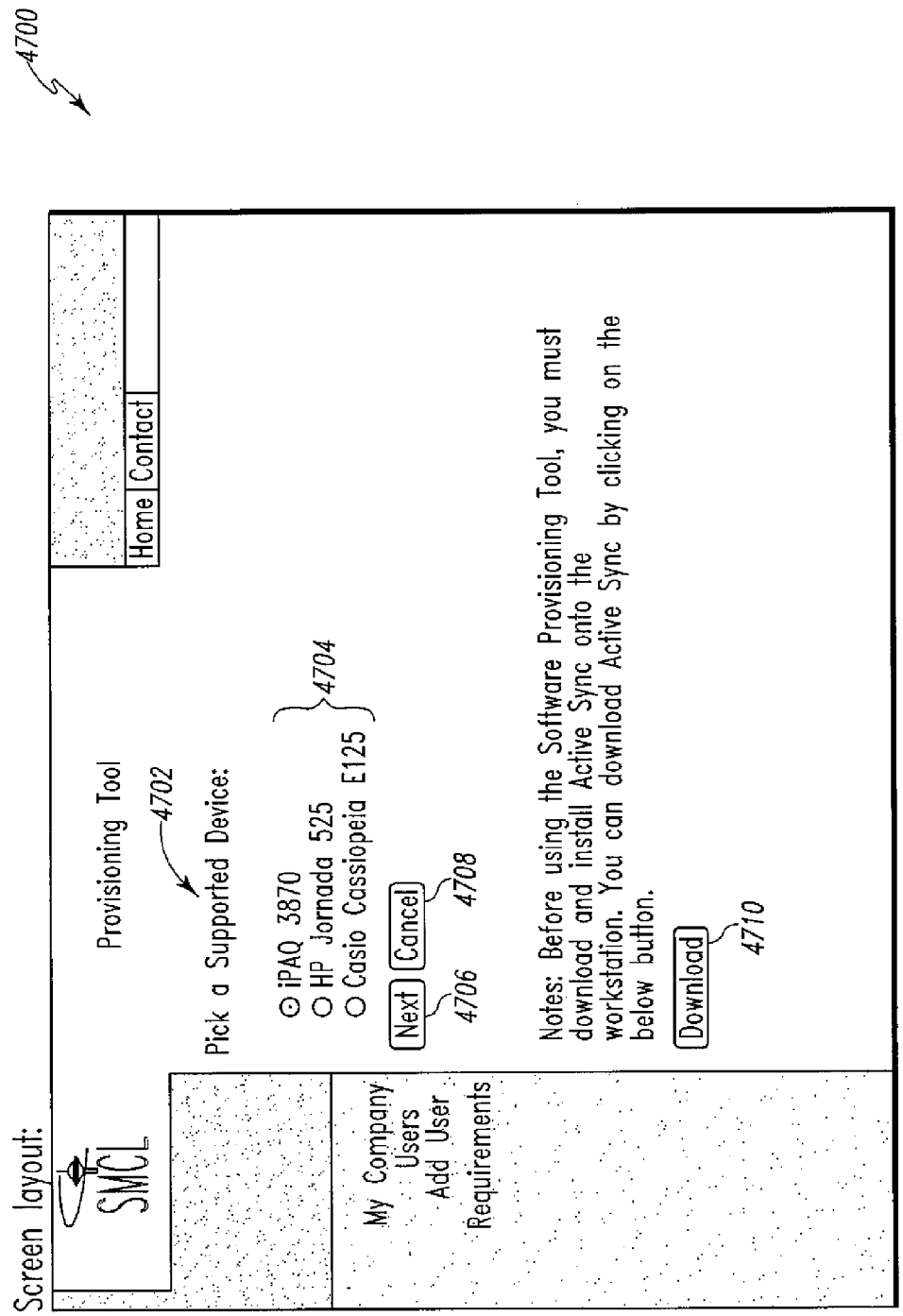
FIG. 47 illustrates an exemplary view of a pick a supported device page.

Referring to FIG. 47, after the Next button 4604 is selected on the provision device ASP 4700, the mobile software provisioning tool 3700 may generate a provision supported device ASP 4700. Based on the category or device type, there may be a number of specific devices that have different processors or configurations that require different installation files. This page may be necessary due to the fact that different types and models of mobile devices 102 may have different processor types, which require completely different installation files. So, it is important that the Customer User chooses the correct type or model of the mobile device 102. There may be several different types of devices that are made from different companies that require device type and model specific provisioning installation files.

The provision supported device ASP 4700 may include a select supported device field 4702 that sets forth all of the particular devices that are supported for the type Or category of device that was selected in the provision device ASP 4700. As illustrated, a supported device selection field 4702 may set forth a plurality of mobile devices 102 that are supported by the mobile software provisioning tool 3700. In the example illustrated in FIG. 47, since Pocket PC was selected in the provision device ASP 4600, the select supported device field 4602 lists a plurality of mobile devices 102 that fall under the Pocket PC device type that are supported by the mobile software provisioning tool 3700.

The select supported device field 4702 may include a plurality of supported device selection buttons 4704 that allows the provisioner to select the mobile device 102 that he/she is provisioning at that particular time. After the appropriate mobile device 102 is selected, the provisioner may select a Next button 4706 that causes the provision supported device ASP 4700 to save the selection and open a pick software configuration ASP 4800. A Cancel button 4704 may be provided to cancel the process of provisioning the mobile device 102. In addition, a Download button 4710 may also be provided to download and install a sync application such as active sync on the provisioning workstation the provisioner is using to provision the mobile device 102 in case it is not already installed on the provisioning workstation.

Figure 48:
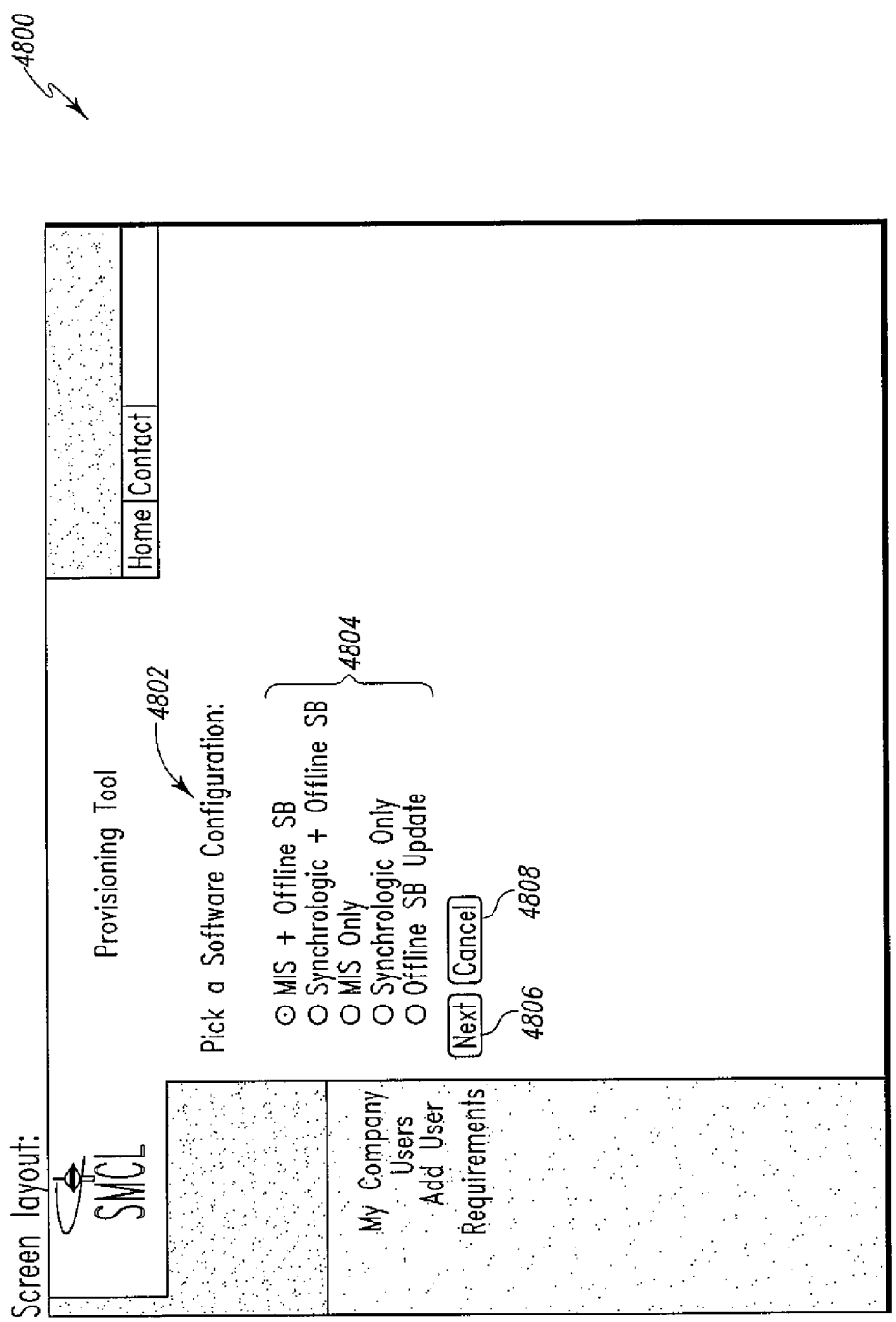
FIG. 48 illustrates an exemplary view of a pick a software configuration page.

Referring to FIG. 48, the pick software configuration ASP 4800 may list a number of software packages that can be installed and configured to the end-user's mobile device 102. At the present time, only an Administrator may modify and configure the data model set forth above in order to make available new software packages. An example of a software configuration might be MIS and Offline Menu, Synchrologic+Offline Menu, MIS Only, Synchrologic Only, Offline Menu Update, and so forth. Choosing one of the software packages later downloads and installs all software that is associated with that particular package. In addition, the mobile software provisioning tool 3700 may make all of the necessary network connections or settings required for the mobile device 102 to connect to the business services and applications supported by the customer network 114.

The pick software configuration ASP 4800 may include a pick software configuration selection field 4802 that sets forth a list of software applications that may be installed on the mobile device 102. The pick software configuration selection field 4802 may include a plurality of software configuration buttons 4804 that are associated with a specific software configuration package. The provisioner may then select the appropriate software configuration package and select a Next button 4806, which will save the selection and open a provision download ASP 4900 as a function of the selection of at least one of the software configuration buttons 4804. Again, a Cancel button 4708 may be included to cancel the process of provisioning the mobile device 102.

Figure 49:
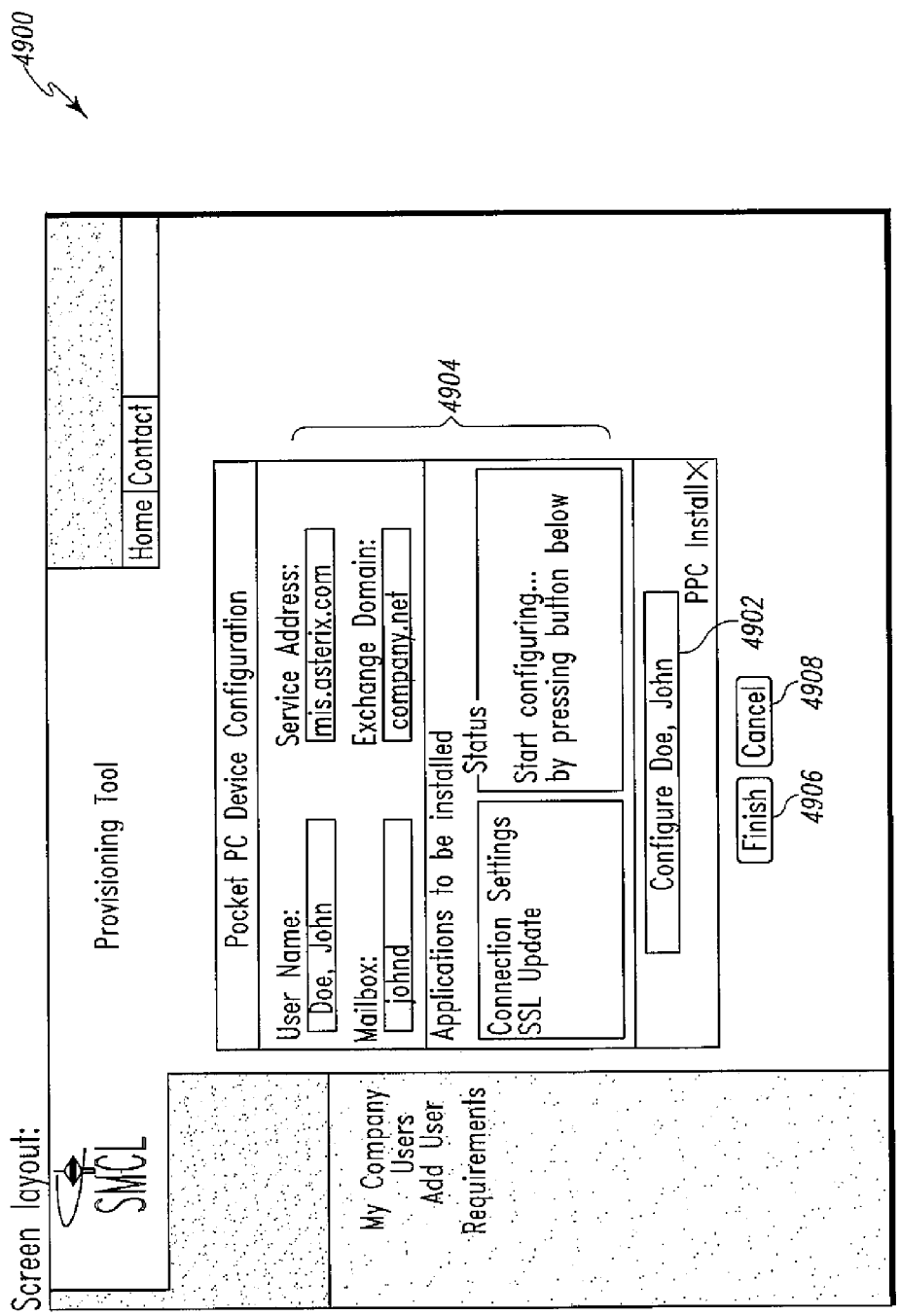
FIG. 49 illustrates an exemplary provision download page.

Referring to FIG. 49, the provision download ASP 4800 allows the provisioner to perform all device-provisioning steps (i.e. installation of software, configurations, etc.) automatically. All provisioning functions may be encapsulated into an ActiveX control embedded in the provision download ASP 4900. An ActiveX control is like an applet that must be downloaded to the provisioner's workstation before mobile device 102 configuration can commence. This may require the provisioner to add the web site that the mobile software provisioning tool 3700 is located on to the web browser's trusted site list.

The provision download ASP 4900 may display to the provisioner exactly what the end user is about to be provisioned. Once a mobile device 102 has been cradled or connected to the provisioning workstation, the provisioner may then click a Configure button 4902. If a laptop is being provisioned, the laptop may simply be connected to an Internet connection in order to provision the laptop as well. This sets into motion the automatic installation of all software packages and network configuration included in the software package. Ideally, no user intervention will be needed throughout the entire install process. There are however, occasions when software packages may need to overwrite existing files. Although not illustrated, in these cases a pop-up window may appear on the mobile device 102 confirming that it is permissible to write over that file or all files.

Once the process has finished, the mobile device 102 will be ready for use with GPRS or wireless unless using Bluetooth as the primary communication enabler between mobile device 102 and the customer network 114. In this case, the only step that may need to be performed manually is the pairing of the mobile device 102 and the GPRS connection using the Bluetooth management utilities on both devices.

The provision download ASP 4900 may include a configuration field 4904 that may set forth a user name, a service address, a mailbox, an exchange domain, an Application to be Installed field and a Status field. This information may be provided so that the provisioner is reminded of who the mobile device 102 is being provisioned for and the connection settings that are associated with that particular end user. In addition, an Application to be Installed field may be included that lists the applications that are being installed as well as the fact that the connection settings may be configured while provisioning the mobile device 102. A status field may also be included that will provide the provisioner with an indication of the status of the provisioning process. A Finish button 4904 may be included that might return the provisioner to a user list ASP of the provisioning tool 100. A Cancel button 4908 may be included to allow the provisioner with one last opportunity to abort the provisioning process.

Although not specifically illustrated, a detailed description of some of the preferred routines that may be used in programming or setting up the present invention will be set forth. A Get Parameters routine may be included that may be the only one to be called by the Provision Download ASP 4900. The function may input or populate the ActiveX control with user specific data and application download URL's. So, when the Provision Download ASP 4900 calls the ActiveX control (e.g. PPCInstallX.GetParameters), it passes in two sets of multi-dimensional arrays. The ActiveX control will then accept these arrays and throw them into global arrays for use by the rest of the application.

A Populate Labels routine may be included that is a message that populates all labels with user specific values such as user, mailbox, domain, applications, and so forth. This gives the end-user confirmation that they are configuring the correct user and that all information is correct. A Command Configure routine may be included that controls the entire mobile device 102 provisioning process. This function will only be performed if the tool user clicks the Configure button. From here, all functions necessary to configure the mobile device are automatically performed. A Create Folder routine may be included that creates a folder on the user's workstation if it doesn't already exist. Currently, all software packages may be downloaded to C:\Temp. Since some systems may not have this folder, this function will be performed before downloading to this location.

A Return File Name routine may be included that strips off the file path to create just the filename. For example http://provision.asterix.com/Software/file.cab may become file-.cab. A Remove Spaces routine may be included that may strip out any spaces that may be in the filename returned above and returns the results (example: MSB.Arm 1100 (4 K) v3.00.CAB becomes MSB.Arm1100(4 K) v3.00.CAB). This may be done due to the fact that a Execute CAB routine may not be able to process files on the mobile device 102 that contain spaces.

A Download File From Net routine may use an Inet control to download files over HTTP. This will be used to grab all install files from the download directories on the MSB server 132. These install files may then be placed on the provisioning workstation. These files will later be moved to the mobile device 102 and extracted (CopyFiletoCE and ExecuteCAB). The function will return true if the download is successful. Also, if the file already exists on the local machine, the function may return false.

A File Exists routine may check to make sure that a file exists on the local system. It will return True if the file was found and False if it was not found. A Copy File to CE may grab a file on the provisioning workstation given by the full source file path and may put it onto the mobile device 102 using Remote Application Program Interface (RAPI) functions. The mobile device 102 must be connected with the provisioning workstation, possibly via a cradle, using a synchronization application such as Active Sync software. A RAPI Connect routine may be included that initiates a RAPI connection with the mobile device 102. A Read File routine may be included that reads bytes from a file and copies the contents to a buffer. The buffer contents will later be written to the CE file.

A Execute CAB routine may be included that calls a CE RAPI Create Process routine to execute a loading routine (e.g.—wceload). The loading routine may be responsible for extracting processor-specific CABs on the mobile device 102, in essence installing the application. A RAPI is Connected routine may return an indication as to whether there is a RAPI connection. If a Version string is returned, then there is a valid connection. A RAPI Get CEOS Version String routine may be included that grabs the Operating System (OS) version numbers.

A CE Save Setting routine may be included that is responsible for writing registry values. The key path needs to be specified as well as the value. A number of registry RAPI functions (CeRegOpenKeyEx, CeRegSetValueEx, CeRegCloseKey) may be called to edit the registry of the mobile device 102. A User Control Terminal may be executed when the control is unloaded (i.e. user navigates off the ASP page containing the control). This routine may contain any cleanup code that may be necessary. A RAPI Disconnect routine may unload the RAPI interface. This should be done when ending the application.

As generally set forth above, CabWiz may be used to make the auto-install or Cab file that is used in the provisioning process. CabWiz's configuration file and how it is used to create a registry-altering CAB file. The main steps for creating a CAB file are: 1) Modify registry.inf file to include all necessary registry entries, 2) modify the registry.inf file to include a dummy BMP image (cabwiz doesn't work without an actual file to extract), 3) save the .inf file, 4) double-click the Reg Build Script.vbs file to make the CAB, and 5) copy the newly-created CAB file over to the Software download web site. Once the INF file with all the correct settings has been created, a Reg Build Script.vbs file must be selected. This will actually create the CAB file as specified by the INF file above. A couple of DOS command windows may appear briefly as all contents are zipped into the final CAB.

Now that the CAB files have been created, the settings this file may actually change is generally set forth below. Below is a general list of all registry entries that may be made by the registry cab:

1. HKCU\Comm\RasBook\asterix
   a. Domain
   b. User
   c. DevCfg
   d. Entry
2. HKLM\SOFTWARE\Microsoft\ConnMgr\Providers\{7G4B5eA3&e5Hh7-#ob1l8dEv6cd-1M28l7dBhelcAstq}\ConnectionA9908terix
   a. RequirePw
   b. Enabled
   c. EntryType
   d. DestId
3. HKCU\ControlPanel\Dial\Locations
   a. Home
   b. Work
4. HKCU\Software\Microsoft\Airsync\Settings IncludeRemoteSync The above entries may setup a network connection under the Connection Manager's Internet Setting handle. These entries basically consist of the connection shell, which is configured by entries made in HKCU\Comm\RasBook\asterix (see number 1 above).

Connector Gateway

Figure 50:
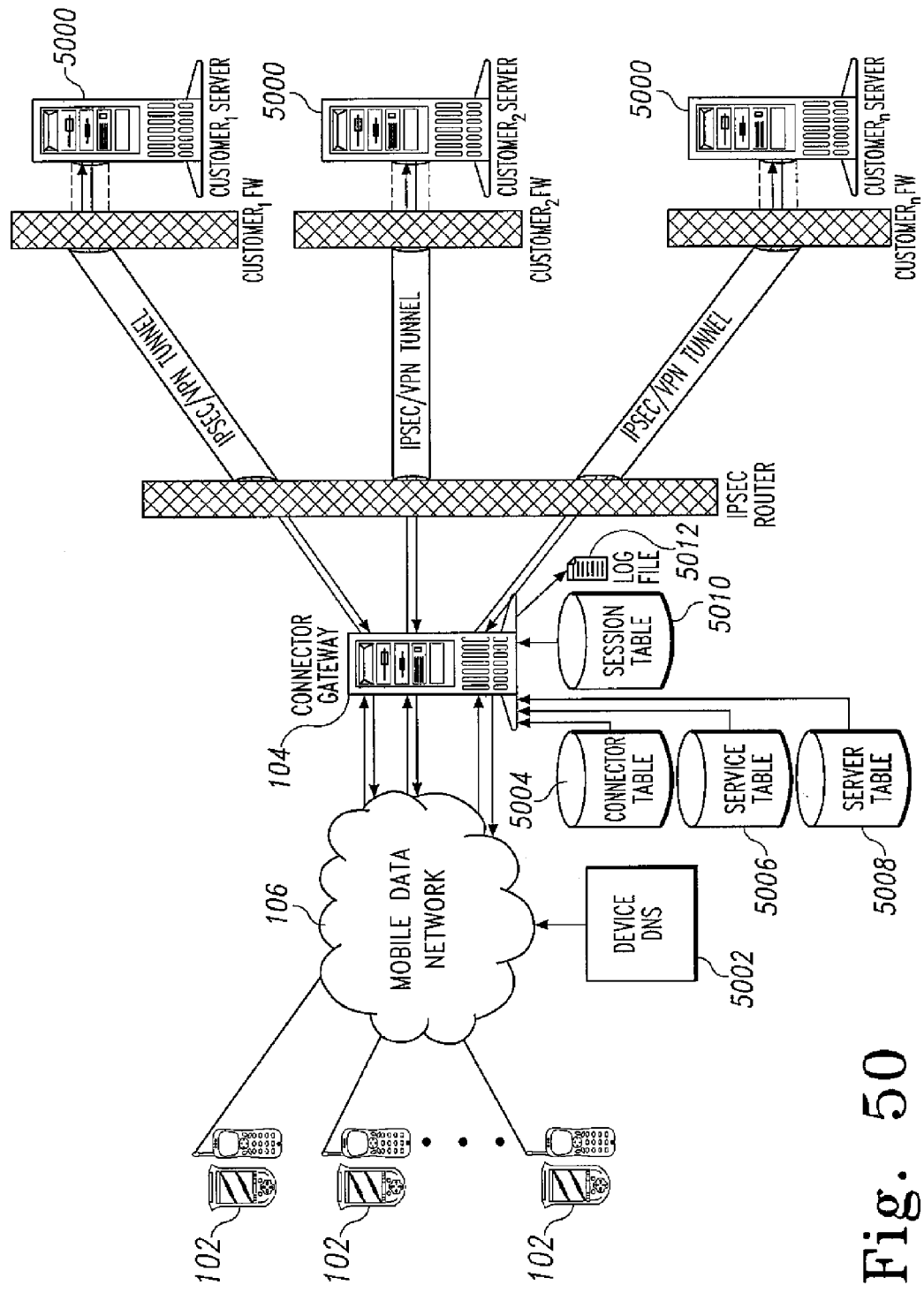
FIG. 50 illustrates a wireless access network including a connector gateway server providing access to multiple services on multiple company networks.

Referring to FIG. 50, the connector gateway 104 is an application that allows carrier networks 110 to provide mobile users controlled and metered access to at least one customer server 5000 on remote company or customer network 114. The connector gateway 104 may use Internet security server applications that provide firewall services for enterprise networks. For example, the connector gateway 104 may be built on top of Microsoft's Internet Security Acceleration (ISA) 2000 Server software, which provides firewall services for enterprise networks. ISA Server is an extensible platform that provides security, hardware redundancy, and load balancing and may have a comprehensive standard delivery kit.

Functionality

The connector gateway server 104 consists of a custom ISA application filter installed on an ISA server. ISA application filters are extensions of the ISA Firewall service. The filters provide the following functionality: 1) process inbound requests, performing session, service, and server lookups; 2) create a single session for each customer server; 3) create data filter objects for each inbound request, driving the connection emulation. The connector gateway 104 proxies the connection between the mobile device 102 and the customer server 5000 on remote company or customer networks 114. Funneling traffic through the connector gateway 104 provides a system to control and monitor service usage. Access may be controlled using service provisioning tables. Usage may be monitored using logging functionality that logs all user traffic. These logs provide detailed usage information and can be migrated to a database server for report generation.

Applications on the user's mobile device 102 will be configured with domain name service (DNS) names that translate to the addresses that are stored on the connector gateway server 104. DNS communication requests are routed to the connector gateway 104, which determines if the user is authorized to access the requested service and which corresponding customer server 5000 to contact on the customer network 114. Each connector gateway server 104 may be scaled up by adding additional RAM and processors. In addition, multiple connector gateway servers 104 may be logically grouped together to provide one logical connector gateway server 104, or they may be clustered to provide server redundancy. This allows the connector gateway server 104 to provide services to as many mobile devices 102 as may be required at any given instance.

Overview of Connector Gateway Functionality

The connector gateway 104 works by listening for requests from mobile devices 102. When a request is received from the mobile device 102, the connector gateway 104 performs a lookup to determine which customer server 5000 the connector gateway 104 should contact to complete the connection To do this, the connector gateway may do the following: 1) determine the MSISDN using the source IP through a RADIUS server query; 2) determine the connector type and the service ID using the user's MSISDN and server IP used by the mobile device 102 on the initial request; and 3) determine the remote customer server IP using the service ID.

Once the connector gateway 104 has the customer server IP, the connector gateway 104 creates a session filter for the customer server 5000 and a data filter that drives the emulation between the mobile device 102 and the customer server 5000, which is likely a synchronization server. The data filter proxies the connection between the mobile device 102 and the customer server 5000, pumping information between the mobile device 102 and the customer server 5000 and logging the usage details. These log records can be used later to provide detailed usage input to a billing process.

The connector gateway server 104 runs a connector gateway application that allows carrier networks 100 to provide mobile users controlled and metered access to customer servers 5000 on remote company networks 114. The connector gateway application may be built on top of Microsoft's Internet Security Acceleration (ISA) Server software product, which provides firewall services for enterprise networks. FIG. 50 illustrates a logical view of how the connector gateway application works with mobile devices 102 and customer servers 5000 located on customer networks 114.

Applications on the user's mobile device 102 will be configured with DNS names that translate to addresses located or stored on the connector gateway server 104. When the application on the mobile device 102 requests to communicate with the DNS name, the request will be routed to connector gateway server 104, which use the connector gateway application to determine if the user is allowed to use the service and if so, which customer server 5000 the user will access. The connector gateway application emulates the connection between the mobile device 102 and the customer server 5000; the emulation is transparent to the mobile device 102 and the customer server 4900.

By sending traffic through the connector gateway server 104, service usage can be controlled and monitored by the connector gateway application. Access can be controlled using service provisioning tables and usage can be monitored using logging records. The connector gateway application logs all user traffic in text files that can be migrated to a database server allowing reports to be generated and reviewed.

Detailed Discussion of the Connector Gateway

The connector gateway application will consist of a custom application filter installed on the connector gateway server 104, which may also be running an Internet Security Acceleration application. The custom application filters of the connector gateway application may be extensions of a firewall application that is operable to process firewall service events, such as binds connection accepts and so forth. The extensions may be implemented as DLLs coded in C++ using the Visual Studio Active Template Library (ATL) and may consist of three objects, which may include a main filter, a session filter and a data filter.

The main filter of the custom application filter may be used to accept inbound requests from the mobile devices 102, perform session, service and server table lookups and create a single session object for each customer server 5000 that will be accessed through the connector gateway server 104. The session filter may be attached to a session object and may create data filter objects for each inbound request. The data filter drives the connection between the mobile devices 102 and the customer server 5000 by using a firewall data pump.

As set forth above, the main filter of the connector gateway application may include a main filter. One of the functions of the main filter is to perform server table lookups. As such, the connector gateway 104 may have a plurality of key connector gateway tables that include a device DNS table 5002, a connector table 5004, a service table 5006, a server table 5008, a session table 5010 and a connector gateway log file 5012. The connector gateway application will use these tables to perform a variety of functions.

The device DNS table 5002 performs the address resolution of the generic DNS names used by the mobile devices 102 to access services via the gateway on the customer server 5000. DNS names will resolve to IP addresses on the connector gateway server 104. The connector table 5004 defines the "connectors" that will be configured on the connector gateway server 104. Connectors map to a unique IP and port combination and correspond to a service type, e.g., "PIM synchronization." When the connector gateway application is started, the connector gateway will read the connector table 5004 and create a listening socket for each connector/service type.

The service table 5006 stores the services provisioned for each respective user. When a mobile network session is created for a user, the user's rows in this table will be inserted in a session lightweight directory access protocol (LDAP). The server table 5008 stores specific details about how the connector gateway application will connect to each customer server 5000 that will provide a service to the mobile device 102. When the connector gateway application is started, the server table 5008 is loaded into a memory location on the connector gateway server 104 and will be read to determine the customer server 5000 details when a connection will be made between a mobile device 102 and remote customer server 5000.

The session table 5010 contains information about a mobile user's IP session (the "key" is the session IP address). The session table 5010 may be populated by a RADIUS server, which authenticates and authorizes mobile devices 102 for the data network where the connector gateway server 104 resides. The connector gateway log file 5012 stores raw usage records for each respective mobile device 102. The records can be extracted and used with the session table to provide detailed usage input to a billing process.

Mobile devices 102 will be provisioned to use Fully Qualified Domain Names (FQDNs) for all software applications that will use a service controlled by the connector gateway 104. The device DNS will store these FQDNs and corresponding IP addresses. The IP addresses assigned to the DNS names are bound to the external interface of the connector gateway server 104. When a mobile device 102 connects to the connector gateway server 104, the ISA external IP and port on which the connection was received is used to determine the connector type, e.g., 'Synch.' The association between IP:port combinations and service types is maintained in the connector table 5004, which is loaded internally when the connector gateway application is started.

During operation, the connector gateway application may perform several connection steps. On startup, the connector gateway application reads in rows from the connector table 5004 and creates an external listening socket (each connector has a unique IP:port combination) and prepares each connection to accept inbound connections. A mobile device connection is received on a listening socket and a copy of the external socket is created by the connector gateway application. Once the external socket is created, the customer server 5000 for the connection is determined by the connector gateway application.

To determine the customer server 5000, the session table 5010 is queried using the source IP on the request packet of the mobile device 102 to get the MSISDN. The server table 5008 is queried using the MSISDN and connector type to get the service ID. In addition, the server table 5008 is queried using the service ID to get the remote customer server IP. The appropriate session filter for the customer server 5000 will be found (or created if needed). A data filter is created which will be used to drive the emulation between the mobile device and synchronization server 5000. The data filter emulates the connection (data is "pumped" between mobile device 102 and customer server 5000). The process continues until the mobile device 102 stops requesting connections to the service provided by the customer server 5000.

Figure 51:
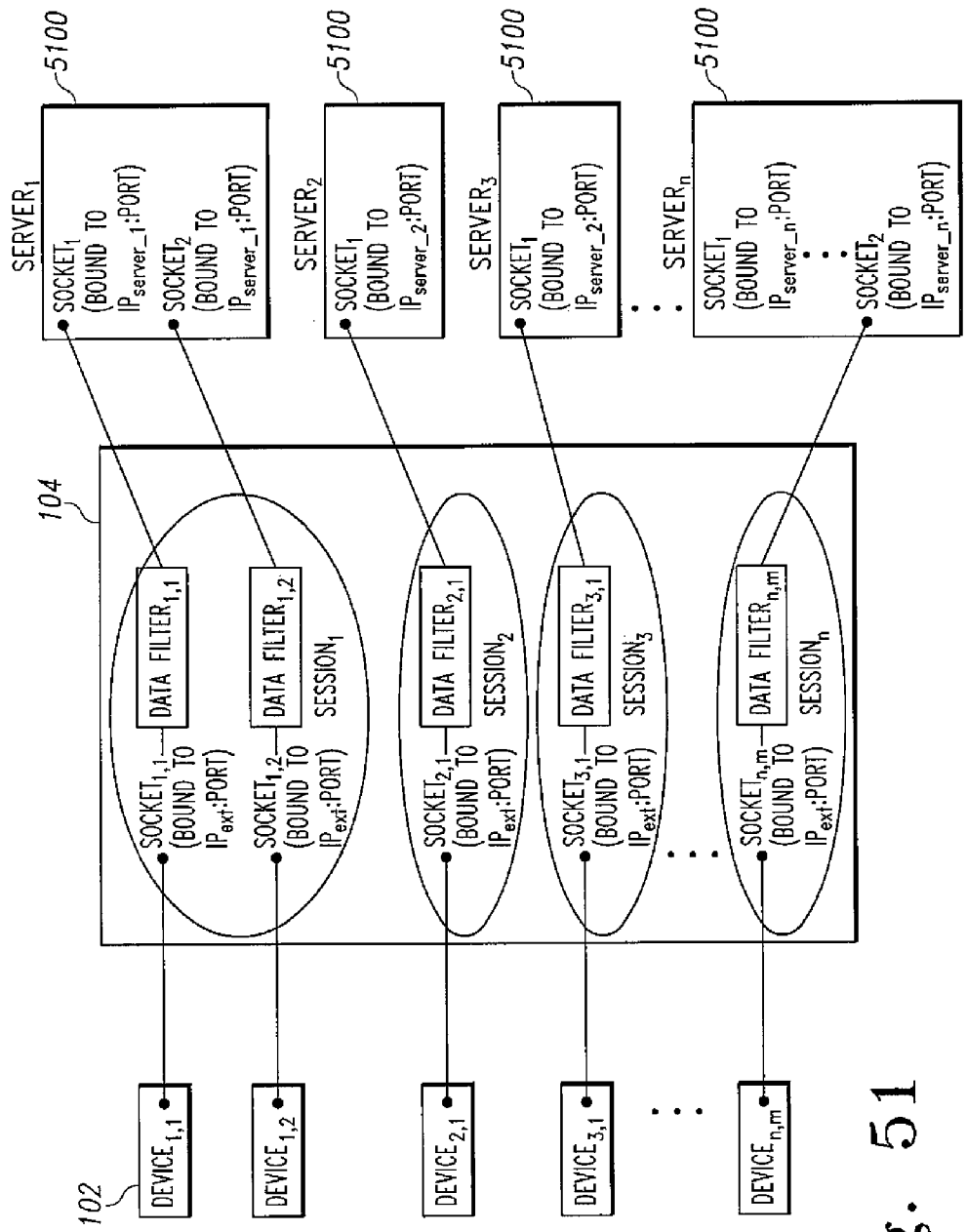
FIG. 51 illustrates a connector gateway emulation.

Referring to FIG. 51, to emulate a connection, the data filter works with two socket objects that implement a socket interface: one object represents an external socket on the connector gateway server 104 while the other object represents the internal server socket. The external socket is spawned by the application filter object when a new external connection is accepted. The internal server socket (on the destination server) is accessed via a gateway controlled connection object.

An external connection will prompt a remote bind to be emulated to the appropriate customer server 5000 (if an ISA session with the internal server does not already exist; otherwise, an existing ISA session is used). This will allow as connection to be established between the connector gateway server 104 and the internal or customer server 5000. When a new connection is received for a mobile device 102, a new external socket will be created and the data filter object will be used to "pump" data between the mobile device 102 and the customer server 5000.

Data pumping consists of using the IFWXSocket interface to asynchronously receive data on the internal and externals sockets, which is stored in a buffer controlled by the firewall service. When data is received from either the customer server 5000 or external destination server socket, the firewall service calls CompleteAsyncIO( ) in the data filter object that will call the socket method Send( ) to send the data in the buffer to the receiver. Data pumping continues until the client 102 and customer server 5000 stop sending data (the connection ends).

ISA will maintain a "session" with an internal server for as long as the ISA firewall service is operational. Each "session" will have a corresponding session filter that will contain one or more connection objects that each connect to a specific port on the customer server 5000. When a new connection arrives, the appropriate connection object will be used or a new connection object will be created.

Each connector gateway server 104 may be scaled up by adding additional RAM and processors. Internet Security Acceleration Server 2000 running on Windows 2000 Advanced Server can support a maximum of 4 processors. Multiple connector gateway servers 104 may be logically grouped together to provide one logical connector gateway server. Hardware interface teaming can be used for NIC redundancy; multiple connector gateway servers 104 can be logically grouped together to provide server redundancy. The Windows 2000 Network Load Balancing (NLB) service may be used to provide load balancing. NLB may run as an intermediate driver above the NIC layer and below the TCP/IP layer.

Connector Gateway Configuration

Configuration information for the connector gateway application filter will be stored in a special ISA storage area called a vendor parameter set. The data may be manipulated using a Microsoft Management Console (MMC) plug-in that may be associated with the connector gateway filter properties in the ISA MMC.

Data Inspection

It is possible for the data filter to examine the contents of the data portion of TCP segments sent from the mobile devices 102 to the connector gateway 104. This could be used to provide further control over how the connection is used. An example would be the TCP data could be examined for the presence of a mailbox name. This would allow a specific mailbox to be bound to a GPRS connection. If the mailbox does not match the connection, then the connection could be denied.

Error Logging

Critical errors, warnings and informational messages will be logged in an event log. The following is a list of error messages that will be included: 1) Failed to load table; 2) Failed to create listening socket; 3) Call failed in CompleteAsyncAccept( ); 4) Session LDAP query returned no data; 5) Unable to find service; and 6) Connector Gateway Successfully Loaded.

Connector Gateway Filter Specification

Figure 52:
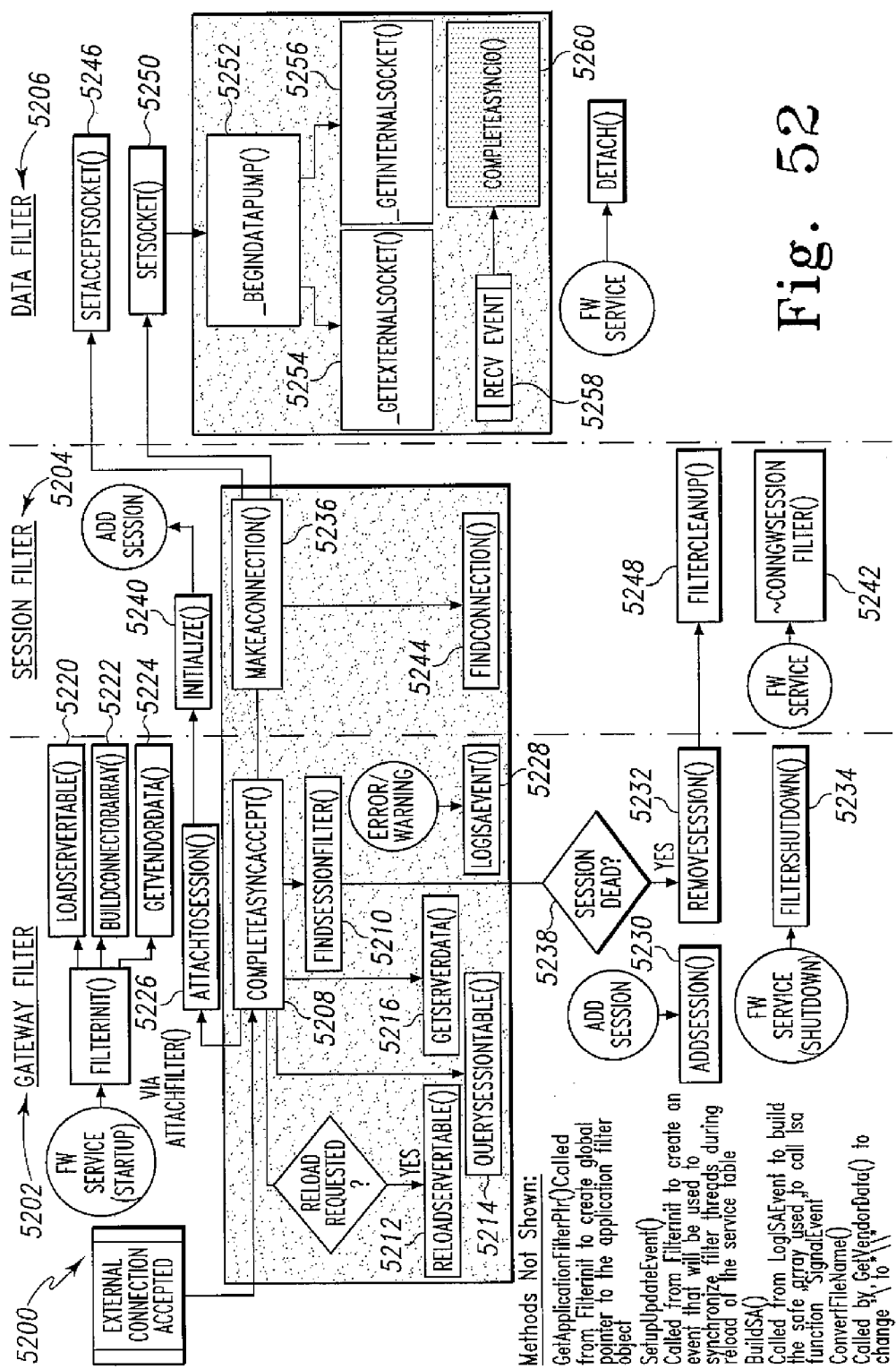
FIG. 52 is a flow chart of the connector gateway application.

Referring to FIG. 52, the filters 5200 of the connector gateway application may consist of three objects, which include a gateway filter 5202, a session filter 5204 and a data filter 5206. Each filter 5200 consists of a number of software modules that perform a plurality of functions and are represented in the flow chart shown in FIG. 52. The majority of the gateway logic exists within a complete asynchronization accept module 5208, a find session filter module 5210, a reload server table module 5212, a query session table module 5214 and a get server table module 5216.

Although not specifically illustrated in FIG. 52, the principle ISA interfaces that may be used may be a IFWXProxy module, a IFWXFilter module, a IFWXNetworkSocket module, a IFWXSocket module, a IFWXSession module, an IFWXSessionFilter module, a IFWXConnection module, and a IFWXDataFilter module. The IFWXProxy module provides access to firewall service functions that are not tied to a firewall user session (a firewall user session must be established by an internal running special firewall client software; for the connector gateway application, the internal servers will not have the software installed). The IFWXFilter module is the main filter interface that allows creation of session filters.

The IFWXNetworkSocket module provides a "true" socket interface that uses the ISA dynamic packet filter functionality to automatically open ports in the packet filter and close it when the socket is closed. The IFWXSocket module allows data filters to work with data flowing through an existing socket. The IFWXSession module allows a session filter to be attached to an internal server session. The IFWXSessionFilter module allows firewall events (binds, accepts, and so forth) to be received and processed. The IFWXConnection module allows connections to be managed; each remote socket created on behalf of a client has an associated connection object. The IFWXDataFilter module allows a data filter to "hook" into the firewall data pump.

Although not illustrated, the gateway filter 5202 may include a connection gateway filter class of modules, the session filter 5204 may include a connection gateway session filter class of modules and the data filter 5206 may include a data pump class of modules. Referring to FIG. 52, the connection gateway filter class of modules of the gateway filter 5202 may include a filter initialization module 5218, a load server table module 5220, a build connector array module 5222, a get vendor data module 5224, a convert file name module (not specifically illustrated), a get application filter pointer module (not specifically illustrated), a setup update event module (not specifically illustrated), a complete asynchronization accept module 5208, a reload server table module 5212, a query session table 5214, a get server data module 5216, a find session filter module 5210, an attach to session module 5226, a log ISA event module 5228, a build safe array module (not specifically illustrated), an add session module 5230, a remove session module 5232 and a filter shutdown module 5234.

The filter initialization module 5218 of the gateway filter 5202 may be called by the ISA firewall service when the service is started, which in turn calls, starts or initiates several modules to prepare the connector gateway filter 5202. One is the get application filter pointer module which finds the global pointer to the ISA Application Filter object used by other methods in the class to read packet filter and configuration information. The get vendor data module 5224 retrieves the operational parameters entered in the connector gateway application filter properties table located in the ISA MMC. The setup update event module creates an event that will be used to synchronize threads when the server table is reloaded. The load server table 5220 reads the server table rows from the text file specified in the connector gateway properties table; the table may be stored internally using a CSimpleArray class. The build connector array module 5222 reads from the list of active connector gateway packet filters; information about each filter is stored using the CSimpleArray class.

For each entry in the connector array, a socket is created and bound to the connector address (IP and port). Each socket is setup to listen and accept connections with the mobile devices 102. Connections are accepted using an overlapped call to the Accept method. If one or more sockets were created, an informational message may be written to an Event log. As such, the filter initialization module 5218 prepares the connector gateway filter 5202 during operation to allow a mobile device 102 to establish a connection with a customer server 5000.

The load server table module 5220 of the gateway filter 5202 may be called from the filter initialization module 5218 to either load the Server table from a text file or a SQL table, depending on the Server table file mode. The server table consists of rows of the following form: <key>, <data>. The key is derived from the Session and Server table lookups. The data contains information about a specific connection to a customer server 5000. The method may use standard C I/O and SQL ODBC functions. A return parameter may also be used to indicate a success or otherwise call failed and the return message may indicate the reason for the failure.

The build connector array module 5222 of the gateway filter 5202 may be called from the filter initialization module 5218 to read the connector gateway packet filters from the list of active filters maintained by the ISA server on the carrier network 110. ISA interfaces are used to get a pointer to the packet filters collection. Each packet filter is examined to determine whether the filter is enabled, the name of the filter contains the tag entered in a connector gateway properties sheet in the ISA MMC and if the protocol type is TCP or UDP. If so, an entry is added to the connector array. The connector array stores the following information: 1) Connector Type; 2) IP address and port; and 3) External socket structure for the corresponding socket. A return parameter may also be used to indicate a success or otherwise call failed and the return message may indicate the reason for the failure.

Referring to FIG. 52, the get vendor data module 5224 of the gateway filter 5202 may be called by the filter initialization module 5218 to read the data entered using the connector gateway properties tab in the ISA MMC. This data is stored in a connector gateway specific "vendor data set" which is managed by ISA. The following vendor data may be retrieved: 1) Session table mode (LDAP or SQL); 2) Server table mode (file or SQL); 3) SQL Server IP (id Session table mode=SQL or Server table mode=SQL); 4) LDAP Server IP (if Session table mode=LDAP); 5) Prefix for connector types in LDAP store (if Session table mode=LDAP); 6) LDAP IP variable name (if Session table mode=LDAP); 7) LDAP path ((if Session table mode=LDAP); 8) Server table filename (if Server table mode=file); 9) Bypass LDAP call switch (if Session table mode=LDAP); and 10) Packet Filter Connector Gateway code. A return parameter may also be used to indicate a success or otherwise call failed and the return message may indicate the reason for the failure.

Although not specifically illustrated, the convert file name module of the gateway filter 5202 may be called from the get vendor data module 5224 to change all occurrences of '\' to '\\' in the Session table filename; This may need to be done so the code will not process the '\' characters as escape characters. The parameters used by the convert file name module may be: an Old Value parameter (a character array containing the value to convert) and a New Value parameter (a BSTR character array containing the new string). A return parameter may also be used to indicate a success or otherwise call failed and the return message may indicate the reason for the failure.

Again, although not illustrated, the get application filter pointer module may be called from the filter initialization module 5218 to return a pointer to the connector gateway application filter object, which stores information about the filter and is used throughout the code. The get application filter module may create a global pointer to the application filter object. The parameter used may be a pointer application filter (a pointer to an application filter object pointer which will be used to pass the pointer back to the calling method). A return parameter may also be used to indicate a success or otherwise call failed and the return message may indicate the reason for the failure.

The setup update event module, although not specifically illustrated, may be called by the filter initialization module 5218 to create an event that will be used to synchronize processing threads during a server table reload. Again, a return parameter may also be used to indicate a success or otherwise call failed and the return message may indicate the reason for the failure.

The gateway filter 5202 may also include a complete asynchronization accept module 5208 that may be called when a connection arrives to one of the listening sockets of the connector gateway 104. It will first call the reload server table module 5212 to reload the server table if an external request has been made. It will then get the connector type by searching the connector array and will call a Query Session LDAP module (not illustrated) that will perform a lookup in the session LDAP using the device IP address that initiated the connection. If an attribute exists in the Session LDAP that corresponds to the connector type, then the data for the attribute is returned. The data will contain the key to the server table (companyID) and connection details specific to the user. If no attribute exists, then processing is bypassed and the filter prepares for another connection.

The internal server table is searched with the key returned from the LDAP call via a call to the get server data module 5216. The server table stores customer server IP addresses and connection information specific to the server (allowed number of connections, bandwidth, etc.). If no entry exists, then processing is bypassed. Otherwise, the find session filter module 5210 may be called to return the ISA session filter for the customer server 5000. If no session filter exists, then a session filter object may be created by calling an attach filter method of the ISA session object corresponding to the IP address of the customer server 5000. The find session filter module 5210 may be called again to locate the newly created session filter object.

When a session filter object is returned from the find session filter module 5210, a make a connection module 5236 of the session filter may be called to initiate a connection between the mobile device 102 and the customer server 5000. Some of the parameters that may be used by the make a connection module 5136 may include: 1) Success—a Boolean value, TRUE successful; 2) Win32ErrorCode—error value when Success is FALSE; 3) Listening Socket—pointer to a listening socket object; 4) Accept Socket—pointer to a accept socket object; 5) Remote Address—the address of the caller, 6) Remote Address Length—the length of the address; 7) Local Address—the address of the callee; and 8) Local Address Length—the address size of the callee. A return parameter may also be used to indicate a success or otherwise call failed and the return message may indicate the reason for the failure.

The reload server table module 5212 may be called by the complete asynchronization accept module 5208 each time a new connection is initiated from a mobile device 102. A reload can be requested in the connector gateway properties tab in the ISA. MMC. This will set a vendor parameter variable "ReloadSW" to "TRUE." The method reads the switch and checks to see if it is "TRUE." If so, then the reload event, created by the setup event module, is reset which will cause all threads to wait in the get server data module 5216. The server table will be reloaded by calling the load server table module 5220, then the reload event will be set which will cause waiting threads to resume processing. The ReloadSW is set to "FALSE" and an informational message is written to the event log, which indicates the server table was reloaded. A return parameter may also be used to indicate a success or otherwise call failed and the return message may indicate the reason for the failure.

The gateway filter 5202 may also include the query session table module 5214 that may be called from the complete asynchronization accept module 5208 to query the session table using the device IP address and the connector type code associated with the inbound connection. The query will return user specific connection data for the service as well as the key to the server table. If the Session table mode is LDAP, then the query process follows: 1) an LDAP connection is opened with the LDAP server (IP address stored in vendor parameter set); 2) a bind is performed; 3) the LDAP base string and search filter are formulated; 4) the LDAP base is searched using the search filter; and 5) if call was successful and results exist, the data (service ID) is returned.

The Session LDAP database will be keyed by IP address; an entry will exist for each user that has an active GPRS session with the Asterix APN. There will exist service attributes under the IP key for each service the user is subscribed to. The attribute names will consist of a prefix followed by the connector type name that corresponds directly with the connector names used by the connector gateway 104. For example, the MIS service could be "ses-conngw-mis." If the Session table mode is SQL, then the query process follows: 1) an ODBC connection is opened with the SQL server (IP address stored in vendor parameter set); 2) the device IP address and connector type are used to build parameters for the "getServerData" stored procedure; 3) the get server data module 5216 is called; and 4) if the call was successful and results exist, the data (service ID) is returned.

Some of the parameters that may be used by the query session table module 5114 include: 1) an IP Address parameter—Device IP address; 2) a Connector parameter—Connector type to be searched; and 3) a pointing data parameter—a pointer to a character array which will be used to pass the service data back to the caller. A return parameter may also be used to indicate a success or otherwise call failed and the return message may indicate the reason for the failure.

The get server data module 5216 of the gateway filter 5202 may be called by the complete asynchronization accept module 5208 to search the internal Server table for key matching the value returned from the Session database call. The data (customer server IP) will be used to establish a connection to a remote customer server 5000. The parameters used by the get server data module 5216 may include a server key parameter (the key to be searched) and the pointer server data (jointer to a character array used to return the data to the caller). A return parameter may also be used to indicate a success or otherwise call failed and the return message may indicate the reason for the failure.

The find session filter module 5210 may be called from the complete asynchronization accept module 5208 to search the session filter linked list for an existing session filter corresponding to the customer server 5000 to which the connection will be made. If any "dead" filters are found in the list, they will be removed, which is illustrated at step 5238. The parameters used by the find session filter module 5210 may include a Customer Address (a socket address structure used to pass in the customer server IP) and a pointer Session Filter (pointer to a session filter pointer used to return the session filter pointer back to the caller). A return parameter may also be used to indicate a success or otherwise call failed and the return message may indicate the reason for the failure.

The gateway filter 5202 may also include the attach to session module 5226 that may be indirectly called from the complete asynchronization accept module 5208 when the session object method "AttachSession" is called to create an instance of a session filter object for the customer server IP. The attach to session module 5226 may create the instance and will call an initialize module 5240 of the session filter 5204 to perform setup tasks. Some of the parameters that the attach to session module 5226 may use include: 1) a pIFWX-Session parameter (pointer to the firewall session object for which the session filter will be created); 2) a piSessionFilter parameter (pointer to a session filter object which will be used to return the session filter to the firewall service); and a ppFilterHookEvents parameter (pointer to a FilterHookEvents pointer that can be used to register events for the session object). A return parameter may also be used to indicate a success or otherwise call failed and the return message may indicate the reason for the failure.

The gateway filter 5202 also may include the log ISA event module 5228 that may be called throughout the class to log events to an application log. The ISA Alert Notification method "SignalEvent" is used to signal an event defined in ISA during the filter registration (via regsvr32). The event is associated with an ISA alert, which will determine what action to take. The alerts for the connector gateway 104 are configured to log to the event log. Some of the parameters that the log ISA event module 5228 may use include: 1) an EventID parameter (numeric event messageID that will be used in Event Log message); 2) an ISAGUID parameter (GUID for the ISA eventID); 3) a argc parameter (number of arguments passed); 4) a argv parameter (the arguments that will be used to build the event log message); and 5) an EventType parameter (enumerated message type (error, warning, informational and so forth)). A return parameter may also be used to indicate a success or otherwise call failed and the return message may indicate the reason for the failure.

Although not illustrated in FIG. 52, the gateway filter 5202 may also include the build SA module. The build SA module is called from the log ISA event module 5228 to build the safe array for the SignalEvent call. Some of the parameters that may be used by the build SA module include: 1) the argc parameter (number of arguments passed); 2) the argv parameter (the arguments that will be used to build the safe array); and a pVar parameter (pointer to a CComVariant class that will be used to pass the safe array to the caller). A return parameter may also be used to indicate a success or otherwise call failed and the return message may indicate the reason for the failure.

The gateway filter 5202 may also include an add session module 5230 that is called by a connection gateway session filter module 5242 to add a session filter to the session filter list. The connection gateway session filter module 5242 may be part of the session filter 5204. The parameter that may used by the add session module 5230 may be a Session Filter parameter, which may be a pointer to a session filter object that will be added to the session filter list.

The remove session module 5232 may be called from the complete asynchronization accept module 5208 to remove a session filter from the session filter list. The parameter used by the remove session module 5232 may be a Session Filter parameter, which may be a pointer to the session filter object that will be removed from the session filter list. The filter shutdown module 5234 of the gateway filter 5202 may be called from by the firewall service before the filter is unloaded. The filter will close all open master sockets and remove all entries from the connector and service arrays. A return parameter may also be used to indicate a success or otherwise call failed and the return message may indicate the reason for the failure.

As set forth above, the session filter 5204 may include the connection gateway session filter 5242 may be called from the attach to session module 5226 to define global variables used by the session filter and to add a session to the Gateway Filter session linked list by calling the add session module 5230. Some of the parameters used by the connection gateway session filter 5242 may include a pIFWXSession parameter (a pointer to session filter object that will be referenced) and a pConnGWFilter parameter (a pointer to the calling connection gateway filter object that will be used for the add session module 5230 call). A return parameter may also be used to indicate a success or otherwise call failed and the return message may indicate the reason for the failure.

The make a connection module 5236 of the session filter 5204 may be called from the complete asynchronization accept module 5208 to initiate the connection process. A find connection module 5244 will be called to find an existing listening connection object or to create one if needed. Listening connection objects are master objects that are used to create child connection objects that will be used to emulate the connection between a mobile device 102 and customer server 5000. A data filter object is created which will handle the data transfer for the connection. The external socket will be passed to the data filter object using the data filter method of a set accept socket module 5246 of the data filter 5206. The make a connection module 5236 may include an emulate connection component that may be invoked to prompt the data filter to begin data transfer.

The make a connection module 5236 may use a plurality of parameters to make the connection. Some of these parameters may include: 1) an Accept Socket parameter (the socket on which the connection was accepted); 2) a Connection Port parameter (the connecting port (this is used to search the existing connection array)); 3) a Remote Address parameter (the device address); a Remote Address Length parameter (the length of the device address); 4) a Local Address parameter (the gateway address to which connection was made); and 5) a Local Address Length parameter (the length of the gateway address).

The find connection module 5244 of the session filter 5204 may be called by the make a connection 5236 to search the connection array for an entry corresponding to a specific port. If no entry exists, a new connection is created and added to the connection array. A Emulate Client Bind component of the find connection module 5244 may be called to create a new connection with the customer server 5000 (the bind will be associated with an internal server address). The find connection module 5244 may use a Connection Port parameter, which indicates the connecting port (this is used to search the existing connection array). The find connection module 5244 may return an array position parameter that indicates the position in the connector array.

A filter cleanup module 5248 may be included in the session filter 5204. The filter cleanup module 5248 may be called by the remove session module 5232 to de-reference the listening connections in use by the filter. A return parameter may also be used to indicate a success or otherwise call failed and the return message may indicate the reason for the failure.

As set forth above, the data filter 5206 may include the set accept socket module 5246. The set accept socket module 5246 may be called by the make a connection module 5236 to set the external socket for the connection. The external socket corresponds to the mobile device 102. A parameter that may be used by the set accept socket module 5246 may include an Accept Socket parameter, which indicates the socket on which the connection was accepted.

The data filter 5206 may include a set sockets module 5250 that may be called by the firewall service as part of the connection emulation process in order to set the internal socket (the external socket will have been set by the call to the set accept socket module 5246) and to start the connection emulation process via a call to a begin data pump module 5252. Some of the parameters that may be used by the set sockets module 5250 may include: 1) a Internal Socket parameter (the internal network socket which will handle emulation); 2) a External Socket parameter (this will be NULL since connection emulation is occurring); 3) a Connection parameter (the connection object for which emulation is occurring); and 4) a punk Filter Context parameter (a context can be assigned but is not used in the current embodiment). A return parameter may also be used to indicate a success or otherwise call failed and the return message may indicate the reason for the failure.

The begin data pump module 5252 may be called by the set sockets module 5250 to start the data pump process. A get external socket module 5254 and a get internal socket 5256 may be called to get the external and internal sockets respectively. The method makes an overlapped call 5258 for both the internal and external sockets, which allows data to be received by the data pump from the mobile device 102 or the customer server 5000 until the connection is dropped on either side. A return parameter may also be used to indicate a success or otherwise call failed and the return message may indicate the reason for the failure.

As set forth above, the get external socket module 5254 may be called by the begin data pump 5252 to return a pointer to the external socket. The get external socket module 5254 may return a IFWXSocket parameter, which is a pointer to the external socket. The get internal socket module 5256 may be called by the begin data pump module 5252 to return a pointer to the internal socket. The get internal socket module 5256 may also return a IFWXSocket parameter, which is a pointer to the external socket.

The data filter 5206 may also include a complete asynchronization input/output module 5260 that may be called by the firewall service whenever data is received from the external or internal socket. This contains the core processing for the data transfer between mobile device 102 and the customer server 5000. A context (ReadFromExternal or ReadFromInternal) will be passed to the function. It will be used to indicate which direction data is flowing. The context was assigned in the overlapped call 5258 made by the begin data pump module 5252. The appropriate socket to receive the connection will be retrieved based on the context (e.g., if the context is ReadFromExternal, then the internal socket will be retrieved). The IO buffer, which contains the received data, will be retrieved and if the number of bytes is greater than 0, then the data will be sent to the receiving socket. The socket method Send( ) may be used when the "From" socket address is NULL, otherwise SendTo( ) will be used. At the end of the method, an overlapped call 5258 will be made for the sending socket to continue the process.

Some of the parameters that may be used by the complete asynchronization input/output module 5206 that may include: 1) a Success parameter (parameter indicating whether or not the data was received successfully); 2) a Win32ErrorCode parameter (the error code if failed); 3) a IOBuffer parameter (pointer to the data buffer containing the received data); 4) a User Data parameter (context for call, either "ReadFromExternal" or "ReadFromInternal" which indicates from which socket the data was received); 5) a From parameter (this will indicate the socket address of the mobile device 102 when receiving from the internal socket; otherwise this will be null); and 6) a From Length parameter (indicates the length of the From socket structure). A return parameter may also be used to indicate a success or otherwise call failed and the return message may indicate the reason for the failure.

The data filter 5206 may include a detach module 5262 that may be called by the firewall service when a session filter is detached from a session. The external and internal sockets will be released. A return parameter may also be used to indicate a success or otherwise call failed and the return message may indicate the reason for the failure.

As set forth above, the connector gateway 104 may include the ISA logging data record that may include several fields that contain various types of data. Set forth below is a table indicating some of the preferred fields that may be included in the ISA logging data record.

| Field Name | Description |
| --- | --- |
| Client IP Address | This is the IP address for the GPRS session |
| Client Username | This is the username or userID for the user in the carrier system |
| Date | Date session was established |
| Time | Date time was established |
| Destination Host | Destination computer |
| Processing Time | Total time for operation |
| Number of Bytes Sent | Bytes sent |
| Number of Bytes Received | Bytes Received |
| Session ID | Identifier for user session |
| Operation | Operation type (connection, protocol mapping, etc.) |
| Status Code | Resulting code of operation |

ISA will create a log entry using the data record above for each operation issued during synchronization. The total activity (duration, processing time, bytes sent, bytes received) can be aggregated using the client username and client IP address. These records may be used to diagnose problems. Known explanations for status codes issued as a result of the operations can be used by the CRM team to determine source of basic user problems.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

What is claimed is:

1. A mobile provisioning tool system, comprising:
a provisioning workstation;
a provisioning server coupled to a carrier network, the provisioning workstation, and a plurality of customer networks, wherein the carrier network comprises at least one wireless access point configured to operably communicate with a plurality of mobile devices, and where each of the customer networks comprise at least one business application accessible over the carrier network, the at least one business application comprising at least one of a user personal information management application and a customer specific database application;
a provisioning tool interface operable on the provisioning server, the provisioning tool interface comprising a customer representative interface and an information technology administrator interface, the customer representative interface configured to administer a plurality of customer accounts in each of the respective customer networks, add and remove from the customer accounts business services corresponding to the at least one business application, and assign an information technology administrator account for each of the respective customer accounts, the information technology administrator interface configured to manage a respective group of the mobile devices for each one of the customer accounts, and restrict access to each of the respective customer accounts via the information technology administrator interface to only the information technology administrator account assigned to the respective customer accounts; and
a software provisioning tool operable on the provisioning workstation, the software provisioning tool configured by a respective information technology administrator account to automatically install at least one mobile business service and configure at least one network configuration on the respective group of the mobile devices for one of the customer accounts to which the respective information technology administrator account has been assigned.

2. The mobile provisioning tool system of claim 1, wherein the customer representative interface is configured to receive data associated with each of the respective customer accounts that includes customer information, information technology administration information, and business services server information.

3. The mobile provisioning tool system of claim 2, wherein the customer information comprises customer specific data, the information technology administration information comprises information technology login information, and the business services server information includes a business service server entry, a domain entry and a port entry, and the provisioning server further comprises a customer database configured to store the customer information, the information technology administration information, and the business services server information for each of the customer accounts.

4. The mobile provisioning tool system of claim 1, wherein the customer representative interface is further configured to receive an add customer business service request to subscribe a plurality of customer accounts to the at least one mobile business service.

5. The mobile provisioning tool system of claim 4, wherein the add customer business service request includes a capability to add customer business service request information for each of the customers, the customer business service request information comprising a business service selection, a business service host entry, a host name entry, a port entry, a mean speed entry, a peak speed entry, a scheme entry, and a concurrent connection entry; and the add customer business service request information is stored in a customer database in communication with the provisioning server.

6. The mobile provisioning tool system of claim 1, wherein the information technology administrator interface is further configured to enable subscription of the respective group of mobile devices of one of the customer accounts to the at least one mobile business service, the at least one mobile business service comprising a data synchronization application.

7. The mobile provisioning tool system of claim 1, wherein the customer representative interface is further configured to generate for display a list of active customer accounts and a list of inactive customer accounts.

8. The mobile provisioning tool system of claim 1, wherein the customer representative interface is further configured to receive a deactivate customer request, and in response to receipt of the deactivate customer request, the provisioning server is configured to deactivate a respective customer account.

9. The mobile provisioning tool system of claim 8, wherein the customer representative interface is further configured to receive are-activate customer request, and in response to receipt of the re-activate customer request, the provisioning server is further configured to re-activate the respective customer account.

10. The mobile provisioning tool system of claim 1, further comprising an authorization management interface operable on the provisioning server, the authorization management interface configured to receive and enable management of access rights information for each of the information technology administrator accounts assigned to respective customer accounts.

11. The mobile provisioning tool system of claim 10, wherein the provisioning server is configured create an authorized user account associated with a customer account in response to receipt by the authorization management interface of a user request to create the authorized user, and delete the authorized user account associated with the customer account in response to receipt by the authorization management interface of a user request to delete the authorized user.

12. The mobile provisioning tool system of claim 10, wherein the authorization management interface is further configured to enable blocking and unblocking of access to the mobile provisioning tool system by a previously authorized user account.

13. The mobile provisioning tool system of claim 1, wherein the customer representative interface is further configured to generate a list of mobile business services supported by the mobile provisioning tool system, where the list includes an indication of active and inactive mobile business services associated with a respective customer account, the customer representative interface further configured to receive a user input to at least one of activate a new mobile business service associated with the respective customer account, or deactivate an active mobile business service associated with the respective customer account.

14. The mobile provisioning tool system of claim 1, wherein the customer representative interface is further configured to receive a user input to add an additional business service, the received user input comprising a general service type selection, a service number, a service name, a gateway address and a description.

15. The mobile provisioning tool system of claim 14, where the gateway address points to a connector gateway for a mobile business service being added in response to receipt of the user request, the connector gateway configured to forward a synchronization request to a corresponding company IP address.

16. The mobile provisioning tool system of claim 1, wherein the information technology administrator interface is configured to receive an add new user indication for a respective customer account, the add new user indication comprising user information, customer information and a domain.

17. The mobile provisioning tool system of claim 16, wherein the domain includes an email mailbox identifier designating a mailbox associated with an added user, and an email domain identifier designating a domain of an email application associated with a customer account of the added user.

18. The mobile provisioning tool system of claim 1, wherein the information technology administrator interface is configured to enable activation and deactivation of a respective end user of one of the mobile devices in the respective group of mobile devices.

19. The mobile provisioning tool system of claim 1, wherein the software provisioning tool is further configured to enable selection of a type of mobile device, and in response to receipt of a user selection of the type of mobile device, the software provisioning tool is further configured to generate an indication of at least one supported device.

20. The mobile provisioning tool system of claim 19, where in response to receipt of the indication of the at least one supported device, the software provisioning tool is further configured to generate an application list including at least one user selectable mobile business application that is downloadable to the indicated at least one supported device.

21. The mobile provisioning tool system of claim 1, wherein the at least one mobile business service further comprises a synchronization application operable to synchronize data on one or more of the respective group of the mobile devices with the at least one business application located on the customer network.

22. A method of provisioning software on a plurality of mobile devices, comprising:
initiating an automatic provisioning process by selection of a configuration initiation icon generated on a provisioning workstation;
confirming the mobile devices are connected with the provisioning workstation;
determining a processor type used by each of the mobile devices by querying an end user database that contains information indicative of the processor type used by each of the mobile devices;
downloading a self-extracting installation file to the provisioning workstation;
copying the self-extracting installation file to the mobile devices;
triggering the self-extracting installation file to install at least one business service application on each of the mobile devices; and
updating a plurality of registries of the mobile devices with a plurality of registry entries, wherein said plurality of registry entries comprises at least one registry entry that is unique to a user of a particular mobile device of the mobile devices, and wherein said plurality of registry entries further comprises at least one static registry entry.

23. The method of claim 22, wherein the self-extracting installation file is a processor-specific installation file associated with a respective processor type used by each of the mobile devices.

24. The method of claim 22, wherein the self-extracting installation file is a CAB file.

25. The method of claim 22, further comprising:
detecting that the mobile devices are not connected to the provisioning workstation; and
generating a message to instruct a provisioner to connect the mobile devices to the provisioning workstation.

26. The method of claim 22, further comprising:
downloading the self-extracting installation file from a mobile service bureau server connected with the provisioning workstation.

27. The method of claim 22, further comprising:
searching a storage medium on the provisioning workstation for the self-extracting installation file;
detecting the self-extracting installation file already exists on the provisioning workstation; and
the provisioning workstation initiating copying of the self-extracting installation file to each of the mobile devices upon detection that the self-extracting installation file already exists on the provisioning workstation.

28. The method of claim 22, further comprising:
copying the self-extracting installation file to each of the mobile devices using a remote application programming interface.

29. The method of claim 22, further comprising:
initiating installation of the self-extracting installation file on each of the mobile devices with a remote application programming interface.

30. The method of claim 22, wherein the registry on each of the mobile devices is updated to include a user mailbox setting, an email server domain setting, and an email server name setting.

* * * * *